United States Patent
Cable

(10) Patent No.: US 11,531,248 B2
(45) Date of Patent: Dec. 20, 2022

(54) RASTER MULTIPLEXING IN PHOTONIC CIRCUITS

(71) Applicant: Psiquantum, Corp., Palo Alto, CA (US)

(72) Inventor: Hugo Cable, San Mateo, CA (US)

(73) Assignee: Psiquantum, Corp., Palo Alto, CA (US)

(*) Notice: Subject to any disclaimer, the term of this patent is extended or adjusted under 35 U.S.C. 154(b) by 0 days.

(21) Appl. No.: 17/305,024

(22) Filed: Jun. 29, 2021

(65) Prior Publication Data
US 2022/0004075 A1    Jan. 6, 2022

Related U.S. Application Data

(60) Provisional application No. 63/047,731, filed on Jul. 2, 2020, provisional application No. 63/047,093, filed on Jul. 1, 2020.

(51) Int. Cl.
*G02F 1/225* (2006.01)
*G02F 1/21* (2006.01)
(Continued)

(52) U.S. Cl.
CPC .............. *G02F 1/225* (2013.01); *G02F 1/212* (2021.01); *G06N 10/00* (2019.01); *H04B 10/70* (2013.01);
(Continued)

(58) Field of Classification Search
CPC ......... G02F 1/225; G02F 1/212; G06N 10/00; H04Q 11/0005; H04Q 2011/0035; H04B 10/70
See application file for complete search history.

(56) References Cited

U.S. PATENT DOCUMENTS 7,346,166 B2 *  3/2008  Inoue .................... H04L 9/0858
                                                                    380/263
8,983,303 B2 *  3/2015  Meyers ................. B82Y 10/00
                                                                    398/140
(Continued)

FOREIGN PATENT DOCUMENTS

CN    103959704 A  *  7/2014  ........... H04L 7/0075
CN    103959704 B  *  12/2016  ............ H04B 10/70
(Continued)

OTHER PUBLICATIONS

Bartolucci et al., Switch networks for photonic fusion-based quantum computing, arXiv: 2109.13760v1 [quant-ph] Sep. 28, 2021 (Year: 2021).*
(Continued)

*Primary Examiner* — Peter Radkowski
(74) *Attorney, Agent, or Firm* — Kilpatrick Townsend & Stockton LLP

(57) ABSTRACT

Circuits and methods that implement multiplexing for photons propagating in waveguides are disclosed, in which an input photon received on a selected one of a set of input waveguides can be selectably routed to one of a set of output waveguides. The output waveguide can be selected on a rotating or cyclic basis, in a fixed order, and the input waveguide can be selected based at least in part on which one(s) of a set of input waveguides is (are) currently propagating a photon.

21 Claims, 27 Drawing Sheets

(51) Int. Cl.
*H04B 10/70* (2013.01)
*G06N 10/00* (2022.01)
*H04Q 11/00* (2006.01)

(52) U.S. Cl.
CPC . *H04Q 11/0005* (2013.01); *H04Q 2011/0035* (2013.01)

(56) References Cited

U.S. PATENT DOCUMENTS

| | | | | |
|---|---|---|---|---|
| 9,030,731 | B2* | 5/2015 | Arahira | G02F 1/39 359/330 |
| 9,151,851 | B2 | 10/2015 | Fries et al. | |
| 9,800,399 | B2* | 10/2017 | Tanzilli | H04L 7/0075 |
| 10,158,481 | B2* | 12/2018 | Bunandar | H04L 9/0852 |
| 10,677,965 | B2 | 6/2020 | Chen et al. | |
| 2005/0094818 | A1* | 5/2005 | Inoue | H04L 9/0858 380/278 |
| 2013/0108215 | A1 | 5/2013 | Ticknor et al. | |
| 2013/0258453 | A1* | 10/2013 | Arahira | G02F 1/39 359/330 |
| 2013/0308956 | A1* | 11/2013 | Meyers | H04B 10/70 398/130 |
| 2014/0355998 | A1* | 12/2014 | Tanzilli | H04L 9/0852 398/141 |
| 2015/0055961 | A1* | 2/2015 | Meyers | H04B 10/50 398/140 |
| 2016/0245639 | A1 | 8/2016 | Mower et al. | |
| 2016/0352515 | A1* | 12/2016 | Bunandar | H04L 9/0852 |
| 2019/0196100 | A1 | 6/2019 | Nickerson et al. | |
| 2021/0141609 | A1* | 5/2021 | Huang | G06F 7/588 |

FOREIGN PATENT DOCUMENTS

| | | | | |
|---|---|---|---|---|
| CN | 108650088 | A * | 10/2018 | |
| EP | 2761803 | B1 * | 7/2015 | H04B 10/70 |
| FR | 2980933 | A1 * | 4/2013 | H04B 10/70 |
| GB | 1525492 | | 9/1978 | |
| JP | 2004187268 | A * | 7/2004 | H04L 9/0858 |
| JP | 4173422 | B2 * | 10/2008 | H04L 9/0858 |
| JP | 2013205711 | A * | 10/2013 | G02F 1/395 |
| JP | 2014534455 | A * | 12/2014 | H04L 9/0852 |
| JP | 5867232 | B2 * | 2/2016 | G02F 1/39 |
| JP | 5963869 | B2 * | 8/2016 | H04B 10/70 |
| WO | WO-2013045674 | A1 * | 4/2013 | H04L 9/0852 |
| WO | WO-2016191679 | A1 * | 12/2016 | H04L 9/0852 |
| WO | WO-2019006039 | A1 * | 1/2019 | H04L 9/0869 |

OTHER PUBLICATIONS

Bovino, Fabio, Intrasystem Entanglement Generator and Unambiguos Bell States Discriminator on Chip, ICASSP 2019 (Year: 2019).*
Gimeno-Segovia et al., Relative multiplexing for minimising switching in linear-optical quantum computing, New J. Phys. 19 (2017) 063013 (Year: 2017).*
Imany et al, High-dimensional optical quantum logic in large operational Spaces, npj Quantum Information (2019) 5:59 ; https://doi.org/10.1038/s41534-019-0173-8 (Year: 2019).*
Kong et al., Manipulation of eight-dimensional Bell-like states, Sci. Adv. 2019;5: eaat9206 (Year: 2019).*
Tan et al., The resurgence of the linear optics quantum interferometer recent advances & applications, Reviews in Physics 4 (2019) (Year: 2019).*
Wang et al., Quantum Photonic Interconnect, Xiv:1508.03214v2 [quant-ph] Sep. 26, 2015 (Year: 2015).*
Earnshaw et al., 8×8 optical switch matrix using generalized Mach-Zehnder interferometers, in IEEE Photonics Technology Letters, vol. 15, No. 6, pp. 810-812, Jun. 2003 (Year: 2003).*
Gimeno-Segovia et al., From Three-Photon Greenberger-Horne-Zeilinger States to Ballistic Universal Quantum Computation, Phys. Rev. Lett. 115, 020502, 2015; plus Supplement (Year: 2015).*
Pai et al., Matrix optimization on universal unitary photonic devices, preprint Aug. 2018, available atarXiv:1808.00458v3 [eess.SP] May 22, 2019 (Year: 2019).*
Miller, David, Stanford University, Arbitrary and reconfigurable optics—new opportunities for integrated photonics, FiO, 2017. (Year: 2017).*
Miller, David A. B., Self-configuring universal linear optical component [Invited], Photon. Res. / vol. 1, No. 1 / Jun. 2013 (Year: 2013).*
Miller, David A. B., Reconfigurable add-drop multiplexer for spatial modes, Optics Express, vol. 21, No. 17, 20220 (Year: 2013).*
Azuma et al., "All-Photonic Quantum Repeaters", Nature Communications 6:6787, 2015, pp. 1-7.
Bonneau et al., "Effect of Loss on Multiplexed Single-Photon Sources", New J. Phys. 17, 043057, 2015, pp. 1-18.
Gimeno-Segovia et al., "Relative Multiplexing for Minimising Switching in Linear-Optical Quantum Computing", New Journal of Physics, vol. 19, Available Online at URL: https://iopscience.iop.org/articie/10.1088/1367-2630/aa7095, Jun. 6, 2017, 13 pages.
Gimeno-Segovia et al., "Relative Multiplexing for Minimising Switching in Linear-Optical Quantum Computing", New Journal of Physics, 19, 063013, 2017, pp. 1-15.
Hunter,"Planar Optical Space Switch Architectures", in Optical Switching, edited by T.S. El-Bawab (Springer US, Boston, MA), 2006, pp. 275-305.
Lagali, "The Generalized Mach-Zehnder Interferometer using Multimode Interference Couplers for Optical Communications Networks", Ph D. Thesis, University of Alberta, 2000, pp. 1-155.
Meyer-Scott et al., "Single-Photon Sources: Approaching the Ideal through Multiplexing", Rev. Sci. Instrum. 91, 041101, 2020, pp. 1-36.
Application No. PCT/US2021/039702 , International Search Report and Written Opinion, dated Oct. 26, 2021, 13 pages.
Varnava et al., "How Good Must Single Photon Sources and Detectors Be for Efficient Linear Optical Quantum Computation?", Physical Review Letters, 100, 060502, 2008, pp. 1-4.
Zhang et al., "Demonstration of a Scheme for the Generation of "Event Ready" Entangled Photon Pairs from a Single-Photon Source", Physical Review, A, 77, 062316, 2008, pp. 1-4.

* cited by examiner (i) N=16 Hadamard-type GMZI construction (ii) Simplified GMZI for use as a 16-to-1 mux Circuit notation $N=2^n$ N-mode Hadamard interferometer
(transfer matrix is NxN Hadamard matrix)

RASTER MULTIPLEXING IN PHOTONIC CIRCUITS

CROSS-REFERENCES TO RELATED APPLICATIONS

This application claims priority to U.S. Application No. 63/047,093, filed Jul. 1, 2020, and to U.S. Application No. 63/047,731, filed Jul. 2, 2020, the disclosures of which are incorporated herein by reference.

BACKGROUND

In photonic circuits and systems, photons may be generated at different times and propagated through different waveguides. For various operations, it may be desirable to rearrange photons spatially onto different waveguides and/or to synchronize photons propagating on different waveguides so that they arrive concurrently at a particular location within the circuit.

SUMMARY

Disclosed herein are examples (also referred to as "embodiments") of circuits and methods that implement multiplexing in photonic circuits. An input photon received on a selected one of a set of input waveguides can be selectably routed to one of a set of output waveguides. The output waveguide can be selected on a rotating or cyclic basis, in a fixed order, and the input waveguide can be selected based at least in part on which one(s) of a set of input waveguides is (are) currently propagating a photon. In some embodiments, there may be just one input waveguide that is always selected.

Some embodiments relate to a circuit that can comprise a number (N) of input paths of input paths, where N is at least 1; a number of output paths including a raster group of output paths, where the raster group of output paths has a number (R) of output paths, where R is at least 2; an optical switching network coupled between the input paths and the output paths, the optical switching network comprising a plurality of active optical switches arranged to selectably couple a photon from any one of the input paths to any one of the output paths; and control logic coupled to the optical switching network. The control logic can be configured to: receive an input signal indicative of when a photon is present on each input path; select one of the output paths as an active output path, wherein output paths in the raster group are selected according to a fixed order; and generate control signals to set a state of the active optical switches such that a photon from one of the input paths is coupled to the active output path.

In some embodiments, each output path in the raster group of output paths is selected as the active output path once during a raster period consisting of R consecutive time bins.

In some embodiments, the number N of input paths is greater than 1 and the control logic is further configured to select one of the input paths as an active input path based on the input signal and to generate the control signals such that a photon from the active input path is coupled to the active output path.

In some embodiments, the circuit can also include a number of delay lines, each delay line introducing a different amount of delay, and each delay line can be coupled to a different one of the R output paths in the raster group of output paths. The control logic can be configured to select the output paths in an order such that photons entering the optical switching network during a set of R consecutive time bins arrive at respective outputs of the delay lines in the same time bin.

In some embodiments, the optical switching network can be a generalized Mach-Zehnder interferometer (GMZI), and the active optical switches can include active phase shifters.

In some embodiments, each input path and each output path comprises a waveguide. In other embodiments, each input path and each output path comprises a pair of waveguides. In still other embodiments, each input path and each output path comprises a number of waveguides that is larger than two.

In some embodiments, each input path can be coupled to an output of a different one of a set of N heralded single photon sources, and the input signal can include heralding signals from the heralded single photon sources.

In some embodiments, the output paths further include at least one additional output path separate from the raster group of output paths.

Some embodiments relate to a circuit that comprises a number (N) of source circuits, each source circuit having an output path to propagate a photon, where N is at least 1; a downstream circuit having a number (R) of input paths to receive photons, where R is at least 2; and a raster multiplexer circuit. The raster multiplexer circuit can include: a number N of multiplexer input paths, each multiplexer input path coupled to an output path of one of the source circuits; a number of multiplexer output paths including a raster group of multiplexer output paths, wherein the raster group of multiplexer output paths includes R multiplexer output paths, each multiplexer output path in the raster group of multiplexer output paths being coupled to one of the input paths of the downstream circuit; an optical switching network coupled between the multiplexer input paths and the multiplexer output paths, the optical switching network comprising a set of active optical switches arranged to selectably couple a photon from any one of the multiplexer input paths to any one of the multiplexer output paths; and control logic coupled to the optical switching network. The control logic can be configured to: receive an input signal indicative of when the output path of each source circuit is propagating a photon; select one of the multiplexer output paths as an active multiplexer output path, where each multiplexer output path in the raster group of multiplexer output paths is selected as the active raster multiplexer output path once during a raster period consisting of R consecutive time bins; and generate control signals to set a state of the optical active switches such that a photon from one of the multiplexer input paths is coupled to the active multiplexer output path.

In some embodiments, the number N can be greater than 1 and the control logic can be further configured to: select one of the multiplexer input paths as an active multiplexer input path based on the input signal; and generate the control signals such that a photon from the active multiplexer input path is coupled to the active multiplexer output path.

In some embodiments, the downstream circuit can be a Bell state generator.

In some embodiments, the source circuits can be heralded single photon source circuits.

In other embodiments, the source circuits can be entanglement circuits that generate entangled systems of photons that encode qubits. For example, the qubits can be encoded using a dual-rail encoding, and each multiplexer input path and each multiplexer output path can include a pair of waveguides.

In some embodiments, the downstream circuit can include a second optical switching network coupled to a plurality of fusion circuits.

Some embodiments relate to a circuit that includes: a number (N) of source circuits, each source circuit having an output path to propagate a photon; a number (R) of downstream circuits, each downstream circuit having a number (M) of input paths to receive photons, where R is at least 2 and M is at least 2; a set of M raster multiplexer circuits; and control logic coupled to the raster multiplexer circuits. Each raster multiplexer circuit can include: a set of N multiplexer input paths, each multiplexer input path coupled to an output path of one of the N source circuits; a number of multiplexer output paths including a raster group of multiplexer output paths, wherein the raster group of multiplexer output paths includes R multiplexer output paths, each raster multiplexer output path in the raster group of multiplexer output paths being coupled to one of the input paths of a different one of the R downstream circuits; and an optical switching network coupled between the multiplexer input paths and the multiplexer output paths, the optical switching network comprising a plurality of active optical switches arranged to selectably couple a photon from any one of the multiplexer input paths to any one of the multiplexer output paths. The control logic can be configured to: receive an input signal indicative of when the output path of each source circuit is propagating a photon; select, for each of the raster multiplexer circuits, one of the multiplexer input paths as an active multiplexer input path, the selection being based at least in part on the input signal; select, for each of the raster multiplexer circuits, one of the multiplexer output paths as an active multiplexer output path such that, for each raster multiplexer circuit, each multiplexer output path in the raster group of multiplexer output paths is selected as the active multiplexer output path once during a raster period consisting of R consecutive time bins and such that all M of the multiplexer output paths that couple to a same one of the R downstream circuits are selected as the active multiplexer output paths for a same time bin; and generate control signals to set a state of the active switches in the optical switching network of each of the R raster multiplexer circuits such that, in each of the R raster multiplexer circuits, a photon from the active multiplexer input path is coupled to the active multiplexer output path.

In some embodiments, the circuit can also include a set of delay lines, each delay line introducing a different amount of delay, and each delay line can be coupled to a different one of the multiplexer output paths in the raster group of multiplexer output paths. The control logic can be further configured to select the output paths in an order such that photons entering the optical switching network during a set of R consecutive time bins arrive at respective outputs of the delay lines in the same time bin.

In some embodiments, the source circuits can be heralded single photon source circuits, and each downstream circuit can be a Bell state generator.

Some embodiments relate to a method that can include: receiving a set of input signals indicating whether photons are present on each of a set of input paths of an optical circuit; selecting an active input path for the optical circuit based at least in part on the input signals; selecting an active output path for the optical circuit from a number of output paths that includes a raster group of a number (R) of output paths, wherein R is at least 2, wherein output paths in the raster group are selected according to a fixed order; and controlling a set of active switches in the optical circuit to couple a photon from the active input path to the active output path.

In some embodiments, each output path in the raster group can be selected as the active output path once during a raster period consisting of R consecutive clock cycles. In some embodiments, each output path in the raster group of output paths can be coupled to a delay circuit that introduces a different number of clock cycles of delay, and the output paths can be selected in an order such that photons entering the optical circuit during a set of R consecutive cycles arrive at respective outputs of the delay lines in a same clock cycle.

The following detailed description, together with the accompanying drawings, will provide a better understanding of the nature and advantages of the claimed invention.

DETAILED DESCRIPTION

Figure 1:
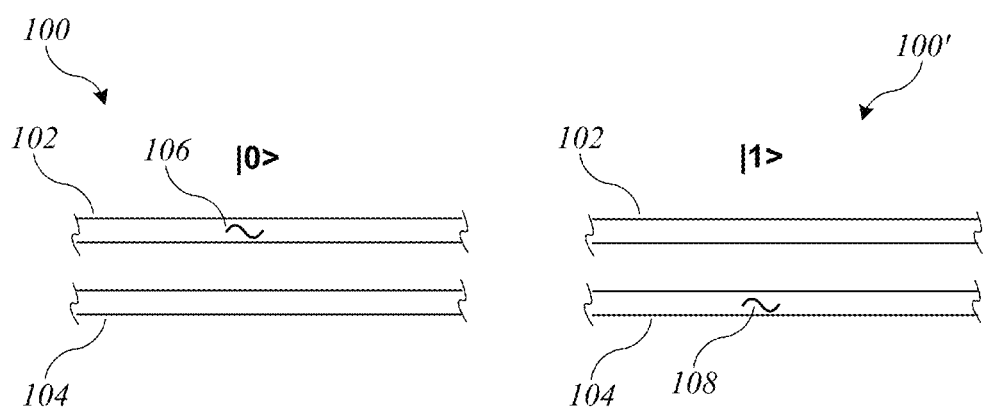
FIG. 1 shows two representations of a portion of a pair of waveguides corresponding to a dual-rail-encoded photonic qubit.

Disclosed herein are examples (also referred to as "embodiments") of circuits and methods that implement multiplexing for photons propagating in waveguides. An input photon received on a selected one of a set of input waveguides can be selectably routed to one of a set of output waveguides. The output waveguide can be selected on a rotating or cyclic basis, in a fixed order, and the input waveguide can be selected based at least in part on which one(s) of a set of input waveguides is (are) currently propagating a photon. (In some embodiments, there may be just one input waveguide that is always selected.)

Circuits and methods of the kind described herein can be used in a variety of applications where spatial multiplexing is desired. To facilitate understanding of the disclosure, an overview of relevant concepts and terminology is provided in Section 1. Section 2 introduces spatial multiplexing techniques for photons in waveguides. Sections 3 and 4 describe "raster" multiplexing techniques according to various embodiments. Although embodiments are described with specific detail to facilitate understanding, those skilled in the art with access to this disclosure will appreciate that the claimed invention can be practiced without these details.

1. OVERVIEW OF QUANTUM COMPUTING

Quantum computing relies on the dynamics of quantum objects, e.g., photons, electrons, atoms, ions, molecules, nanostructures, and the like, which follow the rules of quantum theory. In quantum theory, the quantum state of a quantum object is described by a set of physical properties, the complete set of which is referred to as a mode. In some embodiments, a mode is defined by specifying the value (or distribution of values) of one or more properties of the quantum object. For example, in the case where the quantum object is a photon, modes can be defined by the frequency of the photon, the position in space of the photon (e.g., which waveguide or superposition of waveguides the photon is propagating within), the associated direction of propagation (e.g., the k-vector for a photon in free space), the polarization state of the photon (e.g., the direction (horizontal or vertical) of the photon's electric and/or magnetic fields), a time window in which the photon is propagating, the orbital angular momentum state of the photon, and the like.

For the case of photons propagating in a waveguide, it is convenient to express the state of the photon as one of a set of discrete spatio-temporal modes. For example, the spatial mode $k_i$ of the photon is determined according to which one of a finite set of discrete waveguides the photon is propagating in, and the temporal mode $t_j$ is determined by which one of a set of discrete time periods (referred to herein as "bins") the photon is present in. In some photonic implementations, the degree of temporal discretization can be provided by a pulsed laser which is responsible for generating the photons. As used herein, terms such as "simultaneous" or "concurrent" refer to events occurring within the same time bin, and terms such as "synchronous" (or "synchronized") refer to events separated by a predictable, constant number of time bins, which can but need not be zero. The term "path" is used herein to refer to a set of one or more waveguides representing spatial modes, and depending on how the photons are being used, a path may include one or more waveguides. In examples below, spatial modes will be used primarily to avoid complication of the description. However, one of ordinary skill will appreciate that the systems and methods can apply to any type of mode, e.g., temporal modes, polarization modes, and any other mode or set of modes that serves to specify the quantum state. Further, in the description that follows, embodiments will be described that employ photonic waveguides to define the spatial modes of the photon. However, persons of ordinary skill in the art with access to this disclosure will appreciate that other types of mode, e.g., temporal modes, energy states, and the like, can be used without departing from the scope of the present disclosure. In addition, persons of ordinary skill in the art will be able to implement examples using other types of quantum systems, including but not limited to other types of photonic systems.

For quantum systems of multiple indistinguishable particles, rather than describing the quantum state of each particle in the system, it is useful to describe the quantum state of the entire many-body system using the formalism of Fock states (sometimes referred to as the occupation number representation). In the Fock state description, the many-body quantum state is specified by how many particles there are in each mode of the system. For example, a multimode, two particle Fock state $|1001\rangle_{1,2,3,4}$ specifies a two-particle quantum state with one particle in mode 1, zero particles in mode 2, zero particles in mode 3, and one particle in mode 4. Again, as introduced above, a mode can be any property of the quantum object. For the case of a photon, any two modes of the electromagnetic field can be used, e.g., one may design the system to use modes that are related to a degree of freedom that can be manipulated passively with linear optics. For example, polarization, spatial degree of freedom, or angular momentum could be used. The four-mode system represented by the two particle Fock state $|1001\rangle_{1,2,3,4}$ can be physically implemented as four distinct waveguides with two of the four waveguides having one photon travelling within them. Other examples of a state of such a many-body quantum system include the four-particle Fock state $|1111\rangle_{1,2,3,4}$ that represents each mode occupied by one particle and the four-particle Fock state $|2200\rangle_{1,2,3,4}$ that represents modes 1 and 2 respectively occupied by two particles and modes 3 and 4 occupied by zero particles. For modes having zero particles present, the term "vacuum mode" is used. For example, for the four-particle Fock state $|2200\rangle_{1,2,3,4}$ modes 3 and 4 are referred to herein as "vacuum modes." Fock states having a single occupied mode can be represented in shorthand using a subscript to identify the occupied mode. For example, $|0010\rangle_{1,2,3,4}$ is equivalent to $|1_3\rangle$.

1.1. Qubits

As used herein, a "qubit" (or quantum bit) is a quantum system with an associated quantum state that can be used to encode information. A quantum state can be used to encode one bit of information if the quantum state space can be modeled as a (complex) two-dimensional vector space, with one dimension in the vector space being mapped to logical value 0 and the other to logical value 1. In contrast to classical bits, a qubit can have a state that is a superposition of logical values 0 and 1. More generally, a "qudit" can be any quantum system having a quantum state space that can be modeled as a (complex) n-dimensional vector space (for any integer n), which can be used to encode n bits of information. For the sake of clarity of description, the term "qubit" is used herein, although in some embodiments the system can also employ quantum information carriers that encode information in a manner that is not necessarily associated with a binary bit, such as a qudit. Qubits (or qudits) can be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

A qubit can be "dual-rail encoded" such that the logical value of the qubit is encoded by occupation of one of two modes of the quantum system. For example, the logical 0 and 1 values can be encoded as follows:

$$|0\rangle_L = |10\rangle_{1,2} \quad (1)$$

$$|1\rangle_L = |01\rangle_{1,2} \quad (2)$$

where the subscript "L" indicates that the ket represents a logical state (e.g., a qubit value) and, as before, the notation $|ij\rangle_{1,2}$ on the right-hand side of the equations above indicates that there are i particles in a first mode and j particles in a second mode, respectively (e.g., where i and j are integers). In this notation, a two-qubit system having a logical state $|0\rangle|1\rangle_L$ (representing a state of two qubits, the first qubit being in a '0' logical state and the second qubit being in a '1' logical state) may be represented using occupancy across four modes by $|1001\rangle_{1,2,3,4}$ (e.g., in a photonic system, one photon in a first waveguide, zero photons in a second waveguide, zero photons in a third waveguide, and one photon in a fourth waveguide). In some instances throughout this disclosure, the various subscripts are omitted to avoid unnecessary mathematical clutter.

1.2. Entangled States

Many of the advantages of quantum computing relative to "classical" computing (e.g., conventional digital computers using binary logic) stem from the ability to create entangled states of multi-qubit systems. In mathematical terms, a state $|\psi\rangle$ of n quantum objects is a separable state if $|\psi\rangle = |\psi_1\rangle \otimes \ldots \otimes |\psi_n\rangle$, and an entangled state is a state that is not separable. One example is a Bell state, which, loosely speaking, is a type of maximally entangled state for a two-qubit system, and qubits in a Bell state may be referred to as a Bell pair. For example, for qubits encoded by single photons in pairs of modes (a dual-rail encoding), examples of Bell states include:

$$|\Phi^+\rangle = \frac{|0\rangle_L |0\rangle_L + |1\rangle_L |1\rangle_L}{\sqrt{2}} = \frac{|10\rangle|10\rangle + |01\rangle|01\rangle}{\sqrt{2}} \quad (3)$$

$$|\Phi^-\rangle = \frac{|0\rangle_L |0\rangle_L - |1\rangle_L |1\rangle_L}{\sqrt{2}} = \frac{|10\rangle|10\rangle - |01\rangle|01\rangle}{\sqrt{2}} \quad (4)$$

$$|\Psi^+\rangle = \frac{|0\rangle_L |1\rangle_L + |1\rangle_L |0\rangle_L}{\sqrt{2}} = \frac{|10\rangle|01\rangle + |01\rangle|10\rangle}{\sqrt{2}} \quad (5)$$

$$|\Psi^-\rangle = \frac{|0\rangle_L |1\rangle_L - |1\rangle_L |0\rangle_L}{\sqrt{2}} = \frac{|10\rangle|01\rangle - |01\rangle|10\rangle}{\sqrt{2}} \quad (6)$$

More generally, an n-qubit Greenberger-Horne-Zeilinger (GHZ) state (or "n-GHZ state") is an entangled quantum state of n qubits. For a given orthonormal logical basis, an n-GHZ state is a quantum superposition of all qubits being in a first basis state superposed with all qubits being in a second basis state:

$$|GHZ\rangle = \frac{|0\rangle^{\otimes M} + |1\rangle^{\otimes M}}{\sqrt{2}} \quad (7)$$

where the kets above refer to the logical basis. For example, for qubits encoded by single photons in pairs of modes (a dual-rail encoding), a 3-GHZ state can be written:

$$|GHZ\rangle = \frac{|0\rangle_L |0\rangle_L |0\rangle_L - |1\rangle_L |1\rangle_L |1\rangle_L}{\sqrt{2}} = \frac{|10\rangle|10\rangle|10\rangle + |01\rangle|01\rangle|01\rangle}{\sqrt{2}} \quad (8)$$

where the kets above refer to photon occupation number in six respective modes (with mode subscripts omitted).

1.3. Physical Implementations

Qubits (and operations on qubits) can be implemented using a variety of physical systems. In some examples described herein, qubits are provided in an integrated photonic system employing waveguides, beam splitters, photonic switches, and single photon detectors, and the modes that can be occupied by photons are spatiotemporal modes that correspond to presence of a photon in a waveguide. Modes can be coupled using mode couplers, e.g., optical beam splitters, to implement transformation operations, and measurement operations can be implemented by coupling single-photon detectors to specific waveguides. One of ordinary skill in the art with access to this disclosure will appreciate that modes defined by any appropriate set of degrees of freedom, e.g., polarization modes, temporal modes, and the like, can be used without departing from the scope of the present disclosure. For instance, for modes that only differ in polarization (e.g., horizontal (H) and vertical (V)), a mode coupler can be any optical element that coherently rotates polarization, e.g., a birefringent material such as a waveplate. For other systems such as ion trap systems or neutral atom systems, a mode coupler can be any physical mechanism that can couple two modes, e.g., a pulsed electromagnetic field that is tuned to couple two internal states of the atom/ion.

In some embodiments of a photonic quantum computing system using dual-rail encoding, a qubit can be implemented using a pair of waveguides. FIG. 1 shows two representations (100, 100') of a portion of a pair of waveguides 102, 104 that can be used to provide a dual-rail-encoded photonic qubit. At 100, a photon 106 is in waveguide 102 and no photon is in waveguide 104 (also referred to as a vacuum mode); in some embodiments, this corresponds to the $|0\rangle_L$ state of a photonic qubit. At 100', a photon 108 is in waveguide 104, and no photon is in waveguide 102; in some embodiments this corresponds to the $|1\rangle_L$ state of the photonic qubit. To prepare a photonic qubit in a known logical state, a photon source (not shown) can be coupled to one end of one of the waveguides. The photon source can be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system can be created in the same pair of waveguides. In addition, by providing multiple pairs of waveguides, a quantum system having qubits whose logical states correspond to different spatiotemporal modes can be created. It should be understood that the waveguides in such a system need not have any particular spatial relationship to each other. For instance, they can be but need not be arranged in parallel. In the context of optical circuits operating on qubits, a "path" may refer to a set of (one or more) waveguides that provides a set of spatial modes for one qubit. In a dual-rail encoding, a path includes a pair of waveguides. Since each waveguide in a dual-rail encoding corresponds to a (spatial) mode, the term "mode" is sometimes used interchangeably with "waveguide" in descriptions of circuits for dual-rail encoded qubits. Other encodings may use a different number of waveguides. For instance, a polarization encoding may use a single waveguide for each path.

Occupied modes can be created by using a photon source to generate a photon that then propagates in the desired waveguide. A photon source can be, for instance, a resonator-based source that emits photon pairs, also referred to as a heralded single photon source. In one example of such a source, the source is driven by a pump, e.g., a light pulse, that is coupled into a system of optical resonators that, through a nonlinear optical process (e.g., spontaneous four wave mixing (SFWM), spontaneous parametric down-conversion (SPDC), second harmonic generation, or the like), can generate a pair of photons. Many different types of photon sources can be employed. Examples of photon pair sources can include a microring-based spontaneous four wave mixing (SPFW) heralded photon source (HPS). However, the precise type of photon source used is not critical and any type of nonlinear source, employing any process, such as SPFW, SPDC, or any other process can be used. Other classes of sources that do not necessarily require a nonlinear material can also be employed, such as those that employ atomic and/or artificial atomic systems, e.g., quantum dot sources, color centers in crystals, and the like. In some cases, sources may or may not be coupled to photonic cavities, e.g., as can be the case for artificial atomic systems such as quantum dots coupled to cavities. Other types of photon sources also exist for SFWM and SPDC, such as optomechanical systems and the like. For purposes of the present disclosure, the precise type of photon source used is not critical and any type of heralded single photon source, employing any process, such as SPFW, SPDC, or any other process, can be used.

In such cases, operation of the photon source may be non-deterministic (also sometimes referred to as "stochastic") such that a given pump pulse may or may not produce a photon pair. In some embodiments, when a heralded single photon source generates a pair of photons, one photon of the pair can be propagated into a "signaling" (or "propagation") waveguide of an optical circuit, and the other photon (sometimes referred to as a "heralding photon") can be propagated into a different waveguide, which can be coupled to a single-photon detector. The single-photon detector can generate a signal (e.g., a digital logic signal) indicating when a photon has been detected by the detector. Any type of photodetector that has sensitivity to single photons can be used. In some embodiments, detection of a photon in a particular heralding waveguide indicates presence of a photon in a corresponding signaling waveguide. Accordingly, it can be known when and where a photon is generated.

In some embodiments, coherent spatial and/or temporal multiplexing of several non-deterministic sources (referred to herein as "active" multiplexing) can be used to allow the probability of having one mode become occupied during a given cycle to approach 1. One of ordinary skill will appreciate that many different active multiplexing architectures that incorporate spatial and/or temporal multiplexing are possible. For instance, active multiplexing schemes that employ log-tree, generalized Mach-Zehnder interferometers, multimode interferometers, chained sources, chained sources with dump-the-pump schemes, asymmetric multi-crystal single photon sources, or any other type of active multiplexing architecture can be used. In some embodiments, the photon source can employ an active multiplexing scheme with quantum feedback control and the like. In some embodiments, use of multirail encoding allows the probability of a band having one mode become occupied during a given pulse cycle to approach 1 without active multiplexing. Specific examples of multiplexing operations that can be applied to non-deterministic photon sources are described below.

Measurement operations can be implemented by coupling a waveguide to a single-photon detector that generates a classical signal (e.g., a digital logic signal) indicating that a photon has been detected by the detector. Any type of photodetector that has sensitivity to single photons can be used. In some embodiments, detection of a photon (e.g., at the output end of a waveguide) indicates an occupied mode while absence of a detected photon can indicate an unoccupied mode.

Some embodiments described below relate to physical implementations of unitary transform operations that couple modes of a quantum system, which can be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation introduced above), mode coupling can result in a state in which both modes have a nonzero probability of being occupied, e.g., a state $a_1|10\rangle + a_2|01\rangle$, where $|a_1|^2 + |a_2|^2 = 1$. In some embodiments, operations of this kind can be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 2A:
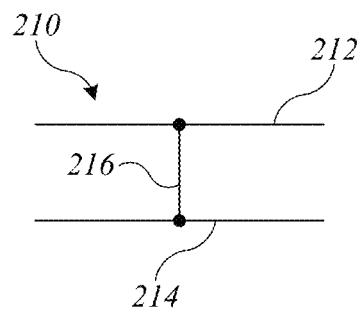
FIG. 2A shows a schematic diagram for coupling of two modes.

FIG. 2A shows a schematic diagram 210 (also referred to as a circuit diagram or circuit notation) for coupling of two modes. The modes are drawn as horizontal lines 212, 214, and the mode coupler 216 is indicated by a vertical line that is terminated with nodes (solid dots) to identify the modes being coupled. In the more specific language of linear quantum optics, the mode coupler 216 shown in FIG. 2A represents a 50/50 beam splitter that implements a transfer matrix:

$$T = \frac{1}{\sqrt{2}} \begin{pmatrix} 1 & i \\ i & 1 \end{pmatrix}, \quad (9)$$

where T defines the linear map for the photon creation operators on two modes. (In certain contexts, transfer matrix T can be understood as implementing a first-order imaginary Hadamard transform.) By convention the first column of the transfer matrix corresponds to creation operators on the top mode (referred to herein as mode 1, labeled as horizontal line 212), and the second column corresponds to creation operators on the second mode (referred to herein as mode 2, labeled as horizontal line 214), and so on if the system includes more than two modes. More explicitly, the mapping can be written as:

$$\begin{pmatrix} a_1^\dagger \\ a_2^\dagger \end{pmatrix}_{input} \mapsto \frac{1}{\sqrt{2}} \begin{pmatrix} 1 & -i \\ -i & 1 \end{pmatrix} \begin{pmatrix} a_1^\dagger \\ a_2^\dagger \end{pmatrix}_{output}, \quad (10)$$

where subscripts on the creation operators indicate the mode that is operated on, the subscripts input and output identify the form of the creation operators before and after the beam splitter, respectively and where:

$$a_i|n_i,n_j\rangle = \sqrt{n_i}|n_i-1,n_j\rangle$$

$$a_j|n_i,n_j\rangle = \sqrt{n_j}|n_i,n_j-1\rangle$$

$$a_j^\dagger|n_i,n_j\rangle = \sqrt{n_j+1}|n_i,n_j+1\rangle \quad (11)$$

For example, the application of the mode coupler shown in FIG. 2A leads to the following mappings:

$$a_{1_{input}}^\dagger \mapsto \frac{1}{\sqrt{2}}\left(a_{1_{output}}^\dagger - i a_{2_{output}}^\dagger\right) \quad (12)$$

$$a_{2_{input}}^\dagger \mapsto \frac{1}{\sqrt{2}}\left(-i a_{1_{output}}^\dagger + a_{2_{output}}^\dagger\right)$$

Thus, the action of the mode coupler described by Eq. (9) is to take the input states $|10\rangle$, $|01\rangle$, and $|11\rangle$ to $$|10\rangle \mapsto \frac{|10\rangle - i|01\rangle}{\sqrt{2}} \quad (13)$$

$$|01\rangle \mapsto \frac{-i|10\rangle + |01\rangle}{\sqrt{2}}$$

$$|11\rangle \mapsto \frac{-i}{2}(|20\rangle + |02\rangle)$$

Figure 2B:
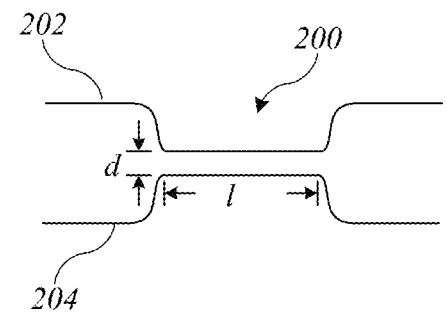
FIG. 2B shows, in schematic form, a physical implementation of mode coupling in a photonic system that can be used in some embodiments.

FIG. 2B shows a physical implementation of a mode coupling that implements the transfer matrix T of Eq. (9) for two photonic modes in accordance with some embodiments. In this example, the mode coupling is implemented using a waveguide beam splitter 200, also sometimes referred to as a directional coupler or mode coupler. Waveguide beam splitter 200 can be realized by bringing two waveguides 202, 204 into close enough proximity that the evanescent field of one waveguide can couple into the other. By adjusting the separation d between waveguides 202, 204 and/or the length l of the coupling region, different couplings between modes can be obtained. In this manner, a waveguide beam splitter 200 can be configured to have a desired transmissivity. For example, the beam splitter can be engineered to have a transmissivity equal to 0.5 (i.e., a 50/50 beam splitter for implementing the specific form of the transfer matrix T introduced above). If other transfer matrices are desired, the reflectivity (or the transmissivity) can be engineered to be greater than 0.6, greater than 0.7, greater than 0.8, or greater than 0.9 without departing from the scope of the present disclosure.

In addition to mode coupling, some unitary transforms may involve phase shifts applied to one or more modes. In some photonic implementations, variable phase-shifters can be implemented in integrated circuits, providing control over the relative phases of the state of a photon spread over multiple modes. Examples of transfer matrices that define such a phase shifts are given by (for applying a +i and −i phase shift to the second mode, respectively):

$$s = \begin{pmatrix} 1 & 0 \\ 0 & i \end{pmatrix} \quad (14)$$

$$s^\dagger = \begin{pmatrix} 1 & 0 \\ 0 & -i \end{pmatrix}$$

For silica-on-silicon materials some embodiments implement variable phase-shifters using thermo-optical switches. The thermo-optical switches use resistive elements fabricated on the surface of the chip, that via the thermo-optical effect can provide a change of the refractive index n by raising the temperature of the waveguide by an amount of the order of $10^{-5}$ K. One of skill in the art with access to the present disclosure will understand that any effect that changes the refractive index of a portion of the waveguide can be used to generate a variable, electrically tunable, phase shift. For example, some embodiments use beam splitters based on any material that supports an electro-optic effect, so-called $\chi^2$ and $\chi^3$ materials such as lithium niobate, BBO, KTP, and the like and even doped semiconductors such as silicon, germanium, and the like.

Figure 3A:
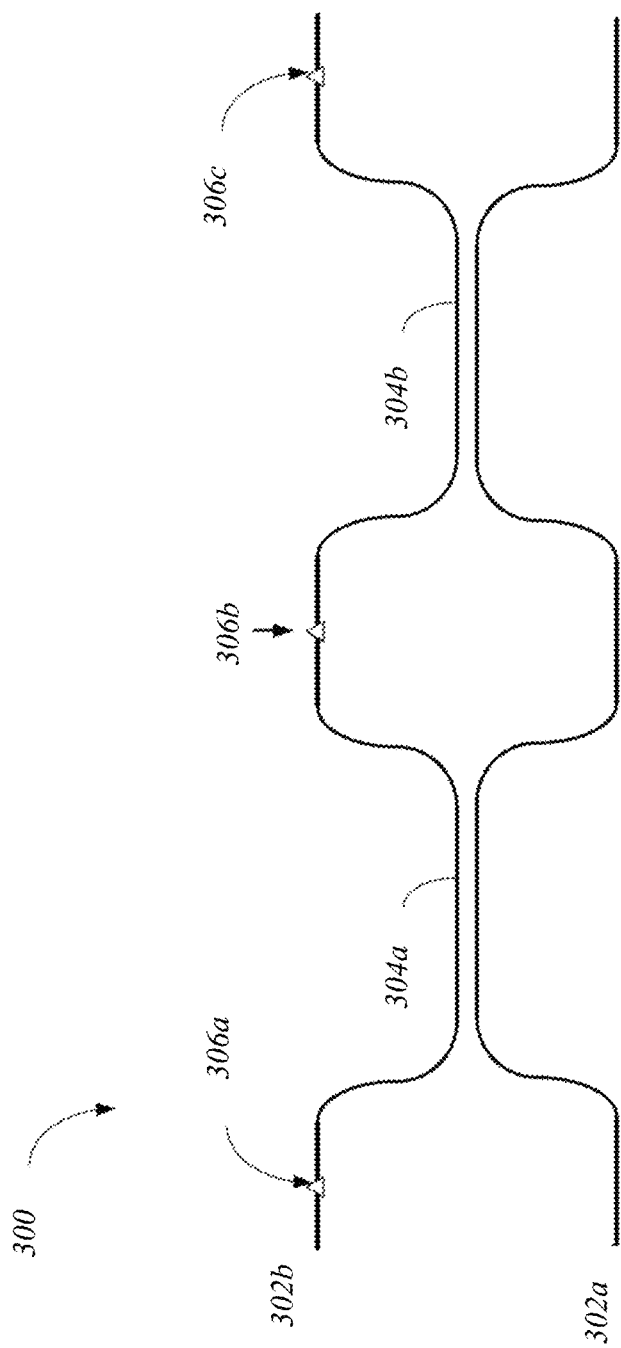
FIGS. 3A and 3B show, in schematic form, examples of physical implementations of a Mach-Zehnder Interferometer (MZI) configuration that can be used in some embodiments.
Figure 3B:
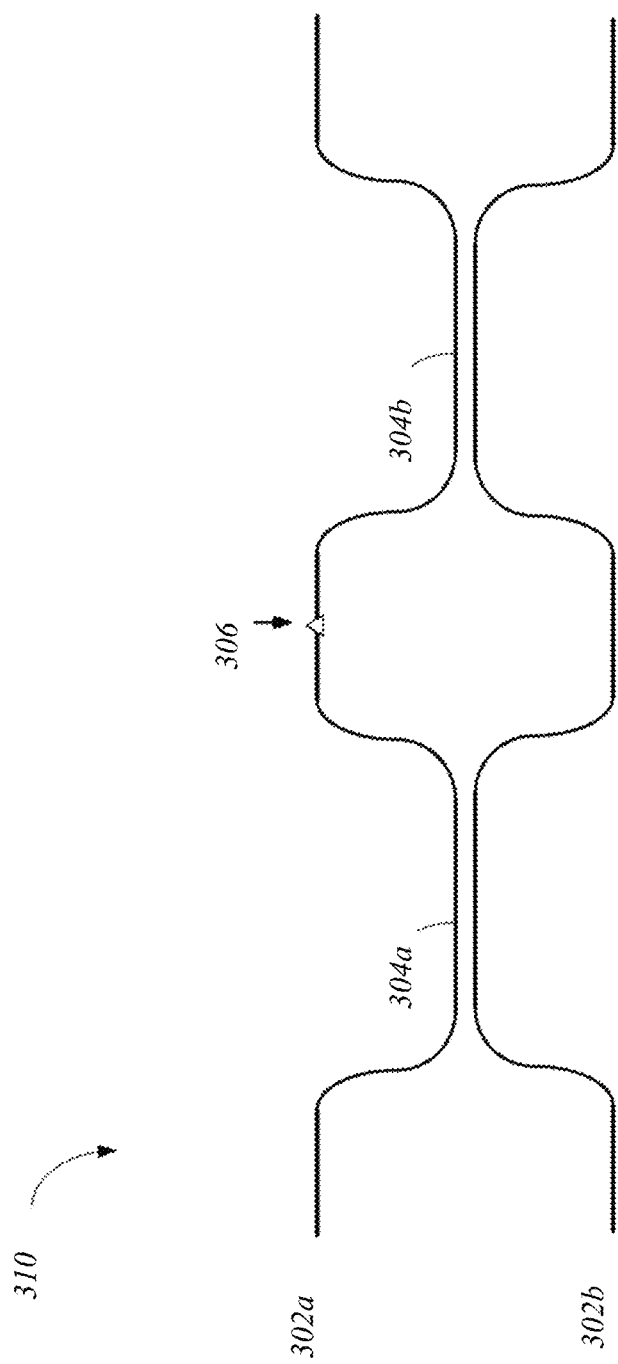

Beam-splitters with variable transmissivity and arbitrary phase relationships between output modes can also be achieved by combining directional couplers and variable phase-shifters in a Mach-Zehnder Interferometer (MZI) configuration 300, e.g., as shown in FIG. 3A. Complete control over the relative phase and amplitude of the two modes 302a, 302b in dual rail encoding can be achieved by varying the phases imparted by phase shifters 306a, 306b, and 306c and the length and proximity of coupling regions 304a and 304b. FIG. 3B shows a slightly simpler example of a MZI 310 that allows for a variable transmissivity between modes 302a, 302b by varying the phase imparted by the phase shifter 306. FIGS. 3A and 3B are examples of how one could implement a mode coupler in a physical device, but any type of mode coupler/beam splitter can be used without departing from the scope of the present disclosure.

Figure 4A:
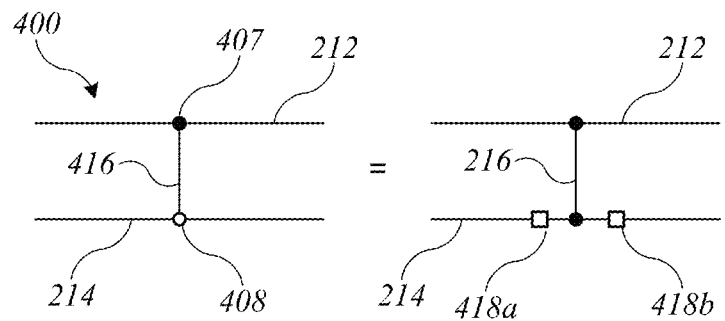
FIG. 4A shows another schematic diagram for coupling of two modes.

In some embodiments, beam splitters and phase shifters can be employed in combination to implement a variety of transfer matrices. For example, FIG. 4A shows, in a schematic form similar to that of FIG. 2A, a mode coupler 400 implementing the following transfer matrix:

$$T_r = \frac{1}{\sqrt{2}} \begin{pmatrix} 1 & 1 \\ 1 & -1 \end{pmatrix}. \quad (15)$$

Thus, mode coupler 400 applies the following mappings:

$$|10\rangle \mapsto \frac{|10\rangle + |01\rangle}{\sqrt{2}} \quad (16)$$

$$|01\rangle \mapsto \frac{|10\rangle - |01\rangle}{\sqrt{2}}$$

$$|11\rangle \mapsto \frac{1}{2}(|20\rangle + |02\rangle).$$

Figure 4B:
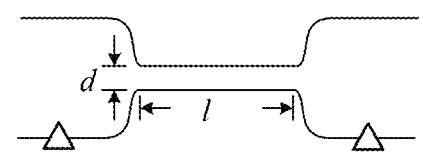
FIG. 4B shows, in schematic form, a physical implementation of the mode coupling of FIG. 4A in a photonic system that can be used in some embodiments.

The transfer matrix $T_r$ of Eq. (15) is related to the transfer matrix T of Eq. (9) by a phase shift on the second mode. This is schematically illustrated in FIG. 4A by the closed node 407 where mode coupler 416 couples to the first mode (line 212) and open node 408 where mode coupler 416 couples to the second mode (line 214). More specifically, $T_r$=sTs, and, as shown at the right-hand side of FIG. 4A, mode coupler 416 can be implemented using mode coupler 216 (as described above), with a preceding and following phase shift (denoted by open squares 418a, 418b). Thus, the transfer matrix $T_r$ can be implemented by the physical beam splitter shown in FIG. 4B, where the open triangles represent +i phase shifters.

Figure 5:
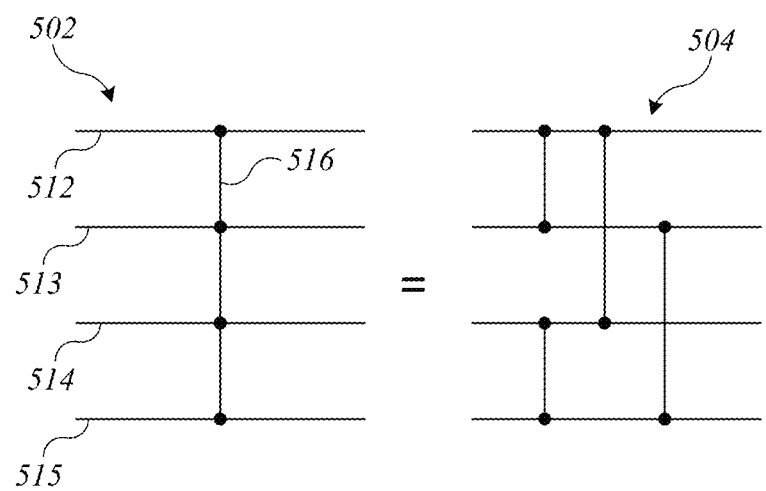
FIG. 5 shows a four-mode coupling scheme that implements a "spreader," or "mode-information erasure," transformation on four modes in accordance with some embodiments.

Similarly, networks of mode couplers and phase shifters can be used to implement couplings among more than two modes. For example, FIG. 5 shows a four-mode coupling scheme that implements a "spreader," or "mode-information erasure," transformation on four modes, i.e., it takes a photon in any one of the input modes and delocalizes the photon amongst each of the four output modes such that the photon has equal probability of being detected in any one of the four output modes. (The well-known Hadamard transformation is one example of a spreader transformation that can be applied to a set of $2^q$ modes for integer q.) As in FIG. 2A, the horizontal lines 512-515 correspond to modes, and the mode coupling is indicated by a vertical line 516 with nodes (dots) to identify the modes being coupled. In this case, four modes are coupled. Circuit notation 502 is an equivalent representation to circuit diagram 504, which is a network of first-order mode couplings. More generally, where a higher-order mode coupling can be implemented as a network of first-order mode couplings, a circuit notation similar to notation 502 (with an appropriate number of modes) may be used.

Figure 6:
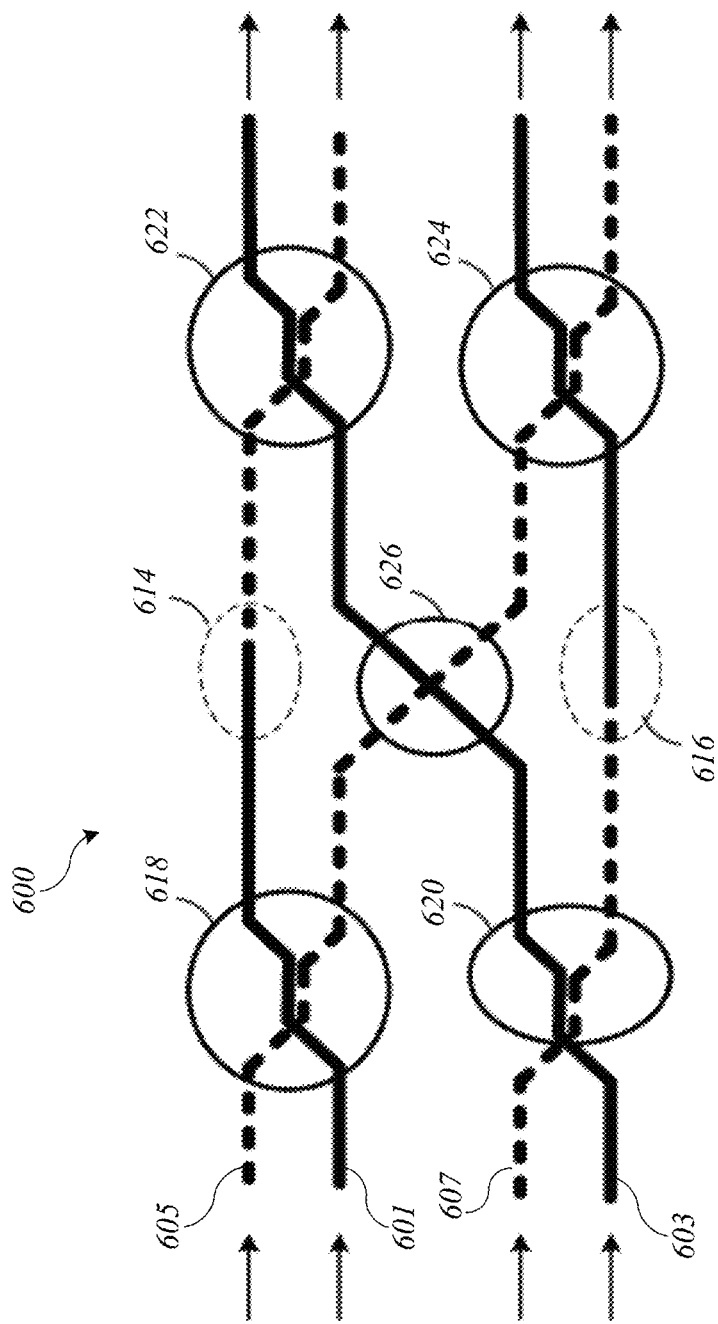
FIG. 6 illustrates an example optical device that can implement the four-mode mode-spreading transform shown schematically in FIG. 5 in accordance with some embodiments.

FIG. 6 illustrates an example optical device 600 that can implement the four-mode mode-spreading transform shown schematically in FIG. 5 in accordance with some embodiments. Optical device 600 includes a first set of optical waveguides 601, 603 formed in a first layer of material (represented by solid lines in FIG. 6) and a second set of optical waveguides 605, 607 formed in a second layer of material that is distinct and separate from the first layer of material (represented by dashed lines in FIG. 6). The second layer of material and the first layer of material are located at different heights on a substrate. One of ordinary skill will appreciate that an interferometer such as that shown in FIG. 6 could be implemented in a single layer if appropriate low loss waveguide crossing were employed.

At least one optical waveguide 601, 603 of the first set of optical waveguides is coupled with an optical waveguide 605, 607 of the second set of optical waveguides with any type of suitable optical coupler, e.g., the directional couplers described herein (e.g., the optical couplers shown in FIGS. 2B, 3A, 3B). For example, the optical device shown in FIG. 6 includes four optical couplers 618, 620, 622, and 624. Each optical coupler can have a coupling region in which two waveguides propagate in parallel. Although the two waveguides are illustrated in FIG. 6 as being offset from each other in the coupling region, the two waveguides may be positioned directly above and below each other in the coupling region without offset. In some embodiments, one or more of the optical couplers 618, 620, 622, and 624 are configured to have a coupling efficiency of approximately 50% between the two waveguides (e.g., a coupling efficiency between 49% and 51%, a coupling efficiency between 49.9% and 50.1%, a coupling efficiency between 49.99% and 50.01%, and a coupling efficiency of 50%, etc.). For example, the length of the two waveguides, the refractive indices of the two waveguides, the widths and heights of the two waveguides, the refractive index of the material located between two waveguides, and the distance between the two waveguides are selected to provide the coupling efficiency of 50% between the two waveguides. This allows the optical coupler to operate like a 50/50 beam splitter.

In addition, the optical device shown in FIG. 6 can include two inter-layer optical couplers 614 and 616. Optical coupler 614 allows transfer of light propagating in a waveguide on the first layer of material to a waveguide on the second layer of material, and optical coupler 616 allows transfer of light propagating in a waveguide on the second layer of material to a waveguide on the first layer of material. The optical couplers 614 and 616 allow optical waveguides located in at least two different layers to be used in a multi-channel optical coupler, which, in turn, enables a compact multi-channel optical coupler.

Furthermore, the optical device shown in FIG. 6 includes a non-coupling waveguide crossing region 626. In some implementations, the two waveguides (603 and 605 in this example) cross each other without having a parallel coupling region present at the crossing in the non-coupling waveguide crossing region 626 (e.g., the waveguides can be two straight waveguides that cross each other at a nearly 90-degree angle).

Those skilled in the art will understand that the foregoing examples are illustrative and that photonic circuits using beam splitters and/or phase shifters can be used to implement many different transfer matrices, including transfer matrices for real and imaginary Hadamard transforms of any order, discrete Fourier transforms, and the like. One class of photonic circuits, referred to herein as "spreader" or "mode-information erasure (MIE)" circuits, has the property that if the input is a single photon localized in one input mode, the circuit delocalizes the photon amongst each of a number of output modes such that the photon has equal probability of being detected in any one of the output modes. Examples of spreader or MIE circuits include circuits implementing Hadamard transfer matrices. (It is to be understood that spreader or MIE circuits may receive an input that is not a single photon localized in one input mode, and the behavior of the circuit in such cases depends on the particular transfer matrix implemented.) In other instances, photonic circuits can implement other transfer matrices, including transfer matrices that, for a single photon in one input mode, provide unequal probability of detecting the photon in different output modes.

Figure 7:
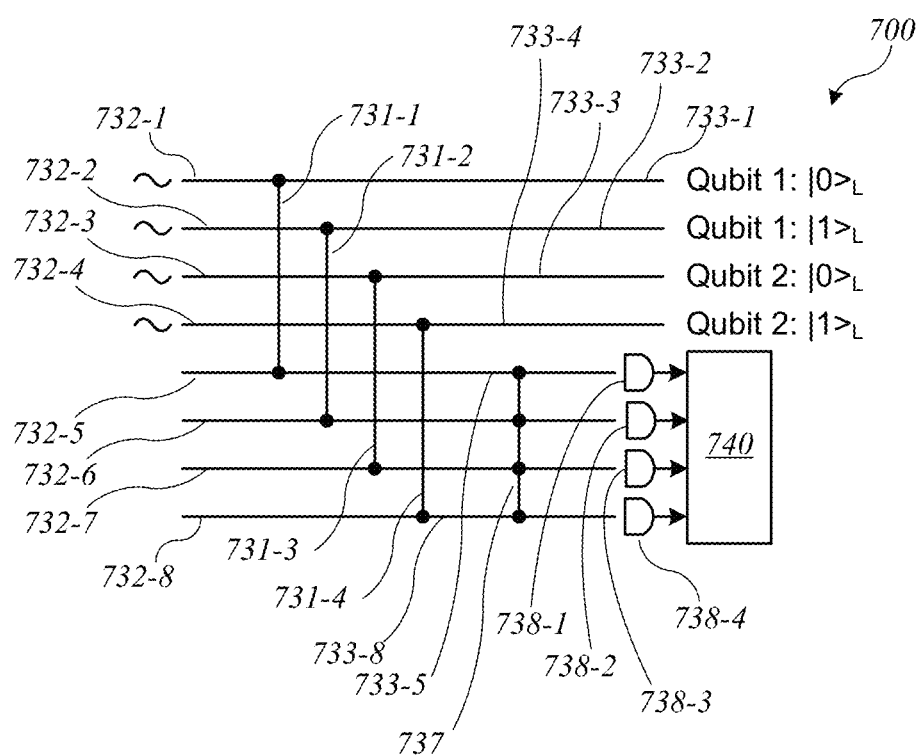
FIG. 7 shows a circuit diagram for a dual-rail-encoded Bell state generator that can be used in some embodiments.

In some embodiments, entangled states of multiple photonic qubits can be created by coupling (spatial) modes of two (or more) qubits and performing measurements on other modes. By way of example, FIG. 7 shows a circuit diagram for a Bell state generator 700 that can be used in some dual-rail-encoded photonic embodiments. In this example, waveguides (or modes) 732-1 through 732-4 are initially each occupied by a photon (indicated by a wavy line); waveguides (or modes) 732-5 through 732-8 are initially vacuum (unoccupied) modes. (Those skilled in the art will appreciate that other combinations of occupied and unoccupied modes can be used.)

A first-order mode coupling (e.g., implementing transfer matrix T of Eq. (9)) is performed on pairs of occupied and unoccupied modes as shown by mode couplers 731-1-731-4, with each mode coupler 731 having one input waveguide receiving a photon and one input waveguide receiving vacuum. Mode couplers 731 can be, e.g., 50/50 beam splitters so that, for example, a photon entering on waveguide 732-1 (or a photon entering on waveguide 732-5) has a 50% probability of emerging on either output of mode coupler 731-1. In the following description, mode couplers 731 may also be referred to as "directional couplers." Thereafter, a mode-information erasure coupling (e.g., implementing a four-mode mode spreading transform as shown in FIG. 5 or a second-order Hadamard transfer matrix) is performed on one output mode of each directional coupler 731 (in this example, waveguides 733-5 through 733-8 provide inputs to the mode-information erasure coupling), as shown by mode coupler 737. In the following description, mode coupler 737 may also be referred to as a "mode coupler network" or "Hadamard network." Waveguides 733-5 through 733-8 act as "heralding" modes that are measured and used to determine whether a Bell state was successfully generated on the four output waveguides 733-1 through 733-4. For instance, detectors 738-1 through 738-4 can be coupled to the waveguides 733-5 through 733-8 after second-order mode coupler 737. Each detector 738-1 through 738-4 can output a classical data signal (e.g., a voltage level on a conductor) indicating whether it detected a photon (or the number of photons detected). These outputs can be coupled to classical decision logic circuit 740, which determines whether a Bell state is present on the other four waveguides 733-1 through 733-4. For example, decision logic circuit 740 can be configured such that a Bell state is confirmed (also referred to as "success" of the Bell state generator) if and only if a single photon was detected by each of exactly two of detectors 738-1 through 738-4. In some embodiments, output modes (or waveguides) 733-1 through 733-4 can be mapped to the logical states of two qubits (Qubit 1 and Qubit 2), as indicated in FIG. 7. Specifically, in this example, the logical state of Qubit 1 is based on occupancy of modes 733-1 and 733-2, and the logical state of Qubit 2 is based on occupancy of modes 733-3 and 733-4. It should be noted that generation of a Bell state by Bell state generator 700 is a non-deterministic (or stochastic) process; that is, inputting four photons as shown does not guarantee that a Bell state will be created on modes 733-1 through 733-4. In one implementation, the probability of success is 4/32; in another implementation, the success probability is 3/16. It should also be noted that there are six detection patterns with one photon in each of two of detectors 738, and that Bell state generator 700 can be expected to produce a Bell state in all six possible arrangements of the four output modes. For a given choice of assignment of modes to dual-rail qubits (e.g., as shown in FIG. 7), Bell state generator 700 can produce any of the four two-qubit Bell states defined in Eqs. (3)-(6) above, as well as a "non-qubit" maximally entangled state. Different detection patterns at detectors 738 can correspond to different types of Bell states being produced. In some embodiments, based on the particular detection pattern at detectors 738, mode swaps can be selectably applied to modes 733 in order to cast the Bell state into a particular type (e.g., a particular one of the four two-qubit Bell states defined above). In some embodiments, the mode swap can be subsumed into subsequent operations without the need for active optical switches to implement selectable mode swapping at the output of Bell state generator 700.

In some embodiments, it is desirable to form cluster states of multiple entangled qubits (typically 3 or more qubits, although the Bell state can be understood as a cluster state of two qubits). One technique for forming larger entangled systems is through the use of an entangling measurement, which is a projective measurement that can be employed to create entanglement between systems of qubits. As used herein, "fusion" (or "a fusion operation" or "fusing") refers to a two-qubit entangling measurement. A "fusion gate" is a structure that receives two input qubits, each of which is typically part of an entangled system. The fusion gate performs a projective measurement operation on the input qubits that produces either one ("type I fusion") or zero ("type II fusion") output qubits in a manner such that the initial two entangled systems are fused into a single entangled system. Fusion gates are specific examples of a general class of two-qubit entangling measurements and are particularly suited for photonic architectures. Examples of type I and type II fusion gates will now be described.

Figure 8A:
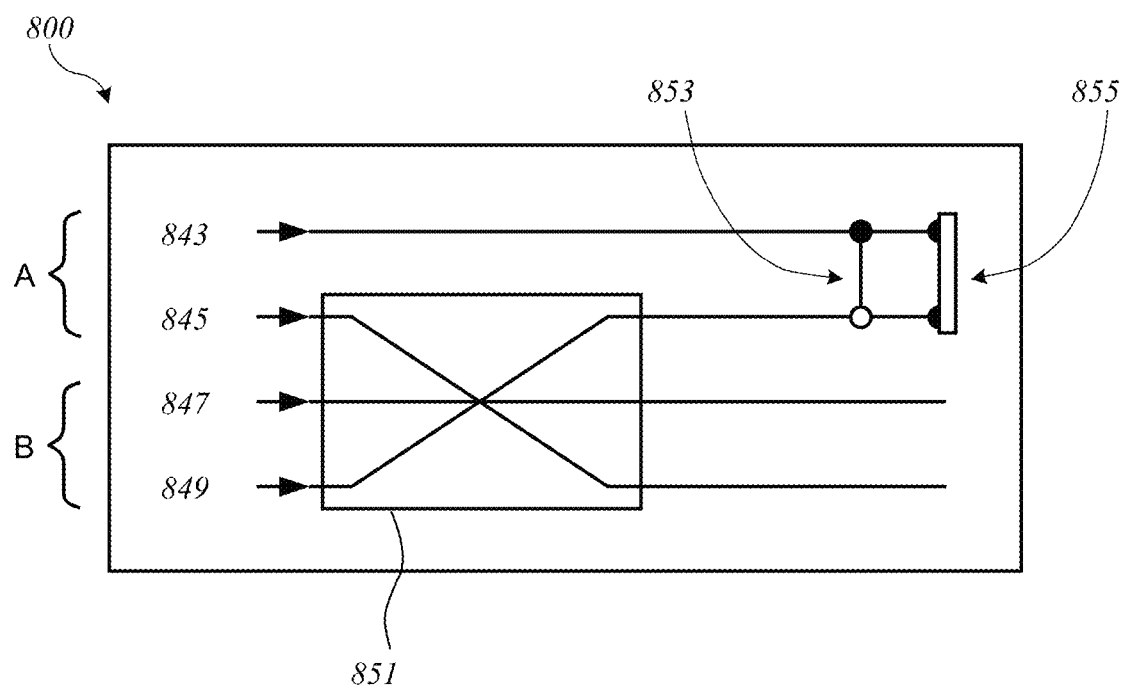
FIG. 8A shows a circuit diagram for a dual-rail-encoded type I fusion gate that can be used in some embodiments.

FIG. 8A shows a circuit diagram illustrating a type I fusion gate 800 in accordance with some embodiments. The diagram shown in FIG. 8A is schematic with each horizontal line representing a mode of a quantum system, e.g., a photon. In a dual-rail encoding, each pair of modes represents a qubit. In a photonic implementation of the gate the modes in diagrams such as that shown in FIG. 8A can be physically realized using single photons in photonic waveguides. Most generally, a type I fusion gate like that shown in FIG. 8A takes qubit A (physically realized, e.g., by photon modes 843 and 845) and qubit B (physically realized, e.g., by photon modes 847 and 849) as input and outputs a single "fused" qubit that inherits the entanglement with other qubits that were previously entangled with either (or both) of input qubit A or input qubit B.

Figure 8B:
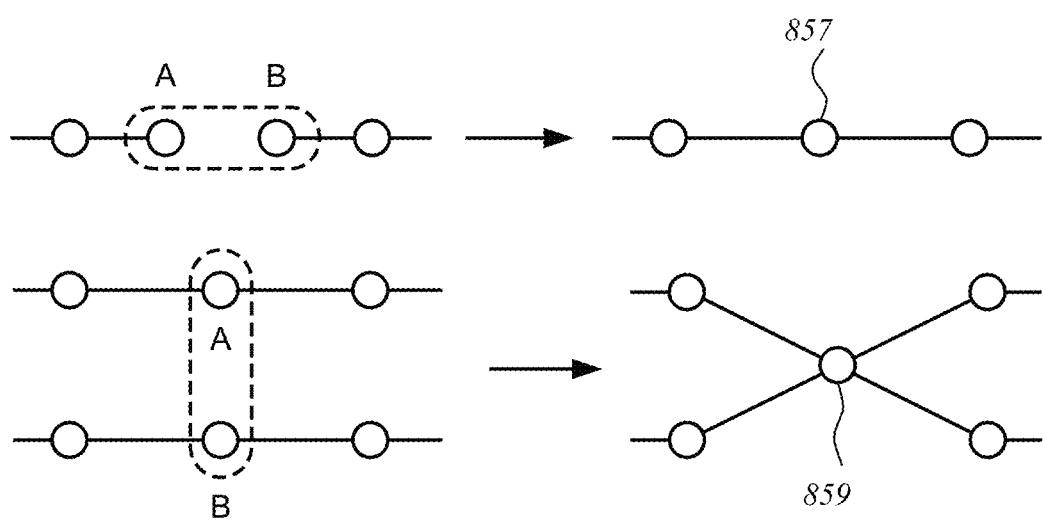
FIG. 8B shows example results of type I fusion operations using the gate of FIG. 8A.

For example, FIG. 8B shows the result of type-I fusing of two qubits A and B that are each, respectively, a qubit located at the end (i.e., a leaf) of some longer entangled cluster state (only a portion of which is shown). The qubit 857 that remains after the fusion operation inherits the entangling bonds from the original qubits A and B thereby creating a larger linear cluster state. FIG. 8B also shows the result of type-I fusing of two qubits A and B that are each, respectively, an internal qubit that belongs to some longer entangled cluster of qubits (only a portion of which is shown). As before, the qubit 859 that remains after fusion inherits the entangling bonds from the original qubits A and B thereby creating a fused cluster state. In this case, the qubit that remains after the fusion operation is entangled with the larger cluster by way of four other nearest neighbor qubits as shown.

Returning to the schematic illustration of type I fusion gate 800 shown in FIG. 8A, qubit A is dual-rail encoded by modes 843 and 845, and qubit B is dual-rail encoded by modes 847 and 849. For example, in the case of path-encoded photonic qubits, the logical zero state of qubit A (denoted $|0\rangle_A$) occurs when mode 843 is a photonic waveguide that includes a single photon and mode 845 is a photonic waveguide that includes zero photons (and likewise for qubit B). Thus, type I fusion gate 800 can take as input two dual-rail-encoded photon qubits thereby resulting in a total of four input modes (e.g., modes 843, 845, 847, and 849). To accomplish the fusion operation, a mode coupler (e.g., 50/50 beam splitter) 853 is applied between a mode of each of the input qubits, e.g., between mode 843 and mode 849 before performing a detection operation on both modes using photon detectors 855 (which includes two distinct photon detectors coupled to modes 843 and 849 respectively). In addition, to ensure that the output modes are adjacently positioned, a mode swap operation 851 can be applied that swaps the position of the second mode of qubit A (mode 845) with the position the second mode of qubit B (mode 849). In some embodiments, mode swapping can be accomplished through a physical waveguide crossing as described above or by one or more photonic switches or by any other type of physical mode swap.

FIG. 8A shows only an example arrangement for a type I fusion gate and one of ordinary skill will appreciate that the position of the mode coupler and the presence of the mode swap region 851 can be altered without departing from the scope of the present disclosure. For example, beam splitter 853 can be applied between modes 845 and 847. Mode swaps are optional and are not necessary if qubits having non-adjacent modes can be dealt with, e.g., by tracking which modes belong to which qubits by storing this information in a classical memory.

Type I fusion gate 800 is a nondeterministic gate, i.e., the fusion operation succeeds with a certain probability less than 1, and in other cases the quantum state that results is not a larger cluster state that comprises the original cluster states fused together to a larger cluster state. More specifically, gate 800 "succeeds," with probability 50%, when only one photon is detected by detectors 855, and "fails" if zero or two photons are detected by detectors 855. When the gate succeeds, the two cluster states that qubits A and B were a part of become fused into a single larger cluster state with a fused qubit remaining as the qubit that links the two previously unlinked cluster states (see, e.g., FIG. 8B). However, when the fusion gate fails, it has the effect of removing both qubits from the original cluster resource states without generating a larger fused state.

Figure 9A:
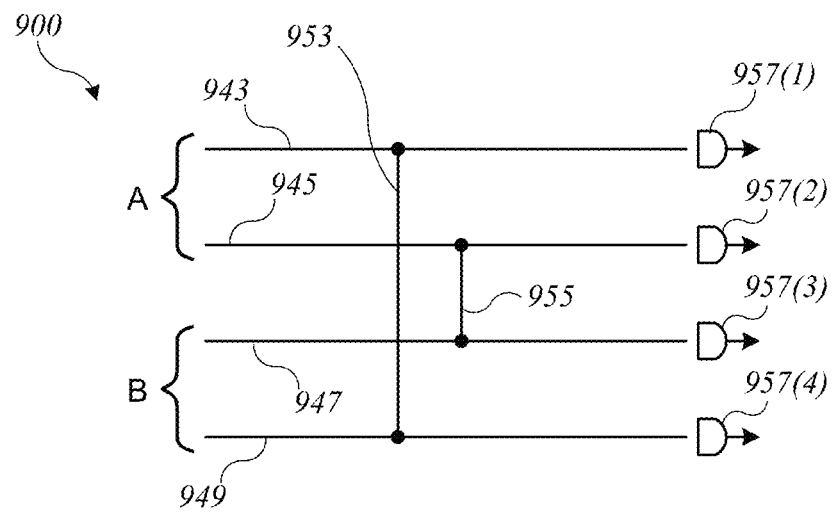
FIG. 9A shows a circuit diagram for a dual-rail-encoded type II fusion gate that can be used in some embodiments.

FIG. 9A shows a circuit diagram illustrating a type II fusion gate 900 in accordance with some embodiments. Like other diagrams herein, the diagram shown in FIG. 9A is schematic with each horizontal line representing a mode of a quantum system, e.g., a photon. In a dual-rail encoding, each pair of modes represents a qubit. In a photonic implementation of the gate the modes in diagrams such as that shown in FIG. 9A can be physically realized using single photons in photonic waveguides. Most generally, a type II fusion gate such as gate 900 takes qubit A (physically realized, e.g., by photon modes 943 and 945) and qubit B (physically realized, e.g., by photon modes 947 and 949) as input and outputs a quantum state that inherits the entanglement with other qubits that were previously entangled with either (or both) of input qubit A or input qubit B. (For type II fusion, if the input quantum state had N qubits, the output quantum state has N−2 qubits. This is different from type I fusion where an input quantum state of N qubits leads to an output quantum state having N−1 qubits.)

Figure 9B:
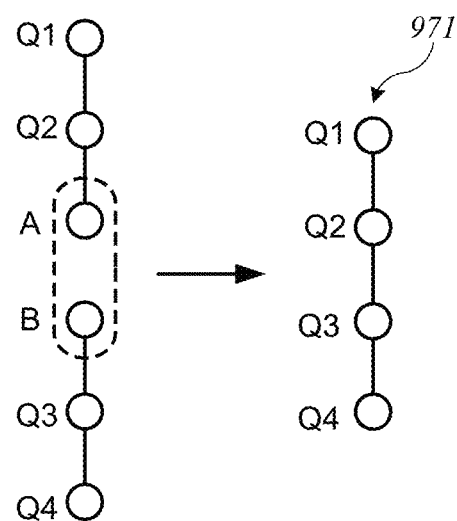
FIG. 9B shows an example result of a type II fusion operation using the gate of FIG. 9A.

For example, FIG. 9B shows the result of type-II fusing of two qubits A and B that are each, respectively, a qubit located at the end (i.e., a leaf) of some longer entangled cluster state (only a portion of which is shown). The resulting qubit system 971 inherits the entangling bonds from qubits A and B thereby creating a larger linear cluster state.

Returning to the schematic illustration of type II fusion gate 900 shown in FIG. 9A, qubit A is dual-rail encoded by modes 943 and 945, and qubit B is dual-rail encoded by modes 947 and 949. For example, in the case of path encoded photonic qubits, the logical zero state of qubit A (denoted $|0\rangle_A$) occurs when mode 943 is a photonic waveguide that includes a single photon and mode 945 is a photonic waveguide that includes zero photons (and likewise for qubit B). Thus, type II fusion gate 900 takes as input two dual-rail-encoded photon qubits thereby resulting in a total of four input modes (e.g., modes 943, 945, 947, and 949). To accomplish the fusion operation, a first mode coupler (e.g., 50/50 beam splitter) 953 is applied between a mode of each of the input qubits, e.g., between mode 943 and mode 949, and a second mode coupler (e.g., 50/50 beam splitter) 955 is applied between the other modes of each of the input qubits, e.g., between modes 945 and 947. A detection operation is performed on all four modes using photon detectors 957(1)-957(4). In some embodiments, mode swap operations (not shown in FIG. 9A) can be performed to place modes in adjacent positions prior to mode coupling. In some embodiments, mode swapping can be accomplished through a physical waveguide crossing as described above or by one or more photonic switches or by any other type of physical mode swap. Mode swaps are optional and are not necessary if qubits having non-adjacent modes can be dealt with, e.g., by tracking which modes belong to which qubits by storing this information in a classical memory.

FIG. 9A shows only an example arrangement for the type II fusion gate and one of ordinary skill will appreciate that the positions of the mode couplers and the presence or absence of mode swap regions can be altered without departing from the scope of the present disclosure.

The type II fusion gate shown in FIG. 9A is a nondeterministic gate, i.e., the fusion operation succeeds with a certain probability less than 1, and in other cases the quantum state that results is not a larger cluster state that comprises the original cluster states fused together to a larger cluster state. More specifically, the gate "succeeds" in the case where one photon is detected by one of detectors 957(1) and 957(4) and one photon is detected by one of detectors 957(2) and 957(3); in all other cases, the gate "fails." When the gate succeeds, the two cluster states that qubits A and B were a part of become fused into a single larger cluster state; unlike type-I fusion, no fused qubit remains (compare FIG. 8B and FIG. 9B). When the fusion gate fails, it has the effect of removing both qubits from the original cluster resource states without generating a larger fused state.

Figure 10:
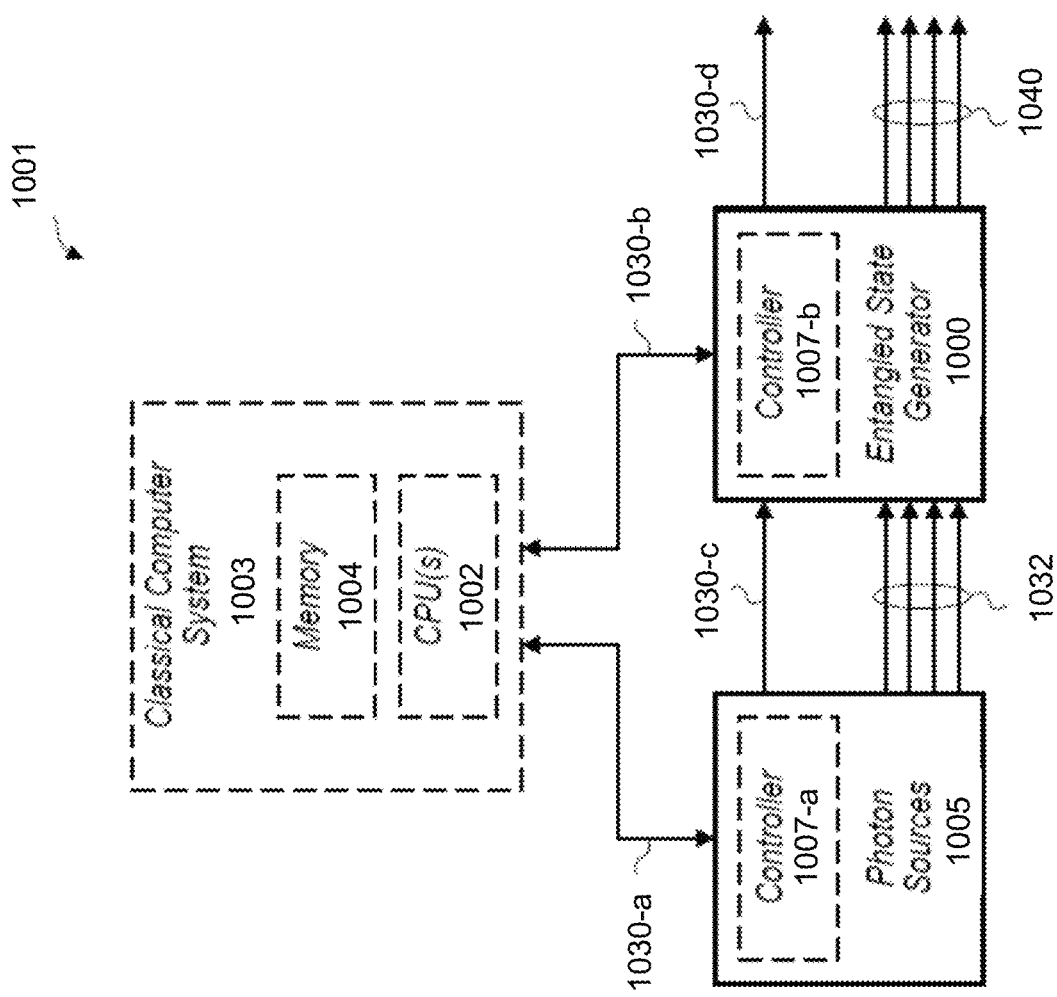
FIG. 10 illustrates an example of a qubit entangling system in accordance with some embodiments.

FIG. 10 illustrates an example of a qubit entangling system 1001 in accordance with some embodiments. Such a system can be used to generate qubits (e.g., photons) in an entangled state (e.g., a GHZ state, Bell pair, and the like), in accordance with some embodiments.

In an illustrative photonic architecture, qubit entangling system 1001 can include a photon source module 1005 that is optically connected to entangled state generator 1000. Both the photon source module 1005 and the entangled state generator 1000 may be coupled to a classical processing system 1003 such that the classical processing system 1003 can communicate and/or control (e.g., via the classical information channels 1030a-b) the photon source module 1005 and/or the entangled state generator 1000. Photon source module 1005 may include a collection of single-photon sources that can provide output photons to entangled state generator 1000 by way of interconnecting waveguides 1032. Entangled state generator 1000 may receive the output photons and convert them to one or more entangled photonic states and then output these entangled photonic states into output waveguides 1040. In some embodiments, output waveguide 1040 can be coupled to some downstream circuit that may use the entangled states for performing a quantum computation. For example, the entangled states generated by the entangled state generator 1000 may be used as resources for a downstream quantum optical circuit (not shown).

In some embodiments, system 1001 may include classical channels 1030 (e.g., classical channels 1030-a through 1030-d) for interconnecting and providing classical information between components. It should be noted that classical channels 1030-a through 1030-d need not all be the same. For example, classical channel 1030-a through 1030-c may comprise a bi-directional communication bus carrying one or more reference signals, e.g., one or more clock signals, one or more control signals, or any other signal that carries classical information, e.g., heralding signals, photon detector readout signals, and the like.

In some embodiments, qubit entangling system 1001 includes the classical computer system 1003 that communicates with and/or controls the photon source module 1005 and/or the entangled state generator 1000. For example, in some embodiments, classical computer system 1003 can be used to configure one or more circuits, e.g., using system clock that may be provided to photon sources 1005 and entangled state generator 1000 as well as any downstream quantum photonic circuits used for performing quantum computation. In some embodiments, the quantum photonic circuits can include optical circuits, electrical circuits, or any other types of circuits. In some embodiments, classical computer system 1003 includes memory 1004, one or more processor(s) 1002, a power supply, an input/output (I/O) subsystem, and a communication bus or interconnecting these components. The processor(s) 1002 may execute modules, programs, and/or instructions stored in memory 1004 and thereby perform processing operations.

In some embodiments, memory 1004 stores one or more programs (e.g., sets of instructions) and/or data structures. For example, in some embodiments, entangled state generator 1000 can attempt to produce an entangled state over successive stages, any one of which may be successful in producing an entangled state. In some embodiments, memory 1004 stores one or more programs for determining whether a respective stage was successful and configuring the entangled state generator 1000 accordingly (e.g., by configuring entangled state generator 1000 to switch the photons to an output if the stage was successful, or pass the photons to the next stage of the entangled state generator 1000 if the stage was not yet successful). To that end, in some embodiments, memory 1004 stores detection patterns (described below) from which the classical computing system 1003 may determine whether a stage was successful. In addition, memory 1004 can store settings that are provided to the various configurable components (e.g., switches) described herein that are configured by, e.g., setting one or more phase shifts for the component.

In some embodiments, some or all of the above-described functions may be implemented with hardware circuits on photon source module 1005 and/or entangled state generator 1000. For example, in some embodiments, photon source module 1005 includes one or more controllers 1007-a (e.g., logic controllers) (e.g., which may comprise field programmable gate arrays (FPGAs), application specific integrated circuits (ASICS), a "system on a chip" that includes classical processors and memory, or the like). In some embodiments, controller 1007-a determines whether photon source module 1005 was successful (e.g., for a given attempt on a given clock cycle, described below) and outputs a reference signal indicating whether photon source module 1005 was successful. For example, in some embodiments, controller 1007-a outputs a logical high value to classical channel 1030-a and/or classical channel 1030-c when photon source module 1005 is successful and outputs a logical low value to classical channel 1030-a and/or classical channel 1030-c when photon source module 1005 is not successful. In some embodiments, the output of control 1007-a may be used to configure hardware in controller 1007-b.

Similarly, in some embodiments, entangled state generator 1000 includes one or more controllers 1007-b (e.g., logical controllers) (e.g., which may comprise field programmable gate arrays (FPGAs), application specific integrated circuits (ASICS), or the like) that determine whether a respective stage of entangled state generator 1000 has succeeded, perform the switching logic described above, and output a reference signal to classical channels 1030-b and/or 1030-d to inform other components as to whether the entangled state generator 400 has succeeded.

In some embodiments, a system clock signal can be provided to photon source module 1005 and entangled state generator 1000 via an external source (not shown) or by classical computing system 1003 generates via classical channels 1030-a and/or 1030-b. In some embodiments, the system clock signal provided to photon source module 1005 triggers photon source module 1005 to attempt to output one photon per waveguide. In some embodiments, the system clock signal provided to entangled state generator 1000 triggers, or gates, sets of detectors in entangled state generator 1000 to attempt to detect photons. For example, in some embodiments, triggering a set of detectors in entangled state generator 1000 to attempt to detect photons includes gating the set of detectors.

It should be noted that, in some embodiments, photon source module 1005 and entangled state generator 1000 may have internal clocks. For example, photon source module 1005 may have an internal clock generated and/or used by controller 1007-a and entangled state generator 1000 has an internal clock generated and/or used by controller 1007-b. In some embodiments, the internal clock of photon source module 1005 and/or entangled state generator 1000 is synchronized to an external clock (e.g., the system clock provided by classical computer system 1003) (e.g., through a phase-locked loop). In some embodiments, any of the internal clocks may themselves be used as the system clock, e.g., an internal clock of the photon source may be distributed to other components in the system and used as the master/system clock.

In some embodiments, photon source module 1005 includes a plurality of probabilistic photon sources that may be spatially and/or temporally multiplexed, i.e., a so-called multiplexed single photon source. In one example of such a source, the source is driven by a pump, e.g., a light pulse, that is coupled into an optical resonator that, through some nonlinear process (e.g., spontaneous four wave mixing, second harmonic generation, and the like) may generate zero, one, or more photons. As used herein, the term "attempt" is used to refer to the act of driving a photon source with some sort of driving signal, e.g., a pump pulse, that may produce output photons non-deterministically (i.e., in response to the driving signal, the probability that the photon source will generate one or more photons may be less than 1). In some embodiments, a respective photon source may be most likely to, on a respective attempt, produce zero photons (e.g., there may be a 90% probability of producing zero photons per attempt to produce a single-photon). The second most likely result for an attempt may be production of a single-photon (e.g., there may be a 9% probability of producing a single-photon per attempt to produce a single-photon). The third most likely result for an attempt may be production of two photons (e.g., there may be an approximately 1% probability of producing two photons per attempt to produce a single photon). In some circumstances, there may be less than a 1% probability of producing more than two photons.

In some embodiments, the apparent efficiency of the photon sources may be increased by using a plurality of single-photon sources and multiplexing the outputs of the plurality of photon sources.

The precise type of photon source used is not critical and any type of source can be used, employing any photon generating process, such as spontaneous four wave mixing (SPFW), spontaneous parametric down-conversion (SPDC), or any other process. Other classes of sources that do not necessarily require a nonlinear material can also be employed, such as those that employ atomic and/or artificial atomic systems, e.g., quantum dot sources, color centers in crystals, and the like. In some cases, sources may or may be coupled to photonic cavities, e.g., as can be the case for artificial atomic systems such as quantum dots coupled to cavities. Other types of photon sources also exist for SPWM and SPDC, such as optomechanical systems and the like. In some examples the photon sources can emit multiple photons already in an entangled state in which case the entangled state generator 400 may not be necessary, or alternatively may take the entangled states as input and generate even larger entangled states.

For the sake of illustration, an example which employs spatial multiplexing of several non-deterministic is described as an example of a mux photon source. However, many different spatial mux architectures are possible without departing from the scope of the present disclosure. Temporal muxing can also be implemented instead of or in combination with spatial multiplexing. mux schemes that employ log-tree, generalized Mach-Zehnder interferometers, multimode interferometers, chained sources, chained sources with dump-the-pump schemes, asymmetric multi-crystal single photon sources, or any other type of mux architecture can be used. In some embodiments, the photon source can employ a mux scheme with quantum feedback control and the like.

The foregoing description provides an example of how photonic circuits can be used to implement physical qubits and operations on physical qubits using mode coupling between waveguides. In these examples, a pair of modes can be used to represent each physical qubit. Examples described below can be implemented using similar photonic circuit elements.

The following sections describe examples of optical circuits and multiplexing techniques that can be used to spatially (and temporally) align photons. Such circuits and techniques can be applied in a wide variety of photonic systems and circuits.

2. SPATIAL MULTIPLEXING OF PHOTONS

If photons can be reliably generated on demand (e.g., in response to pump pulses as described above), multiple photons can be provided simultaneously to a circuit such as Bell state generator 700 simply by providing an appropriate number of photon sources (four in the case of Bell state generator 700) and pumping (or otherwise triggering) all of the photon sources simultaneously. However, as described above, known single-photon sources operate non-deterministically, and a given photon source may or may not produce a photon pair in response to a given pump pulse. If, for example, four non-deterministic photon sources are used to provide photons to input waveguides 732-1 through 732-4 of Bell state generator 700, even if all four sources are pumped for each time bin, the probability of four photons arriving on input waveguides 732-1 through 732-4 in any given time bin would be less than 1.

Figure 11:
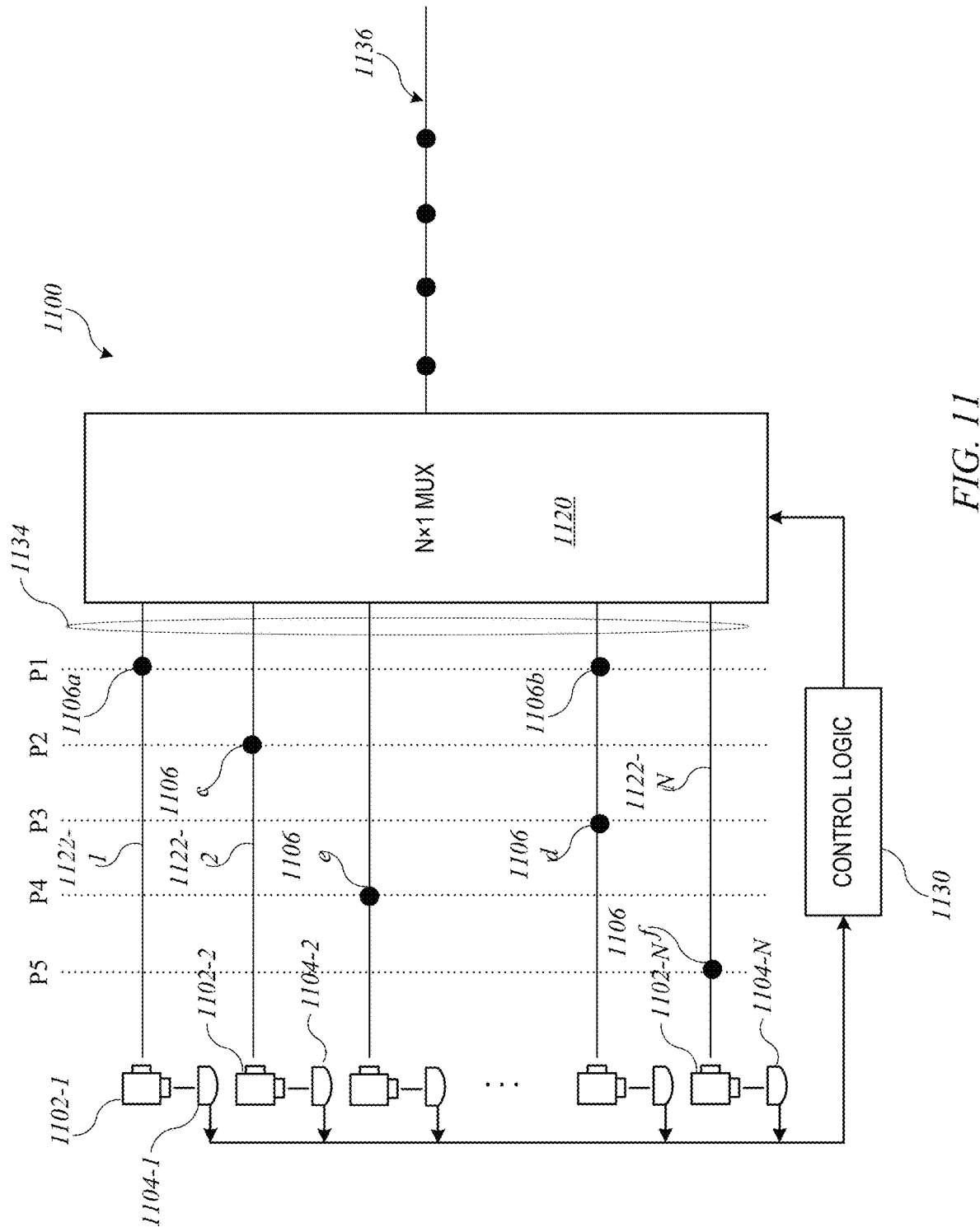
FIG. 11 shows an example of an N×1 spatial multiplexing circuit for a set of N photon sources.

One technique to improve the likelihood of simultaneously obtaining photons from each of a set of non-deterministic photon sources involves spatial multiplexing of multiple photon sources. FIG. 11 shows an example of an N×1 spatial multiplexing circuit 1100 for a set of N photon sources 1102-1 through 1102-N for some number N, where N≥2. Each photon source 1102 is a different physical device that can produce a photon pair in response to a pump pulse. For instance, each photon source 1102 can be a heralded single photon source as described above. Photon sources 1102 can be pumped repeatedly, and each instance of pumping photon sources 1102 can define a time bin (or temporal mode). For each time bin, each photon source 1102 might or might not produce a photon pair. Each photon source 1102 has an associated detector 1104 and an associated signaling waveguide 1122. In any time bin where a particular photon source 1102 does produce a photon pair, one photon propagates through the associated signaling waveguide 1122 while the other photon is detected by the associated detector 1104.

In each time bin, each photon source 1102 might or might not generate a photon. Dots 1106a-1106f show an example of photons that might be generated during different time bins P1-P5. FIG. 11 can be regarded as a snapshot view, with photons 1106 produced during different time bins appearing at different locations along the waveguides 1122.

An N×1 multiplexer (or "mux") 1120 can be an active optical switching circuit that selectably couples one of N input waveguides 1134 to an output waveguide 1136, and selectable optical coupling can be provided using active optical switches or other active optical components that can be controlled to either allow or block propagation of photons. For example, N×1 mux 1120 can be implemented as an N×1 generalized Mach-Zehnder interferometer (GMZI). An N×M GMZI is an optical circuit that can receive photons on a set of N input waveguides and control a set of active phase shifters to selectably couple M of the received photons to a set of M output waveguides. (In the case of mux 1120, M=1.) Additional description of GMZI implementations can be found below. N×1 mux 1120 can be controlled by control logic 1130, which can be a conventional electronic logic circuit. Control logic 1130 can receive signals from each of detectors 1104 that indicate, for each time bin, whether a photon was or was not detected by each detector 1104. Accordingly, control logic 1130 can determine which photon sources 1102 produced photons during a given time bin (and therefore which input waveguides 1134 are carrying photons for that time bin). For each time bin, control logic 1130 can control N×1 mux 1120 to couple one input waveguide that has a photon to output waveguide 1136. For example, a GMZI includes a set of active phase shifters that can be controlled to apply variable phase shifts along different optical paths, creating either constructive or destructive interference, and control logic 1130 can generate control signals to set the state of each active phase shifter in a GMZI implementing N×1 mux 1120 to provide the desired coupling.

The time bin can be as long or short as desired, based on characteristics of the optical circuit, variability in the timing of generating photons in single photon sources 1102, etc. In some instances, an interval between time bins may be determined based on the speed at which N×1 mux 1120 can be switched, on a recovery time for photon sources 1102 and/or detectors 1104, operating speed of circuits downstream of N×1 mux 1120, or other design considerations to allow each time bin to be treated as an independent temporal mode.

As noted above, the behavior of photon sources 1102 may be non-deterministic. That is, during a given time bin, the probability of a photon being generated by a given photon source 1102 can be represented as $p_s$, where $p_s<1$. For photon sources of this type, multiplexing as shown in FIG. 11 provides the ability to increase the probability of successfully producing a photon in a given time bin. As shown in FIG. 11, if N non-deterministic single-photon sources are used, with one photon source coupled to each input of N×1 mux 1120, and if each photon source has probability $p_s$ of generating a photon (for a given time bin), then the probability that N×1 mux 1120 receives at least one photon is $p_{mux}=1-(1-p_s)^N$. Thus, for a given type of photon source 1102, a desired probability $p_{mux}$ of providing one photon per time bin to output waveguide 1136 can, at least in principle, be achieved by a suitable choice of N. (As a practical matter, some combinations of $p_s$ and $p_{mux}$ may require a prohibitively large number N of photon sources.)

In some applications, a downstream circuit may require multiple photons as inputs. For example Bell state generator 700 of FIG. 7 can produce a Bell state only if four photons are input simultaneously. Accordingly, to reliably provide four input photons per time bin to Bell state generator 700, four instances of circuit 1100 can be provided, with each instance having an output 1136 coupled to a different one of input waveguides 732-1 through 732-4.

3. RASTER MUX CIRCUITS

Figure 12:
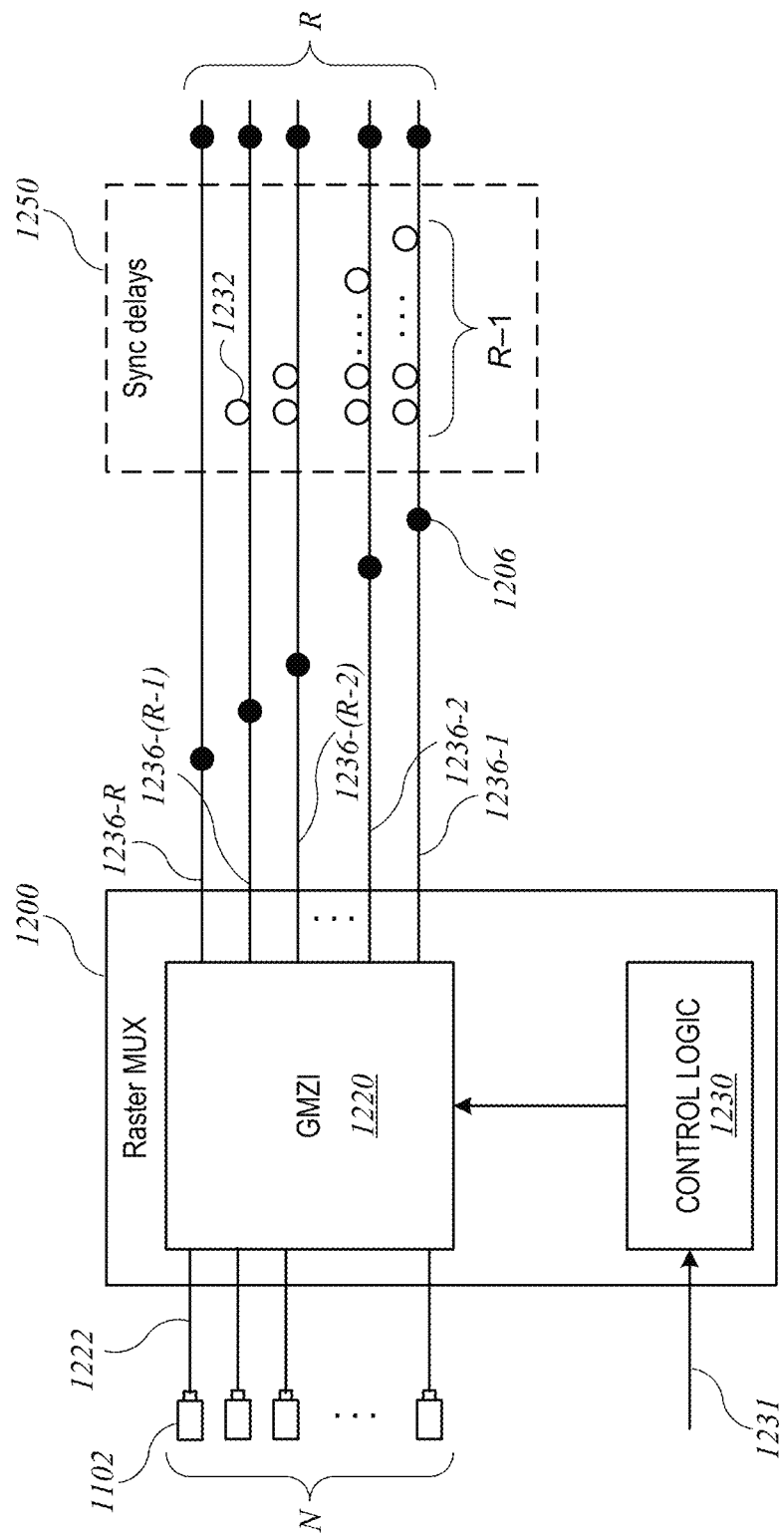
FIG. 12 shows a simplified schematic view of a raster multiplexing circuit according to some embodiments.

Providing four instances of circuit 1100 may consume a significant amount of area, especially when N is large. According to some embodiments, circuit area can be reduced using a technique referred to as "raster multiplexing" (or "raster mux" or "rastering") that uses N input photon sources to produce R simultaneous output photons on R output waveguides. FIG. 12 shows a simplified schematic view of a raster mux circuit 1200 according to some embodiments. Raster mux circuit 1200 includes a GMZI 1220 that, for each time bin, selects one of N input paths 1222 to optically couple to an output path; however, instead of just one output path, GMZI 1220 has R selectable output paths 1236.

Control logic 1230 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, GMZI 1220 is coupled to an off-chip classical computer having a processor and a memory, and the off-chip classical computer is programmed to perform some or all of the operations of control logic 1230. In some embodiments, control logic 1230 (which can include on-chip and/or off-chip components) can be provided with program code providing decision rules to select control signals for GMZI 1220, and control logic 1230 can execute the program code and generate appropriate control signals.

In operation, for each time bin, control logic 1230 selects one of the input (spatial) paths 1222 as an active input path to optically couple to an active one of output paths 1236. Selection of an input path can be based on signals received by control logic 1230 (indicated by input arrow 1231) that indicate which of input paths 1222 have a propagating photon. For instance, as described above with reference to FIG. 11, each photon source 1102 can have an associated detector 1106. Control logic 1230 can receive heralding signals from detectors 1106 and select an active input path based on the heralding signals. In addition to selecting an active input path, control logic 1230 selects one of output paths 1236 as an active output path on a rotating or cyclic basis. For example, for each time bin, control logic 1230 can increment a counter and can select one of output paths 1236 based on the counter value (modulo R). For instance, output path 1236-1 can be selected for a first time bin, output path 1236-2 for the next time bin, and so on until output path 1236-R is selected for the Rth time bin. In this manner, raster mux circuit 1200 can produce a set of R photons for a set of R time bins, with each photon being output on a different one of the R output paths 1236 in a different time bin, in a known (controlled) order. A set of R time bins is sometimes referred to herein as a "raster period."

In some embodiments, the set of R output photons can be synchronized in time by introducing appropriate synchronization delays, as shown in sync delay circuit 1250. Loops 1232 indicate an amount of delay introduced on each optical path. For instance, each loop 1232 can indicate one added time bin of delay. Delay can be implemented, e.g., by introducing additional lengths of optical waveguide material or by other techniques that lengthen the optical path. In the example shown, sync delay box adds R−1 time bins of delay to output path 1236-1, R−2 time bins to output path 1236-2, and so on until output line 1236-R has no added time bins of delay. Accordingly, the R photons (indicated by dots 1206) output onto different output paths 1236 for successive time bins can arrive simultaneously at the outputs of sync delay circuit 1250. In this manner, a single instance of raster mux circuit 1200 with sync delay circuit 1250 can provide a set of R simultaneous photons on R waveguides. Raster mux circuit 1200 can be characterized as an "N×R raster mux circuit," indicating N inputs and R outputs. It should be noted that if the inputs are provided to raster mux circuit 1200 according to a given time bin time t (e.g., a pump pulse period for photon sources 1102), a set of outputs is generated in time Rt.

Circuit 1200 is illustrative, and variations and modifications are possible. In some embodiments, GMZI 1220 can be replaced with other active switching circuits that can selectably couple one of N input paths to one of R output paths. If desired, the output photons can be synchronized by adding appropriate delay to each output path, e.g., using sync delay circuit 1250.

Figure 13:
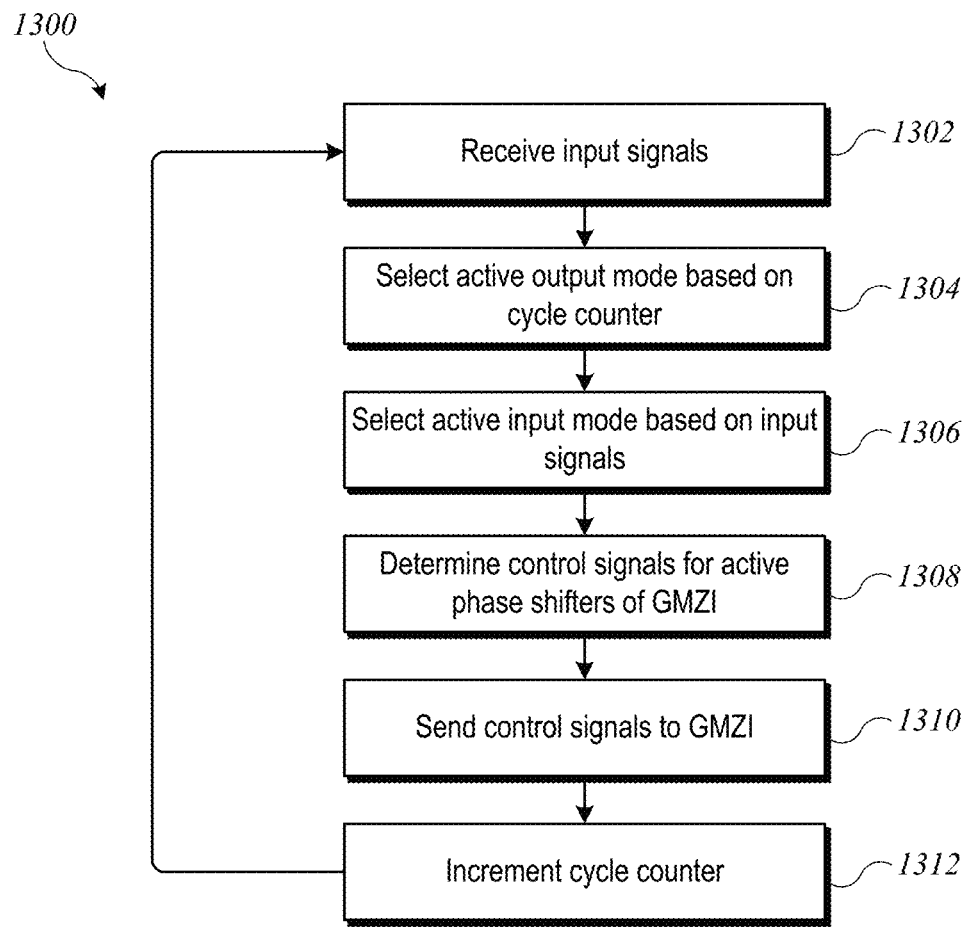
FIG. 13 shows a flow diagram of a process according to some embodiments.

FIG. 13 shows a flow diagram of a process 1300 that can be implemented in control logic 1230 according to some embodiments. At block 1302, control logic 1230 can receive input signals 1231 indicating which of the N input paths 1222 of GMZI 1220 have photons arriving in the current time bin. For instance as shown in FIG. 11, photon sources 1102 can have associated detectors 1106 that generate signals (e.g., classical digital logic signals) indicating whether a photon was detected. This signal can be used by control logic 1230 as an indicator of a photon on the corresponding input path 1222.

At block 1304, control logic 1230 can select an active output path (one of output paths 1236) based on a cycle counter. For instance, control logic 1230 can implement a cyclic counter with R values, and the active output path can be selected based on the current value of the cyclic counter. Other selection logic can be used, provided that output paths 1236 are selected in a rotating or cyclic order such that each output path 1236 is selected once for each group of R consecutive time bins (or raster period). The same selection pattern can be repeated for each raster period.

At block 1306, control logic 1230 can select an active input path (waveguide) based on the input signals received at block 1302. For example, control logic 1230 can select one input path 1222 that is occupied by a photon (in the current time bin) as an active input path. For time bins where only one input path 1222 has a photon, then control logic 1230 can select that path as the active path. For time bins where multiple input paths 1222 are occupied, control logic 1230 can apply a prioritization rule to select one of the input paths that is occupied. For instance, the input paths can be assigned numbers, and the lowest-numbered input path that is occupied can be selected. Other prioritization rules can be substituted, as long as only one active input path is selected for each time bin. In some embodiments, the prioritization rules can depend in part on which output path is selected as the active output path at block 1306. (For example, depending on the GMZI implementation, couplings between certain combinations of input and output waveguides may have lower loss, or higher efficiency, than other combinations, and the prioritization rules can favor input/output couplings that have higher efficiency.)

At block 1308, control logic 1230 can determine a set of control signals for the active phase shifters of GMZI 1220 that will result in the active input path being coupled to the active output path and other output paths being blocked (coupled to vacuum input paths). In some embodiments, a lookup table can be provided with an entry for each pairing of active input and output paths, and each entry can include a list of corresponding switch settings for the active phase shifters. Accordingly, at block 1308, control logic 1230 can access the lookup table and read the switch settings. Other implementations can be substituted. At block 1310, control logic 1230 can send control signals to the active switches of GMZI 1220. In some embodiments, sending the control signals can include applying specific voltages to active phase shifters to control the phase shift.

At block 1312, control logic 1230 can increment the cycle counter. As process 1300 iterates, incrementing the cycle counter results in the next output path in the rotation being selected as the active output path for the next time bin.

Process 1300 is illustrative, and variations and modifications are possible. Blocks or operations described sequentially can be performed in parallel, and order of operations can be modified to the extent that logic permits. Input paths 1222 should have sufficient length that the input signals indicating path occupancy for a given time bin can be received and control signals sent to GMZI 1220 before the photons associated with those input signals reach GMZI 1220. In some embodiments, at the end of each raster period, one or more idle time bins can be introduced, e.g., to allow a recovery period for detectors or other circuit components, before beginning the next raster period. More generally, selection of an output path from a group of output paths can be based on timing considerations and can be independent of the selection of the active input path. For example, control logic 1230 can maintain an ordered list of output paths in a raster group, and each time control logic 1230 is triggered to select an output path, control logic 1230 can select the next output path from the list. Selection of an output path in this manner can but need not occur according to a fixed clock cycle or other regular time interval. For instance, in some embodiments control logic 1230 can wait until an input signal indicating an occupied path is received and select the next output path from the list in response to the input signal, which may or may not occur at regular time intervals.

In some embodiments, the speed at which raster mux circuit 1200 can operate may be limited by the speed of various components. For instance, active phase shift circuits in GMZI 1220 may have a maximum switching speed, or detectors 1106 that generate signals may experience dead-time after detecting a photon. The duration of a time bin can be selected as desired, provided that it is long enough to allow the optical circuit to operate correctly. (It should be understood that photons in different time bins may be propagating through different components of an optical circuit at the same time.)

4. EXAMPLE APPLICATIONS OF RASTER MUX CIRCUITS

4.1. Rasterized Inputs to a Single Downstream Circuit

Figure 14:
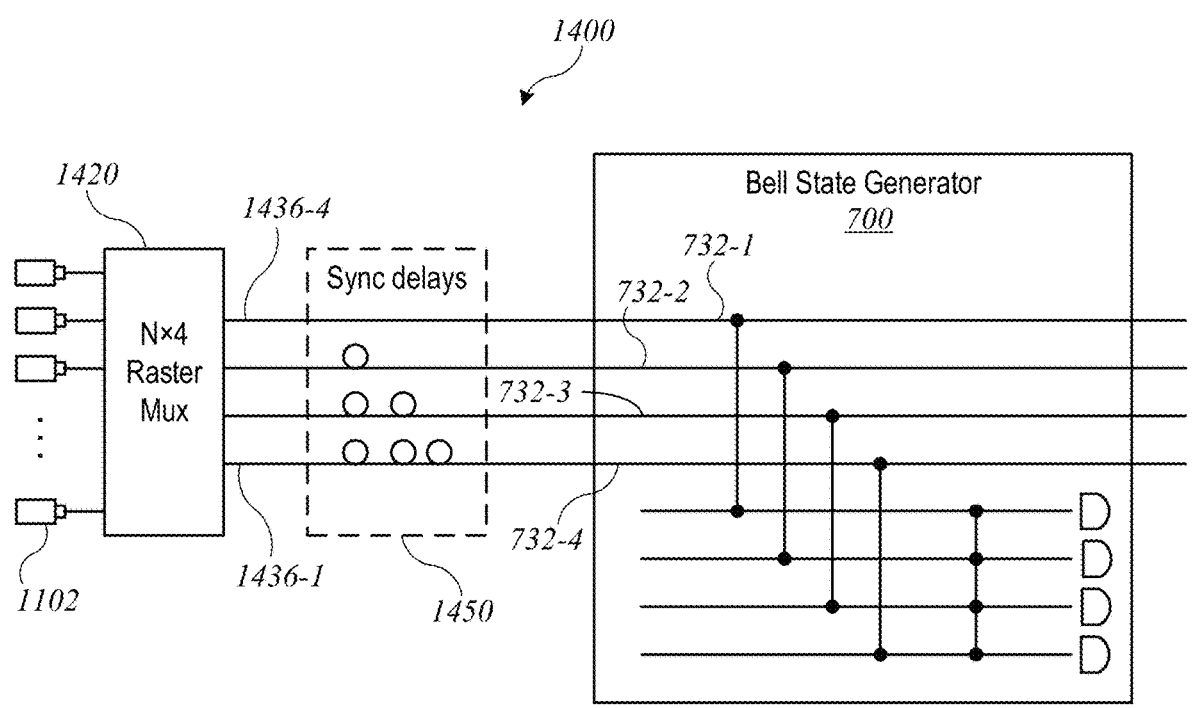
FIG. 14 shows a simplified schematic view of an optical circuit that includes a raster multiplexing circuit coupled to a Bell state generator according to some embodiments.

FIG. 14 shows a simplified schematic view of an optical circuit that includes an N×4 raster mux circuit 1420 coupled to a Bell state generator 700 according to some embodiments. Bell state generator 700 can be implemented as described above with reference to FIG. 7. Raster mux circuit 1420 can be an implementation of raster mux circuit 1200 with R=4. For each time bin, a set of N photon sources 1102 (which can be heralded single photon sources as described above) can be pumped or otherwise triggered to (nondeterministically) produce photons, and raster mux circuit 1420 can select a photon from any one of the N sources on to propagate on one of output waveguides 1436. Raster mux circuit 1420 can also select the output waveguide 1436 on a rotating or cyclic basis as described above. Sync delay circuit 1450 can be similar to sync delay circuit 1250 described above, introducing 3, 2, 1, or zero time bins of delay to each of output paths 1436. At the end of four time bins, four photons can be delivered simultaneously to input paths 732-1 through 732-4 of Bell state generator 700. As compared to providing a separate N×1 multiplexer 1120 for each input to Bell state generator 700, the area required to implement circuit 1400 of FIG. 14 is significantly reduced. The tradeoff is in throughput: where a set of four N×1 multiplexers can, in principle, produce four photons per time bin, N×4 raster mux circuit 1420 can produce four photons every fourth time bin. In a different comparison, assuming that the number N of photon sources is a limiting factor, a circuit having a separate (N/4)×1 multiplexer 1120 for each input to Bell state generator 700 results in a circuit area similar to that occupied by circuit 1400; however, for existing single-photon sources and currently practical values of N, the probability of obtaining four photons in the same time bin from four (N/4)×1 multiplexers is lower than the probability of obtaining four photons in the same time bin from four N×1 multiplexers. Consequently, despite the reduced speed, circuit 1400 with a single N×4 raster mux 1420 can produce Bell states at a comparable or even higher rate than a circuit using separate (N/4)×1 multiplexers for each input to Bell state generator 700.

Figure 15:
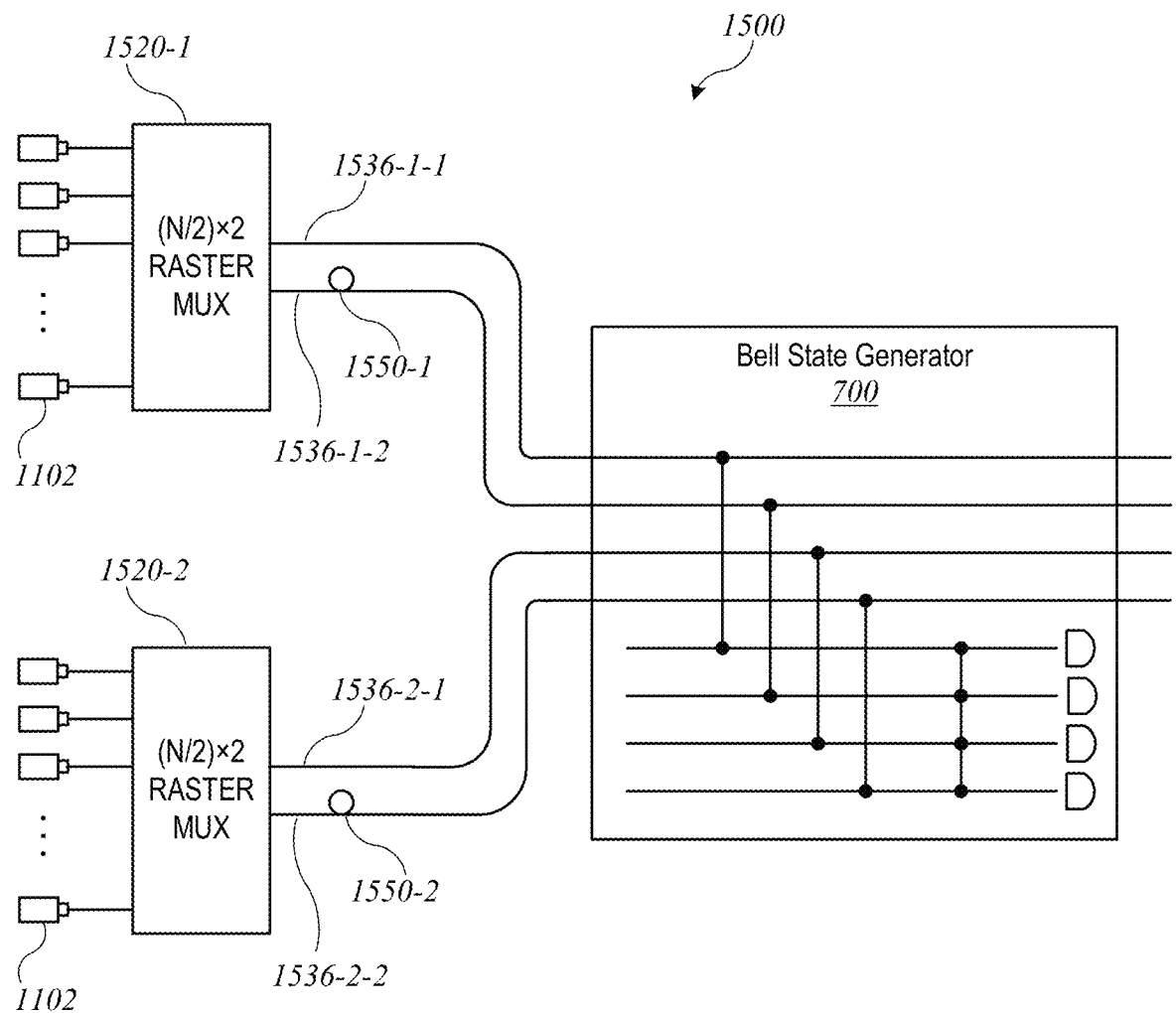
FIG. 15 shows a simplified schematic view of an optical circuit that includes two raster multiplexing circuits coupled to a Bell state generator according to some embodiments.

In some embodiments, the speed/area tradeoff can be optimized by using multiple raster mux circuits with each raster mux circuit producing more than one but fewer than all of the input photons for a downstream circuit element. As an example FIG. 15 shows a simplified schematic view of an optical circuit 1500 that includes two (N/2)×2 raster mux circuits 1520 coupled to a Bell state generator 700 according to some embodiments. Bell state generator 700 can be implemented as described above with reference to FIG. 7. Each raster mux circuit 1520 can be an implementation of raster mux circuit 1200 with R=2, and each raster mux circuit 1520 can be coupled to a different set of N/2 photon sources 1102.

All N photon sources 1102 can be operated on each time bin to produce photons, and each raster mux circuit 1520 can select a photon from one of its (N/2) sources on each time bin to propagate on one of output waveguides 1536. Each raster mux circuit 1500 can also select the output waveguide 1536 on a rotating (in this case alternating) basis as described above. Sync delays 1550 can delay one output of each raster mux 1500 relative to the other output of the same raster mux 1500. At the end of two time bins, four photons can be delivered simultaneously to input paths 732-1 through 732-4 of Bell state generator 700: two from raster mux circuit 1500-1 and two from raster mux circuit 1500-2.

Circuit 1500 of FIG. 15 uses a similar area (for the same value of N) to circuit 1400 of FIG. 14, and circuit 1500 can provide inputs to Bell state generator 700 at twice the rate of circuit 1400. In some embodiments, due to the increased speed, the circuit of FIG. 15 can obtain comparable throughput (measured in average number of four-photon groups per time period) to the circuit of FIG. 14 using only N'=N/2 inputs to each raster mux circuit 1500. Thus, the circuit of FIG. 15 can give comparable performance to the circuit of FIG. 14 while consuming similar area.

Figure 16A:
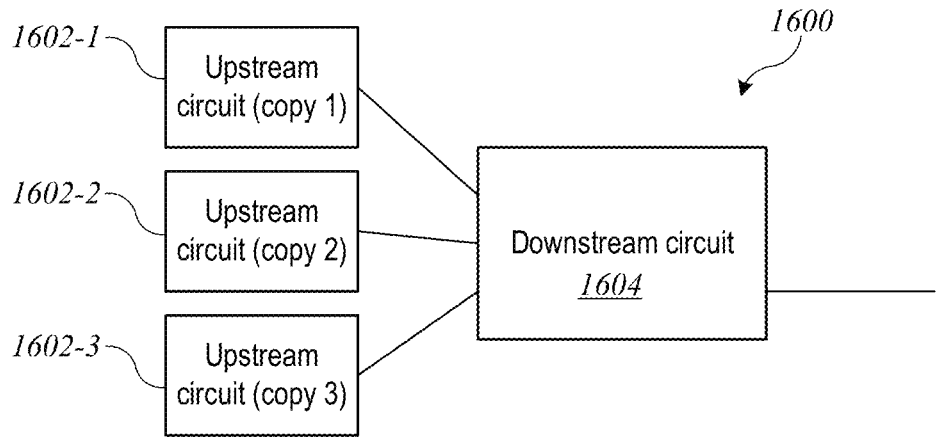
FIGS. 16A-16C show how a raster multiplexing circuit can be used to enable a single copy of an "upstream" circuit used to provide inputs to a "downstream" circuit according to some embodiments.
Figure 16B:
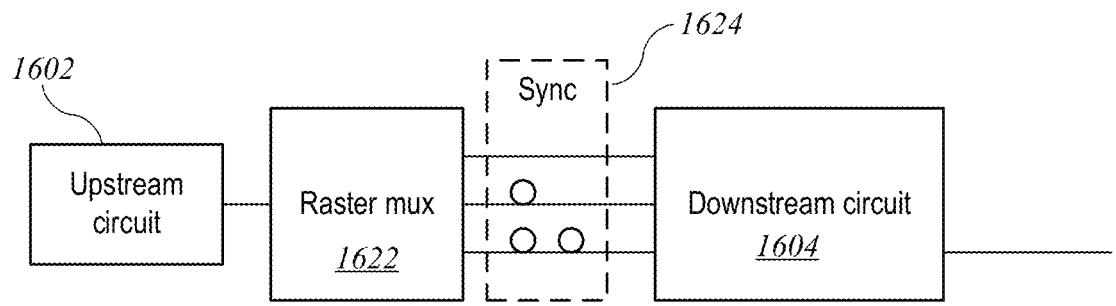
Figure 16C:
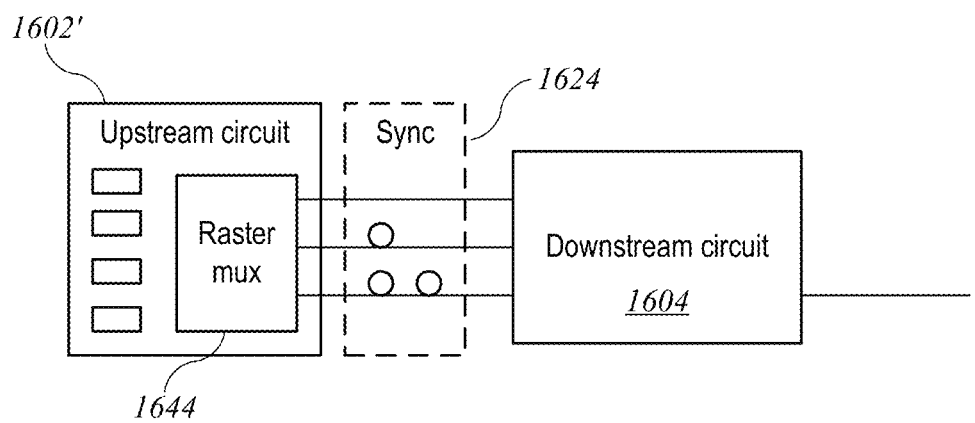

In circuits 1400 and 1500 of FIGS. 14 and 15, raster multiplexing is used to provide input photons to a Bell state generator. In various embodiments, raster multiplexing can be used in a similar manner to provide multiple photons to any downstream circuit. FIGS. 16A-16C show examples of how a raster mux circuit can be used to enable a single copy of an "upstream" circuit to provide multiple inputs to a "downstream" circuit according to some embodiments.

Shown in FIG. 16A is a configuration of optical circuits 1600 with three copies of an upstream circuit 1602 each providing an input to a downstream circuit 1604. Each copy of upstream circuit 1602 can be an instance of any optical circuit that provides a photon on an output waveguide (or in some instances multiple photons on multiple waveguides). For example, each copy of upstream circuit 1602 can include a set of photon sources coupled to an N×1 multiplexer as described above with reference to FIG. 11. Any other optical circuit, including an optical circuit that produces a group of photons on different waveguides (rather than a single photon on a single waveguide as in the circuit of FIG. 11) can also be used as upstream circuit 1602. Upstream circuits 1602 are all copies of each other, meaning that they include physically separate sets of components that have the same optical characteristics and couplings. Downstream circuit 1604 can be any optical circuit that operates on a set of multiple photons received simultaneously. As shown, downstream circuit 1604 can receive one input (or group of inputs) from each copy of upstream circuit 1602. For example, downstream circuit 1604 can implement Bell state generator 700 of FIG. 7. Any other optical circuit that operates on multiple inputs (or multiple groups of inputs) received simultaneously can be substituted. In the example shown, downstream circuit 1604 receives inputs from three copies of upstream circuit 1602; however, any number of copies (e.g., 2, 4, or more) can be used depending on the particular number of inputs (or groups of inputs) used by downstream circuit 1604. In some embodiments, downstream circuit 1604 can provide one or more photons as an output. In addition or instead, downstream circuit 1604 can consume some or all of the input photons (e.g., downstream circuit 1604 can include a detector) and produce output in another form such as electronic signals from a detector.

FIG. 16B shows a circuit 1620 according to some embodiments that provides the same functionality as circuit 1600 of FIG. 16A. Circuit 1620 can includes a single copy of upstream circuit 1602, a raster mux circuit 1622, a synchronization delay unit 1624, and downstream circuit 1604. Raster mux circuit 1622 can be an implementation of N×R raster mux circuit 1200 of FIG. 12. In this example, N=1 and R=3. (Other sizes can be substituted, depending on the number of inputs to downstream circuit 1604.) Synchronization delay circuit 1624 can implement delays of 2, 1, and 0 time bins on the output lines of raster mux circuit 1622, and downstream circuit 1604 can receive a set of three simultaneous inputs once every three time bins. It should be noted that operation of downstream circuit 1604 can be agnostic to whether its inputs are provided using multiple copies of upstream circuit 1602 (as shown in FIG. 16A) or a single copy of upstream circuit 1602 (as shown in FIG. 16B). Similarly, operation of upstream circuit 1602 can be agnostic as to whether its outputs are delivered to raster mux circuit 1622 or directly to downstream circuit 1604.

In some embodiments, upstream circuit 1602 may already include a multiplexer for output selection. For instance, upstream circuit 1602 may generate a number N of possible outputs and include an N×1 multiplexer to select one output. In such embodiments, the N×1 multiplexer can be replaced by an N×R raster mux circuit. FIG. 16C shows an example in which upstream circuit 1602' has been modified to include a raster mux circuit 1644 that provides outputs on one of three alternative output paths. Raster mux circuit 1644 in this example can be an N×3 raster mux circuit, where N is the number of alternative outputs from which the actual output is selected. More generally, raster mux circuit 1644 can be an N×R raster mux circuit, where R is the number of inputs to be provided to downstream circuit 1604. Combining output selection with raster multiplexing in upstream circuit 1602' can reduce the number of active optical switches in a given photon path. Synchronization delay unit 1624 can be used to deliver inputs simultaneously to downstream circuit 1604.

Using the principle illustrated in FIGS. 16A-16C, in any optical circuit arrangement where a downstream circuit operates on inputs provided by multiple copies of an upstream circuit, the multiple copies of the upstream circuit can be replaced by a single copy of the upstream circuit with a raster mux circuit and appropriate synchronization delays.

4.2. Rasterized Inputs to Multiple Bell State Generators

In embodiments described above, a single raster mux circuit can provide multiple inputs to a downstream circuit. In other embodiments, multiple raster mux circuits can provide inputs to multiple downstream circuits.

Figure 17:
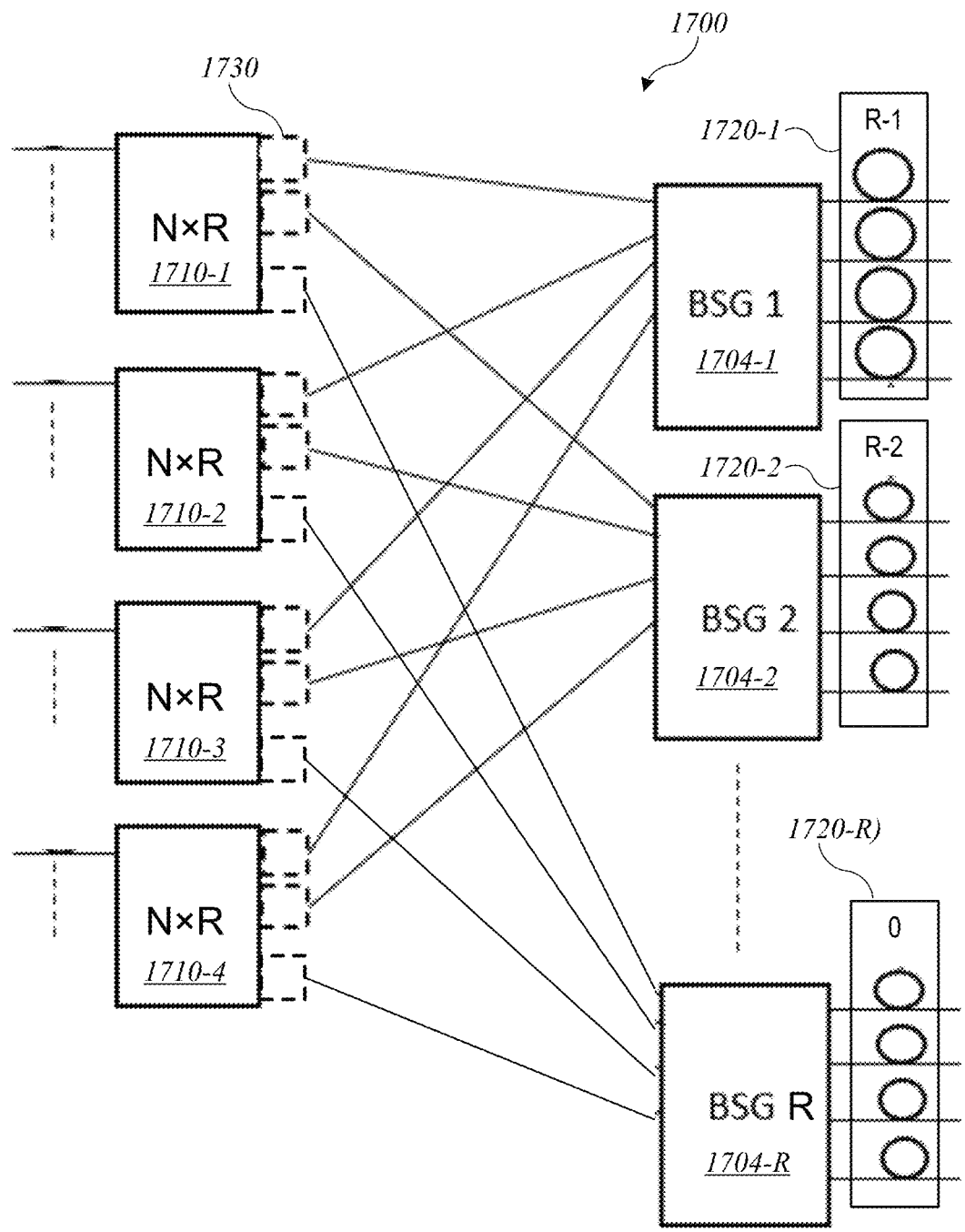
FIG. 17 shows a simplified schematic diagram of an optical circuit according to some embodiments.

By way of example, FIG. 17 shows a simplified schematic diagram of an optical circuit 1700 according to some embodiments. Circuit 1700 includes a number R of Bell state generator (BSG) circuits 1704, each of which can be an instance of Bell state generator 700 described above. Four N×R raster mux circuits 1710 are coupled to the input paths of BSG circuits 1704 with each raster mux circuit 1710 having one of its R output paths coupled to an input path of each BSG circuit 1704. Each raster mux circuit 1710 can be an instance of raster mux circuit 1200 and can receive and select among inputs from a group of N single photon sources as described above. In circuit 1700, each raster mux circuit 1710 supplies a different one of the four inputs to each BSG circuit 1704.

Raster mux circuits 1710 can be operated synchronously such that, during a first time bin, each raster mux circuit 1710 directs its output to BSG circuit 1704-1, during a second time bin, each raster mux circuit 1710 directs its output to BSG circuit 1704-2, and so on until during an Rth time bin, each raster mux circuit 1710 directs its output to BSG circuit 1704-R. Accordingly, each BSG 1704 can receive all four of its input photons simultaneously (in the same time bin) and can (non-deterministically) generate a Bell state output in the manner described above. Each BSG circuit 1704 generates a Bell state (if it does so) during a different time bin. To facilitate downstream operations using the outputs of two or more of Bell state generators 1704, delay circuits 1720 can be provided. Delay circuit 1720-1 delays all four outputs of BSG circuit 1704-1 by R−1 time bins, delay circuit 1720-2 delays all four outputs of BSG circuit 1704-2 by R−2 time bins, and so on, with delay circuit 1720-R adding zero time bins of delay. It should be understood that the added delay is defined relative to other delay circuits 1720.

In circuit 1700, each BSG circuit 1704 is "active" (receiving photons usable to generate a Bell state) for a different one of every set of R time bins. Due to the nature of GMZI circuits, in some embodiments, one or another of raster mux circuits 1710 may occasionally generate an "errant" photon, i.e., a photon on an output path other than the active output path, in addition to a photon on the active output path. In some embodiments, each output path of each raster mux circuit 1710 can include a blocking switch 1730 (shown as dashed-line boxes), and the control logic in each raster mux circuit 1710 (e.g., control logic 1230 of FIG. 12) can set the state of blocking switches 1730 such that photons on any output path other than the active output path are blocked. Blocking switches 1730 can each be implemented using any technique that results in a photon being selectably blocked or allowed to propagate through a waveguide. For example, a blocking switch can be implemented using a (2×2) Mach Zehnder interferometer and "dumping" one path (e.g., by making one waveguide a dead end). As another example, a blocking switch can be implemented by providing dopants in a region of the waveguide that cause the photon to be absorbed or not as a function of an applied voltage. Other implementations may also be used. In some embodiments, blocking switches 1730 can be "normally blocking" such that photons are blocked unless a signal (e.g., a voltage) to permit photon propagation is actively applied. In other embodiments, blocking switches 1730 can be "normally open" such that photons propagate unless a signal to block photon propagation is actively applied. Blocking switches can be implemented with any raster mux circuit in a similar manner.

It will be appreciated that circuit 1700 is illustrative. A set of raster mux circuits can be used to provide inputs to any set of R downstream circuits, not limited to BSG circuits. In general, if each of the R downstream circuits uses M inputs, then M copies of an N×R raster mux circuit can be used to provide inputs. (N is the number of inputs from which the raster mux circuit selects the output and depending on the upstream circuit, N can be any number greater than or equal to 1.) In some embodiments, in addition to or instead of blocking switches, clocked electrical gating can be applied to output signals from the detectors in each BSG circuit 1704, such that signals from the detectors are ignored except during the time bin when that BSG circuit 1704 is active. Using these or other techniques, errant photons can be prevented from affecting circuit operations or output data.

Figure 18:
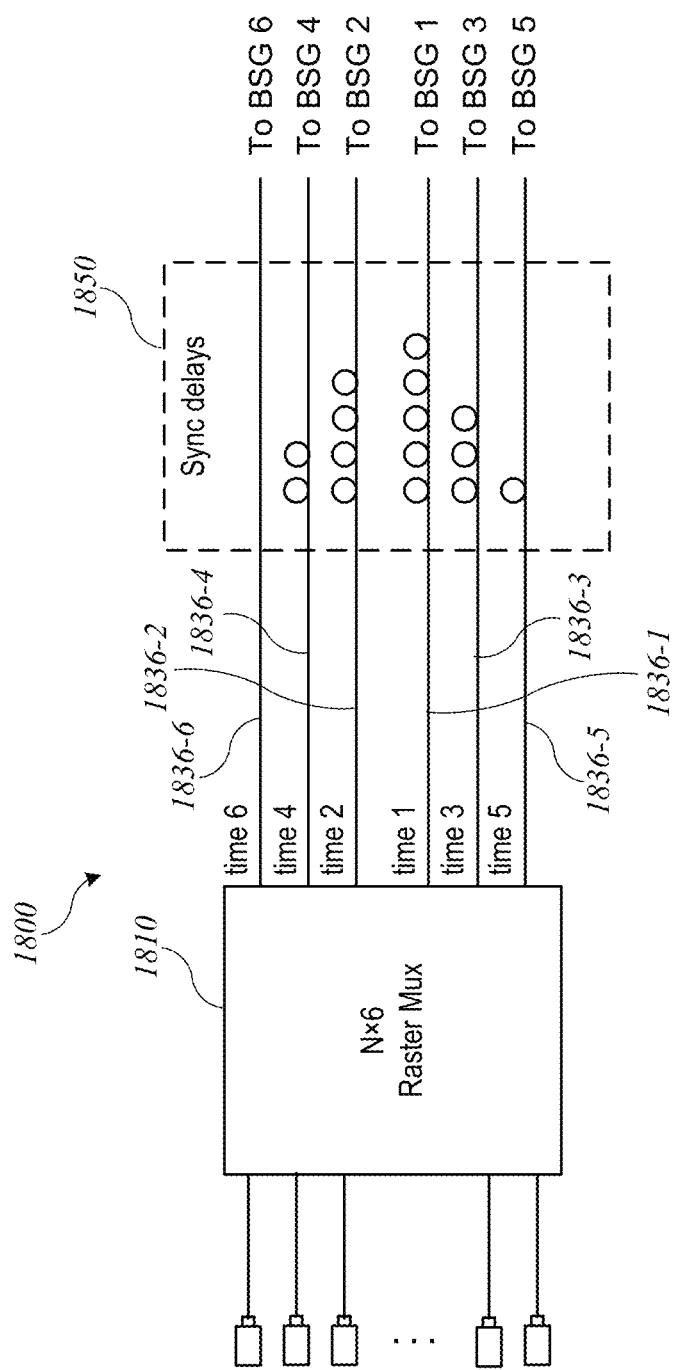
FIG. 18 shows a simplified schematic view of an optical circuit according to some embodiments.

Circuit 1700 is drawn in a manner that suggests that a raster mux circuit selects output paths sequentially according to their physical arrangement. This can be, but need not be, the case, and in various embodiments, output paths for successive time bins can be selected in any order, as long as each of the R output paths is selected once during each raster period. By way of example, FIG. 18 shows a simplified schematic view of a circuit 1800 according to some embodiments. Circuit 1800 includes an N×6 raster mux circuit 1810, which can be implemented similarly to raster mux circuit 1200 or other raster mux circuits described herein. In this example, raster mux circuit 1810 has one input path 1836 coupled to each of R=6 BSG circuits. For example raster mux circuit 1810 can be one of raster mux circuits 1710 of FIG. 17. In this example, the arrangement of output paths 1836 in the drawing is intended to represent the relative positions of waveguides. Each output path 1836 is labeled with the time bin for which it is active. In this example, a sync delay unit 1850 is placed downstream of raster mux circuit 1810 and upstream of the BSG circuits, and all BSG circuits can receive their inputs in the same time bin. In this particular example, the physical arrangement of output paths 1836 is assumed to correspond to the drawing; thus FIG. 18 shows an implementation in which adjacent output paths 1836 are not selected for successive time bins. Instead, the selection of output paths starts with the center paths 1836-1, 1836-2, and proceeds outward in an alternating fashion. For some GMZI configurations, an alternating selection pattern as shown in FIG. 18 can avoid the generation of errant photons on output paths 1836 without the use of blocking switches. More generally, in some embodiments the order in which output paths of a raster mux circuit are selected within a raster period can be determined based in part on which selection order(s) can avoid or minimize generation of errant photons.

4.3. Raster Mux for Single-Qubit and Two-Qubit Measurement Operations

In quantum computing and/or quantum communication applications of linear optical circuits, it may be desirable to perform measurements on photons that encode qubit states.

Figure 19A:
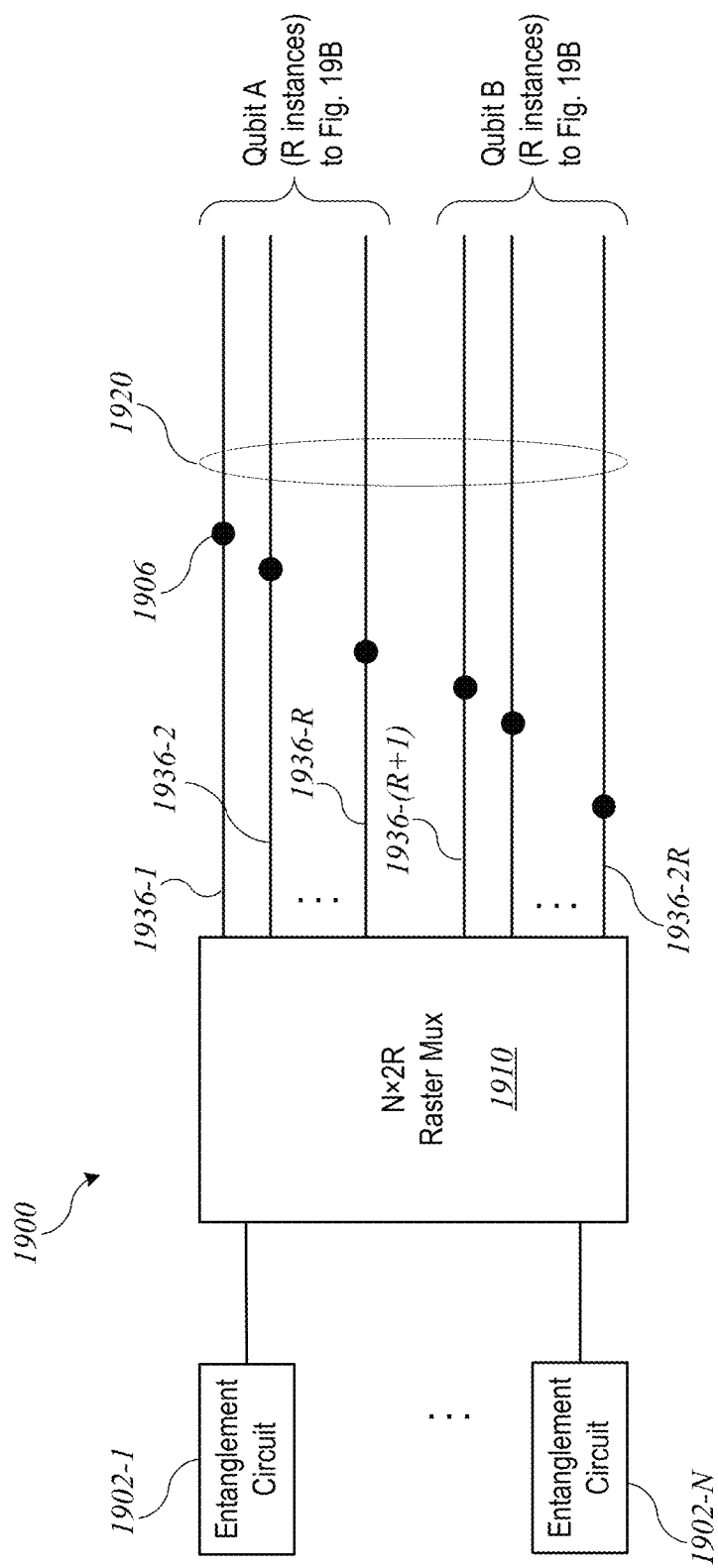
FIGS. 19A and 19B together show a simplified circuit schematic of an optical circuit according to some embodiments.
Figure 19B:
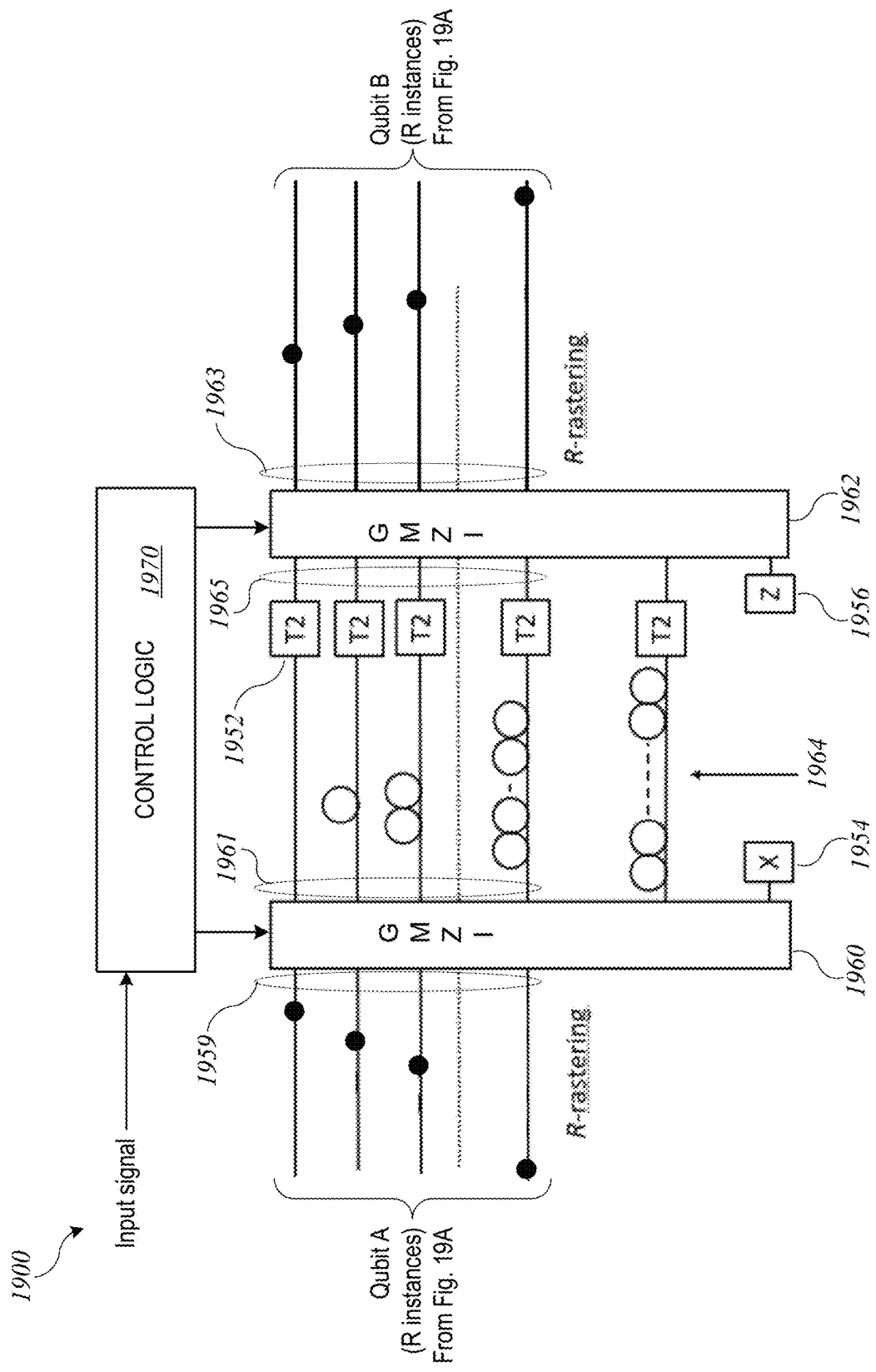

For instance, a pair of waveguides can be used to encode a qubit using a dual-rail encoding as described above. According to some embodiments, raster multiplexing can be used to provide input qubits for quantum operations such as fusion operations (as described above) and/or single-qubit measurements. FIGS. 19A and 19B together show a simplified circuit schematic of an optical circuit 1900 according to some embodiments. Circuit 1900 implements selectable fusion or single-qubit measurement operations on pairs of qubits. Referring first to FIG. 19A, circuit 1900 includes a set of N entanglement circuits 1902. Each entanglement circuit 1902 can be a circuit that generates an entangled system of two or more qubits. Examples of circuits that generate entangled systems of qubits are described above. For instance, Bell state generator 700, Type I fusion circuit 800 and Type II fusion circuit 900 are examples of circuits that can generate entangled systems of qubits. Additional examples are described in WO 2020/257772, "Photonic Computer Architecture." Each entanglement circuit 1902 can provide an input qubit to an N×2R raster mux circuit 1910. For example, qubits can be represented using a dual-rail encoding. To provide a qubit, an instance of entanglement circuit 1902 can have a pair of output waveguides (corresponding to two rails that encode one qubit as described above) coupled to a pair of input waveguides of raster mux circuit 1910. It should be understood that in FIGS. 19A and 19B, a single coupling path (line) between circuit components represents a qubit. In embodiments using a dual-rail encoding, each coupling path can be implemented using a pair of waveguides. In embodiments using other photonic encoding schemes, a coupling path can correspond to a number of waveguides sufficient to encode one qubit. For example, in a polarization encoding, one waveguide may suffice to encode a qubit.

N×2R raster mux circuit 1910 can be similar to raster mux circuit 1200 or other raster mux circuits described herein, except that each input path and each output path represents a qubit and may be implemented using multiple waveguides. For instance, in a dual-rail encoding, raster mux circuit 1910 can include two identical N×2R GMZIs, one for each rail of the qubit. Both GMZIs can be controlled by the same logic so that both rails of the same qubit propagate through raster mux circuit 1910.

In operation, for each time bin, control logic of raster mux circuit 1910 can select the output path of one of the N entanglement circuits 1902 as the active input path and can select one of the 2R output paths as an active output path. Selection of the active input path can be based on heralding signals received from each entanglement circuit 1902 indicating whether that entanglement circuit 1902 successfully produced an entangled state. In some embodiments, there may be only one instance of entanglement circuit 1902 (i.e., N can be equal to 1), in which case the control logic of raster mux circuit 1910 may not need to select an active input path. As with other raster mux circuits described herein, raster mux circuit 1910 can cycle through the R output paths 1936 during a rastering period of 2R successive time bins such that raster mux circuit 1910 can output a qubit onto output path 1936-1 during a first cycle, output path 1936-2 during a second time bin, and so on until a qubit is output onto output path 1936-2R during the 2Rth time bin. As indicated in FIG. 19A, qubits on output paths 1936-1 through 1936-R can be interpreted as instances of "Qubit A" while qubits on output paths 1936-(R+1) through 1936-2R can be interpreted as instances of "Qubit B." It should be understood that qubits (photons) on different output paths 1936 reach point 1920 at different times in a predictable, repeatable pattern: if a qubit on output path 1936-1 arrives at time $t_1$, then a qubit on output path 1936-k arrives at time $t_1+kt_c$, where $t_c$ is the interval between time bins, as suggested by black dots 1906.

Turning to FIG. 19B, circuit 1900 also includes circuitry to perform measurement operations on instances of Qubit A and instances of Qubit B. In this example, circuit 1900 includes a number of type II fusion circuits (T2) 1952, an "X" measurement circuit 1954, and a "Z" measurement circuit 1956. Each type II fusion circuit 1952 can be configured to receive two qubits as inputs and perform a two-qubit measurement operation that consumes both input qubits, e.g., as described above with reference to FIGS. 9A and 9B. As noted above, the input qubits to type II fusion circuits 1952 are presumed to be entangled with other qubits (e.g., via operation of entanglement circuits 1902 of FIG. 19A), and one effect of a successful type II fusion operation is to "fuse" the respective systems of qubits with which the two input qubits are entangled into a single (larger) entangled system. Another effect of a type II fusion operation can be the extraction of (classical) measurement data from the two-qubit measurement operation. X measurement circuit 1954 can perform a single-qubit measurement in the Pauli X basis, and Z measurement circuit 1956 can perform a single-qubit measurement in the Pauli Z basis.

Circuit 1900 also includes two GMZI circuits 1960, 1962. GMZI circuit 1960 has R input paths 1959 coupled to receive the R instances of Qubit A from raster mux circuit 1910 and 2R output paths 1961. One of the output paths 1961 of GMZI circuit 1960 is coupled to the input of X measurement circuit 1954. The remaining 2R−1 output paths 1961 are coupled to a set of delay lines 1964, each of which adds a different amount of delay, from 0 to 2(R−1) time bins. The output of each delay line 1964 is coupled to a first input of one of type II fusion circuits 1952. The number of instances of type II fusion circuit 1952 can be equal to the number of delay lines 1964, and in this example, there are 2R−1 instances of type II fusion circuit 1952. GMZI circuit 1962 has R input paths 1963 coupled to receive the R instances of Qubit B from raster mux circuit 1910 and 2R output paths 1965. One output path 1965 is coupled to the input of Z measurement circuit 1956 The remaining 2R−1 output paths 1965 are each coupled to a second input of one of type II fusion circuit 1952. (As noted above, each path can be implemented using one or more waveguides, depending on the particular qubit encoding. Where multiple waveguides are used to encode a qubit, each GMZI circuit 1960, 1962 can be implemented using multiple identically configured copies of the same GMZI.)

Control logic 1970 can be implemented as a digital logic circuit with an arrangement of classical logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). In some embodiments, an off-chip computer can be used to implement control logic 1970, and in some embodiments, the same hardware components (including on-chip and/or off-chip components) can implement control logic 1970 as well as the control logic for raster mux circuit 1910.

In operation, for each time bin, control logic 1970 can select one of the input paths 1959 of GMZI 1960 as an active input path and can select one of the output paths 1961 of GMZI 1960 as an active output path. Similarly, control logic 1970 can select one of the input paths 1963 of GMZI 1962 as an active input path and can select one of the output paths

1965 of GMZI 1962 as an active output path. Based on the selection, control logic 1970 can send control signals to GMZIs 1960 and 1962 to set the state of active switches within GMZIs 1960 and 1962 to couple the active input path to the active output path.

Selection of an input path for each of GMZIs 1960 and 1962 can be based on timing rules. For instance, as suggested by the black dots, qubits arrive at different inputs of GMZI 1960 (or GMZI 1962) in different time bins, and the selection of an active input path can be based on a cycle counter (e.g., as described above with reference to control logic 1230). Selection of the active output path can be based on an input signal indicating a desired disposition of each qubit. In some embodiments, one instance of Qubit A within a group of R instances and one instance of Qubit B within a group of R instances may be treated as a pair, and the disposition can be either a type II fusion operation on the pair or a single-qubit measurement on each qubit of the pair. The input signal can specify which instance of Qubit B should be paired with each instance of Qubit A and whether the pair should be subject to type II fusion or to single-qubit measurements. In some instances, operation of entanglement circuits 1902 (in FIG. 19A) may be non-deterministic, meaning that a desired entangled state is produced with a probability less than 1. Accordingly, there may be time bins during which no instance of entanglement circuit 1902 generates the desired entangled state. In some embodiments, the determination of qubit pairings and/or the disposition of a particular pair can depend on whether a usable entangled state was generated by at least one of entanglement circuits 1902 during a given time bin.

Based on information encoded in the input signal, control logic 1970 can select an output path for each qubit instance. For example, where a given instance of Qubit A is to be subject to single-qubit measurement, control logic 1970 can set the active switches in GMZI 1960 to couple that instance of Qubit A to X measurement circuit 1954, and where a given instance of Qubit B is to be subject to single-qubit measurement, control logic 1970 can set the active switches in GMZI 1962 to couple that instance of Qubit B to Z measurement circuit 1956. Where an instance of Qubit A and an instance of Qubit B are to be subject to type II fusion measurement, those two qubits should arrive at the inputs of the same instance of type II fusion circuit 1952 simultaneously. However, due to the operation of raster mux circuit 1910, and due to variability in which instance of Qubit A is paired with which instance of Qubit B, paired instances of Qubit A and Qubit B may arrive at GMZIs 1960 and 1962 at different times. Accordingly, control logic 1970 can determine the number of time bins of delay to apply to the instance of Qubit A to allow the paired instance of Qubit B (which may be in a later time bin as shown in FIG. 19A) to catch up. Control logic 1970 can select the output path 1961 that couples to the appropriate delay line 1964, and this selection also determines which instance of type II fusion circuit 1952 will perform the fusion operation. Accordingly, control logic 1970 can select the output path 1965 for GMZI 1962 that delivers the instance of qubit B to the same instance of type II fusion circuit 1952 that will receive Qubit A. As with control logic 1230 described above, a lookup table can be provided such that, given a specific pairing of one instance of Qubit A and one instance of Qubit B and a desired disposition for the pair (e.g., fusion or single-qubit measurements), the appropriate output paths (and corresponding active switch settings) for GMZIs 1960 and 1962 can be determined by a lookup operation.

Figure 20:
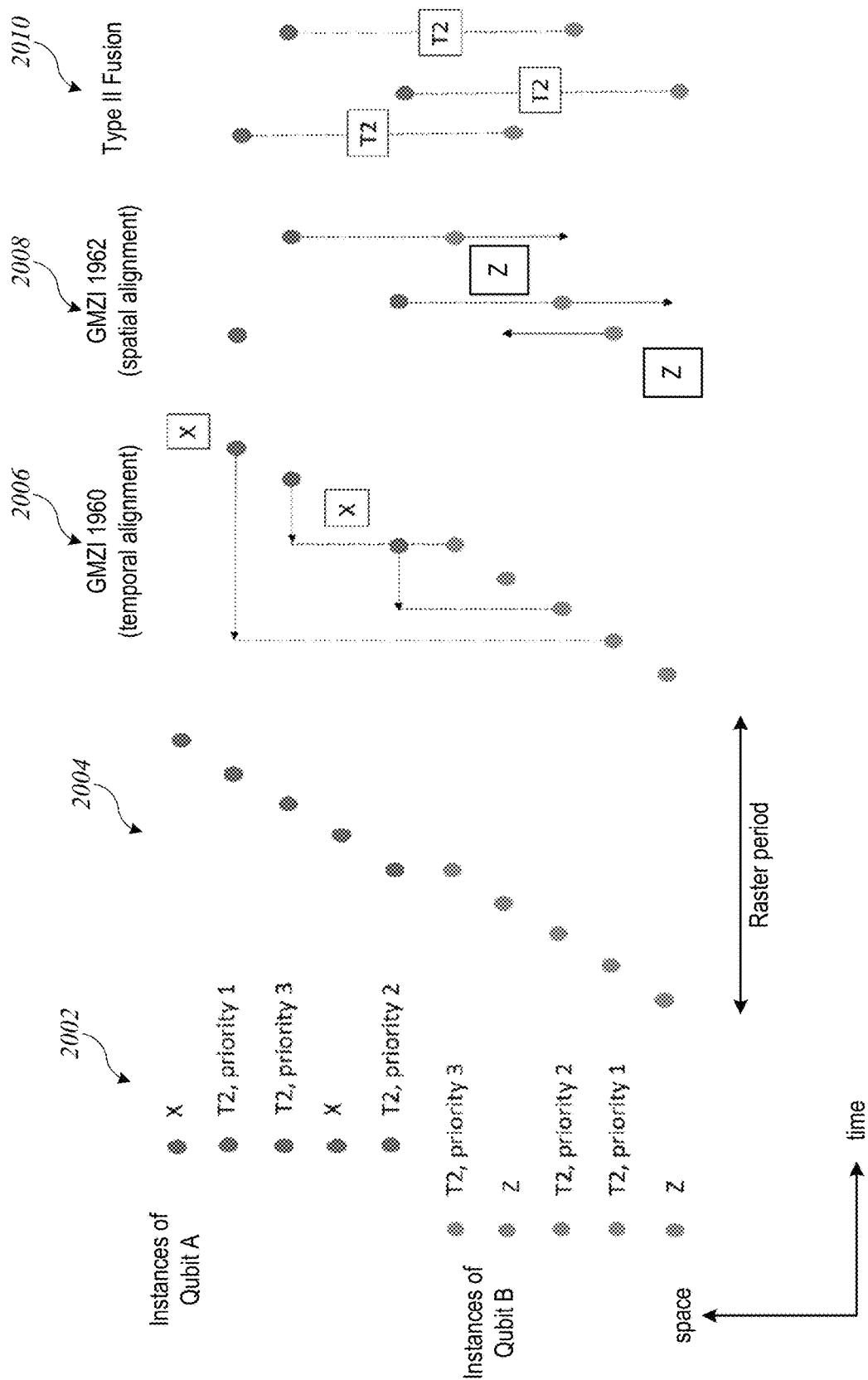
FIG. 20 is a spacetime diagram further illustrating the operation of the circuit of FIGS. 19A and 19B according to some embodiments.

FIG. 20 is a spacetime diagram further illustrating the operation of circuit 1900 according to some embodiments. In this example, R=5. Shown at 2002 are the prescribed dispositions for each qubit instance: "X" denotes single-qubit X measurement; "Z" denotes single-qubit Z measurement; "T2" denotes type II fusion with a "priority" label defined such that the inputs to a single type II fusion operation are the instance of Qubit A and the instance of Qubit B having the same priority number. Shown at 2004 is a spacetime distribution of the qubits after operation of raster mux circuit 1910. The qubits are distributed in space (on different paths) and in time. As shown at 2006, GMZI 1960 applies delay to the instances of Qubit A that are designated for fusion operations to bring them into temporal alignment with the paired instances of Qubit B. GMZI 1960 also routes instances of Qubit A that are designated for single-qubit X measurement to X measurement circuit 1954. As shown at 2008, GMZI 1962 provides spatial alignment of instances of Qubit B that are designated for fusion operations with the paired instances of Qubit A. GMZI 1962 also routes instances of Qubit B that are designated for single-qubit Z measurement to Z measurement circuit 1956. As shown at 2010, with the paired qubits in spatiotemporal alignment, type II fusion circuits 1952 can perform the fusion operations.

It will be appreciated that circuit 1900 is illustrative and that variations and modifications are possible. A raster mux circuit can provide any number R (2 or more) of outputs on different time bins. In some embodiments, a time bin can be defined based on the speed at which the various circuit components can be operated. For instance, a detector may incur deadtime after detecting a photon and the duration of a time bin can be selected to allow for detector deadtime. As another example, active optical switches (such as the switches in a GMZI) may have a maximum switching speed, and the duration of a time bin can be selected so as not to exceed the maximum switching speed of the GMZIs. In some embodiments, after completing a raster period, an idle time may be introduced to allow circuit components (e.g., detectors and/or photon sources) to recover.

In the example shown above, circuit 1900 includes 2R−1 delay lines 1964, which is sufficient to allow any instance of Qubit A to be paired with any instance of Qubit B. In some embodiments, fewer than 2R−1 delay lines can be used. Where this is the case, some pairings of instances of Qubit A and Qubit B might not be supported. For example if the time bin is chosen to be shorter than the time needed to change the states of the active switches in GMZIs 1960 and 1962, qubits may be provided at a rate faster than the GMZIs can switch their routing. If the inputs for two fusion operations are too close in time, the desired routing may not be achievable. However, for some implementations, the density of fusion measurements may be low (e.g., where the success probability of entanglement circuit 1902 is low), and the likelihood that fusion operations would occur close in time may be negligible. More generally, to the extent that inability to support fusion operations between certain pairings of qubits is tolerable in a given system, the number of delay lines (and the number of fusion circuits) can be reduced, and GMZIs 1960, 1962 can be correspondingly reduced in size.

5. GENERALIZED MACH-ZEHNDER INTERFEROMETER (GMZI) IMPLEMENTATIONS

In some embodiments, fast and low-loss optical switch networks can enable scalable quantum information processing using photonic qubits. More specifically, such networks can be employed within a linear-optical quantum computing (LOQC) system, since many such systems relies on non-deterministic processes of single-photon generation, entanglement generation and fusion measurements, and they also have important applications for quantum communications, such as enabling all-photonic quantum repeaters.

Advantageously, one or more embodiments disclosed herein provide for low loss, fast, and minimally-decohering photonic switch networks. Some embodiments provide for switch networks having a minimization of depth and count and are particularly suited for implementations that include active phase shifters, which are historically the largest contributors to the size and amount of noise in switch networks. Examples of switch networks will now be described. Such networks can be used, for instance, in any of the embodiments described above.

Components that can be used in photonic platforms include waveguides, directional couplers, passive and active (fast) phase shifters, crossings, single-photon detectors and heralded single-photon sources (HSPSs). Switch networks can be categorized according to their primary function as follows. N-to-1 (M) muxes (also referred to as N×1 muxes) map one (or multiple M) inputs to designated output ports. The inputs are commonly assumed to be probabilistic and of the same type, although more complicated assumptions apply in some problems. For example, a N-to-4 photon mux extracts groups of four photons from N HSPSs. Sometimes it is necessary to carefully distinguish the number of output (input) ports from the number of principal target outputs (inputs). Most commonly, the excess ports must be populated with the vacuum state, and the switch network is required to access specific distributions ("patterns") of the outputs (inputs) across the ports. We refer to switch networks as permutation networks when their primary purpose is to rearrange (subsets of) inputs, where the inputs should generally be regarded as inequivalent. Furthermore, switch networks are also classified on the basis of the photonic degree of freedom distinguishing their inputs. Schemes based on space and time are the most common, but the use of frequency, orbital angular momentum, and combinations of multiple degrees of freedom has also been proposed.

Figure 21A:
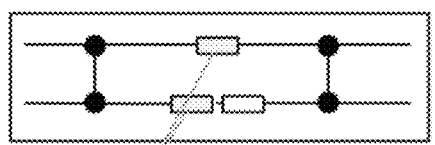
FIGS. 21A and 21B show building blocks of composite switch networks that can be used in some embodiments.
Figure 21B:
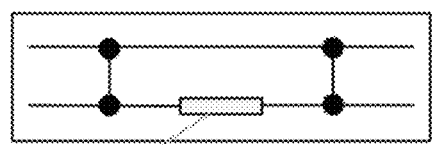

In some embodiments, Mach-Zehnder Interferometers (MZIs) may be used which are networks that implement identity or swap operations on two inputs. Two possible realizations of this type of circuit are shown in FIGS. 21A and 21B. FIGS. 21A and 21B show building blocks of composite switch networks. FIGS. 21A and 21B show 2-to-2 MZIs that implement identity or swap operations on the inputs. The circuits consist of two directional couplers with an active phase shifter (gray) on one or both arms between them. The push-pull configuration shown in FIG. 21A also has a fixed passive $-\pi/2$ phase shift (white) on one arm and selects between the two operations by setting the top or bottom active phase to $-\pi/2$. The configuration shown in FIG. 21B uses a 0 or $-\pi$ active phase to select the operation. Many switch network architectures are built by connecting multiple MZIs to form various topologies.

Figure 21C:
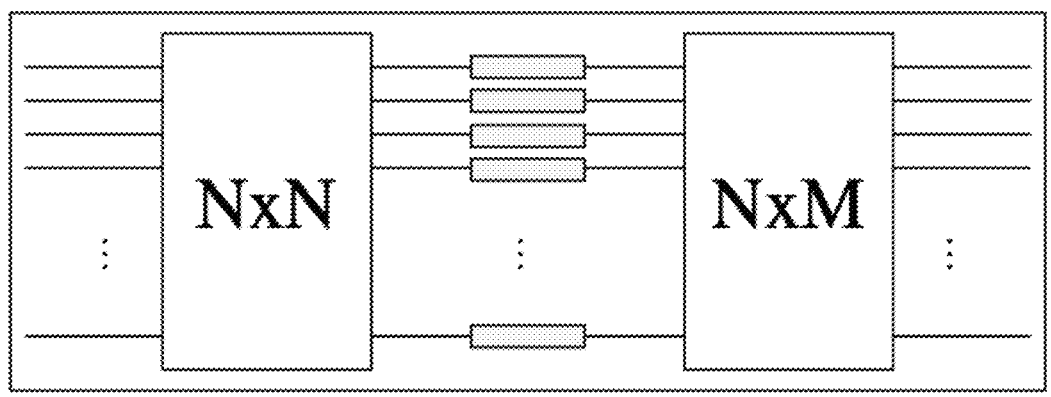
FIG. 21C shows a N-to-M GMZI that can be used in some embodiments.

The Generalized Mach-Zehnder Interferometer (GMZI) is an extension of an MZI with N>2 inputs and M≥1 outputs, shown in FIG. 21C. This configuration allows a set of permutations to be performed on the inputs, as discussed in further detail below, making this device a powerful block for the construction of composite N-to-1 and N-to-M switch networks. FIG. 21C shows a N-to-M GMZI made of two passive balanced splitter networks (white) and a layer of N active phase shifters (gray). Varying the settings of the active phases selects specific permutations of the N inputs and routes them to M>1 output ports.

There are a number of spatial mux schemes that select one of multiple inputs from distinct locations in space. For example, a N-to-1 GMZI can be used as a mux, since it allows routing of any input to a single output port. The advantages of this scheme are its low constant active phase shifter depth (1) and count (N). However, the total propagation distance and the number of waveguide crossings increase rapidly with N. This downside of the monolithic GMZI structure is obviated by constructing composite switch networks of 2-to-1 MZIs, at the cost of increasing the component depth and count. Two examples of N-to-1 schemes of this kind include the "log-tree" and "chain", both of which can be built with no crossings.

Figure 22A:
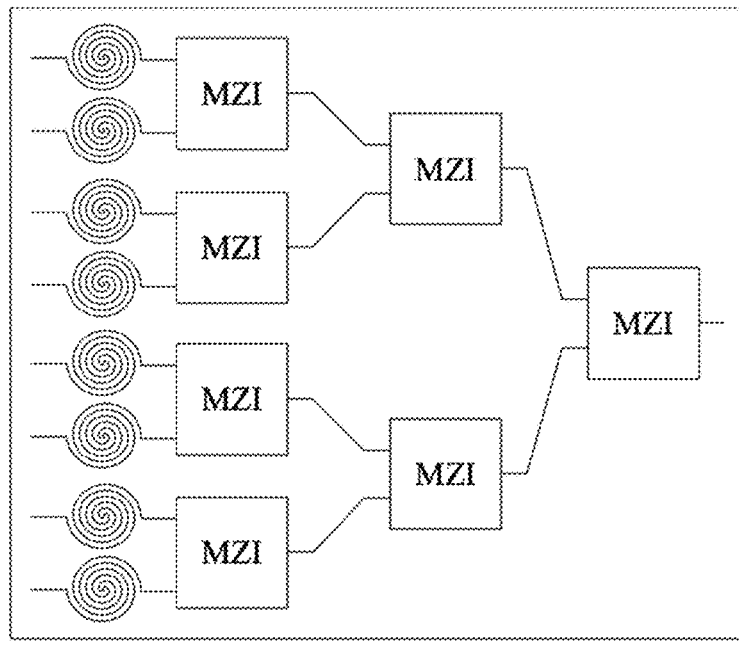
FIGS. 22A and 22B show spatial N-to-1 muxes, with inputs at N spatially-distinct locations (ports), that can be used in some embodiments.
Figure 22B:
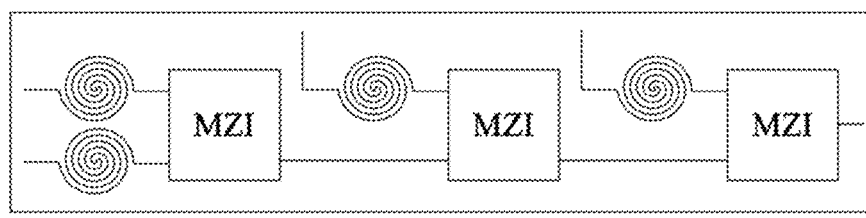

FIGS. 22A and 22B show spatial N-to-1 muxes, with inputs at N spatially-distinct locations (ports). FIG. 22A shows a log-tree mux (N=8 example). 2-to-1 MZIs form a tree structure with $2(2^{\lceil \log_2(N) \rceil}-1)$ active phase shifters arranged in $\lceil \log_2(N) \rceil$ layers. FIG. 22B shows a chain mux (N=4 example). (N−1) MZIs are connected through one output and input to form a line. The active phase shifter count is the same as for the log-tree, but the depth varies between 1 and (N−1).

In a "log-tree", the MZIs form a converging symmetric tree of degree 2, where the chosen input is routed from one of the leaves to the root, as shown in FIG. 22A. An asymmetric variant of this scheme, known as a "chain", includes MZIs cascaded to form a linear topology in which each block selects either the output of the previous block or the new input, as shown in FIG. 22B. The depth of the network traversed by the output depends on the chosen input, which can worsen the interference of resources from different chains, due to imbalanced losses and errors. The switching logic of this scheme presents an interesting advantage: while being very simple and entirely local to each individual MZI, it minimizes the amount of error on by selecting the input available closest to the output. Analysis of these three schemes in the context of single photon multiplexing shows that all three architectures require components with performance well beyond the state-of-the-art to achieve a multiplexing efficiency high enough for use in LOQC.

Figure 23A:
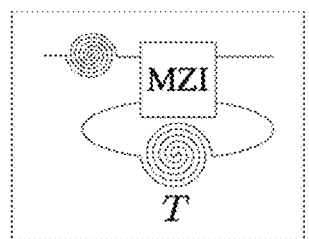
FIGS. 23A and 23B show N-to-1 temporal muxes, with inputs in N distinct time bins, that can be used in some embodiments.

In temporal multiplexing, resources can be input at the same spatial location but different times, and the aim is to produce an output in a specific time bin. This requires networks with fewer components, but the output time bins become longer. There are two main kinds of temporal schemes: designs with storage devices, such as cavities or fiber loops, and designs based on networks of delays The former simply consist of a storage device and a single 2×2 switch network used to choose whether to store or output each input, as shown in FIG. 23A. This can be thought of as the temporal version of a chain mux, and it presents the same advantage in terms of switching logic. The log-tree also has a temporal equivalent known as a "binary-division delay network". This scheme consists of a series of MZIs with delays of different lengths between them, as illustrated in FIG. 23B.

Figure 23B:
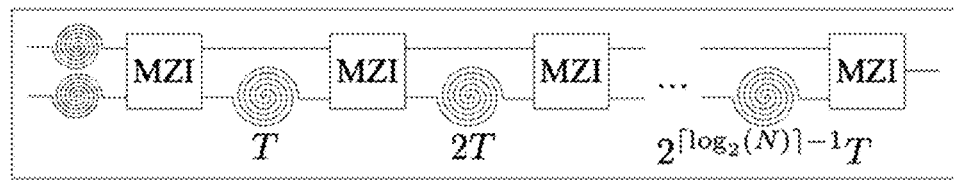

FIGS. 23A and 23B show N-to-1 temporal muxes, with inputs in N distinct time bins. FIG. 23A shows a storage loop scheme (time chain). A 2×2 MZI receives one resource per time bin T and routes it to a storage device (a delay line here) or discards it. After N time bins, the chosen input is output. The number of active phase shifters in the path of the chosen input varies between 1 and N. FIG. 23B shows a binary delay network (time log-tree). The scheme comprises a series of $\lceil \log_2(N) \rceil + 1$ MZIs with delays of lengths $2^n T$ between them, where T is the duration of a time bin at the input and $n=0, \ldots, \lceil \log_2(N) \rceil - 1$. The active phase shifter depth scales as with the number of input time bins as $\lceil \log_2(N) \rceil$.

The topologies described above can be generalized by replacing each MZI with a GMZI with n inputs, as shown in FIGS. 24A-24D. This introduces a trade-off between the active phase shifter depth and count, which decreases with n, and the number of waveguide crossings and propagation distance within each block, which increases with n. In addition, this modification turns temporal schemes into hybrid networks, where multiple spatially distinct resources are input in each time bin. The trade-offs introduced by the parameter n can be exploited to optimize the structure of these schemes for different regimes of physical error rates.

Figure 24C:
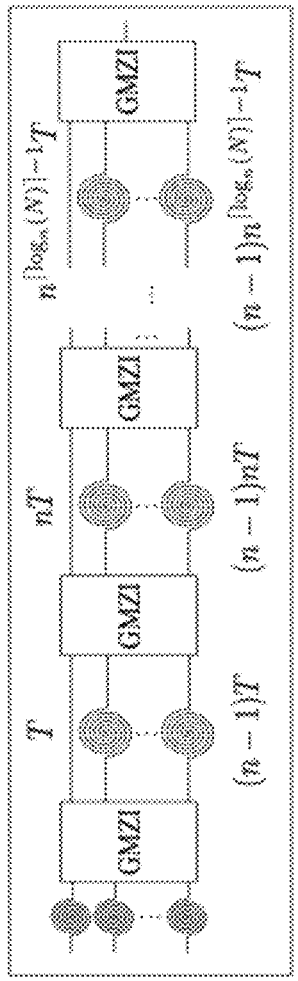
FIGS. 24A-24D show examples of generalized N-to-1 composite multiplexing networks that can be used in some embodiments.
Figure 24B:
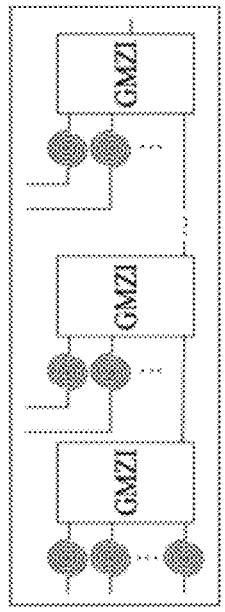
Figure 24D:
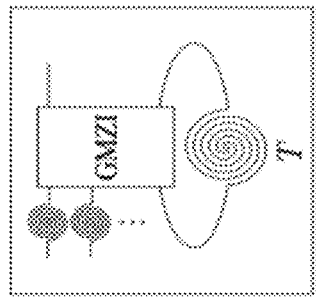
Figure 24A:
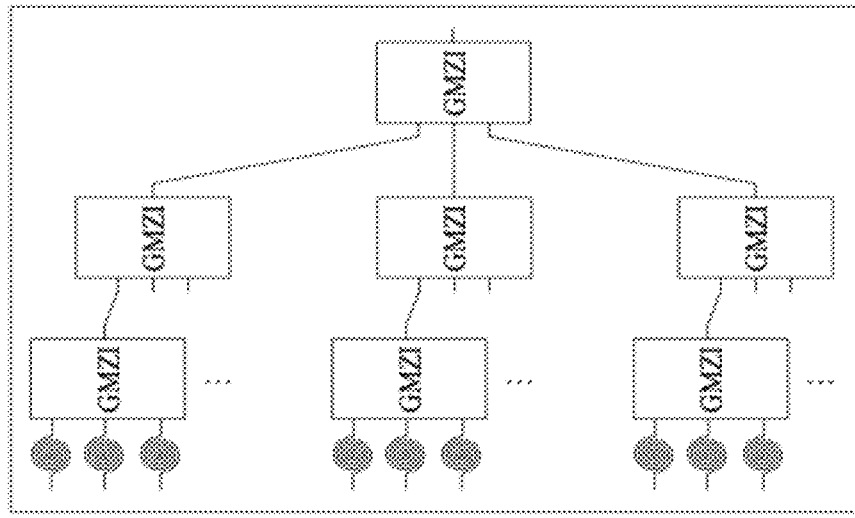

FIGS. 24A-24D show examples of generalized N-to-1 composite multiplexing networks, obtained by replacing the MZI sub-blocks with n×1 GMZIs. FIG. 24A shows a generalized spatial log-tree (n=3 example with some first layer GMZIs omitted for simplicity). The degree of the tree is n and its depth is $\lceil \log_2 N \rceil$. FIG. 24B shows a generalized spatial chain. Each stage after the first takes n-1 new inputs, so that the depth of the network varies between 1 and $\lceil (N-1)/(n-1) \rceil$. FIG. 24C shows a generalized delay network (time log-tree). The GMZIs enclose $\lceil \log_n N \rceil$ layers of n-1 delays with lengths $n^i, \ldots, (n-1)n^i$, where $i=0, \ldots, \lceil \log_n N \rceil - 1$ is the index of the layer of delays. The number of active phase shifters on a path across the scheme is $\lceil \log_n N \rceil + 1$. FIG. 24D shows a generalized storage loop scheme. n-1 inputs enter the GMZI in every time bin. After $\lceil N/(n-1) \rceil$ time bins, the GMZI outputs the chosen input.

In applications such as LOQC, which rely on the interference of multiplexed resources, multiplexing is used to produce synchronized outputs. The schemes described so far achieve this by having a single predetermined output spatio-temporal bin. However, when large output probabilities are needed this leads to a large of resources, which can be understood as follows. The number of available resources for a network of size N follows a binomial distribution with average value $\bar{N}=Np$, where p is the probability of an input being populated. The probability of a network successfully producing an output is then $p_{mux}=1-(1-p)^N$. For the typical situation with large N and small p values, the binomial distribution is well approximated by a Poissonian distribution, and so $p_{mux} \approx 1-e^{-Np}$. It follows that the average number of inputs scales as $Np=-\ln(1-p_{mux})$, and so the number of available resources that are not used grows rapidly as $p_{mux}$ approaches 1. An alternative approach that leads to major efficiency improvements is relative multiplexing. Rather than routing resources to single pre-allocated outputs, this technique uses spatial or temporal log-tree networks to synchronize selected inputs in variable space-time locations, chosen depending on the resources available at any particular instant.

N-to-M schemes in the literature are generally based on the spatial degree of freedom. The simplest of these is a GMZI with more than one output, which has the appealing feature of a single layer of N active phase shifters. However, it only gives access to N permutations, and therefore to limited combinations of inputs. Consequently, the N×M GMZI is more useful when used as a permutation network or as a building block for larger schemes. More flexible routing is achieved by using smaller networks to build composite topologies, known as "switch fabrics". However, the component depth and count and the size of the crossing networks of these schemes tend to be large, and these downsides trade against each other, making the networks impractical for use in the field of quantum applications.

Figure 25A:
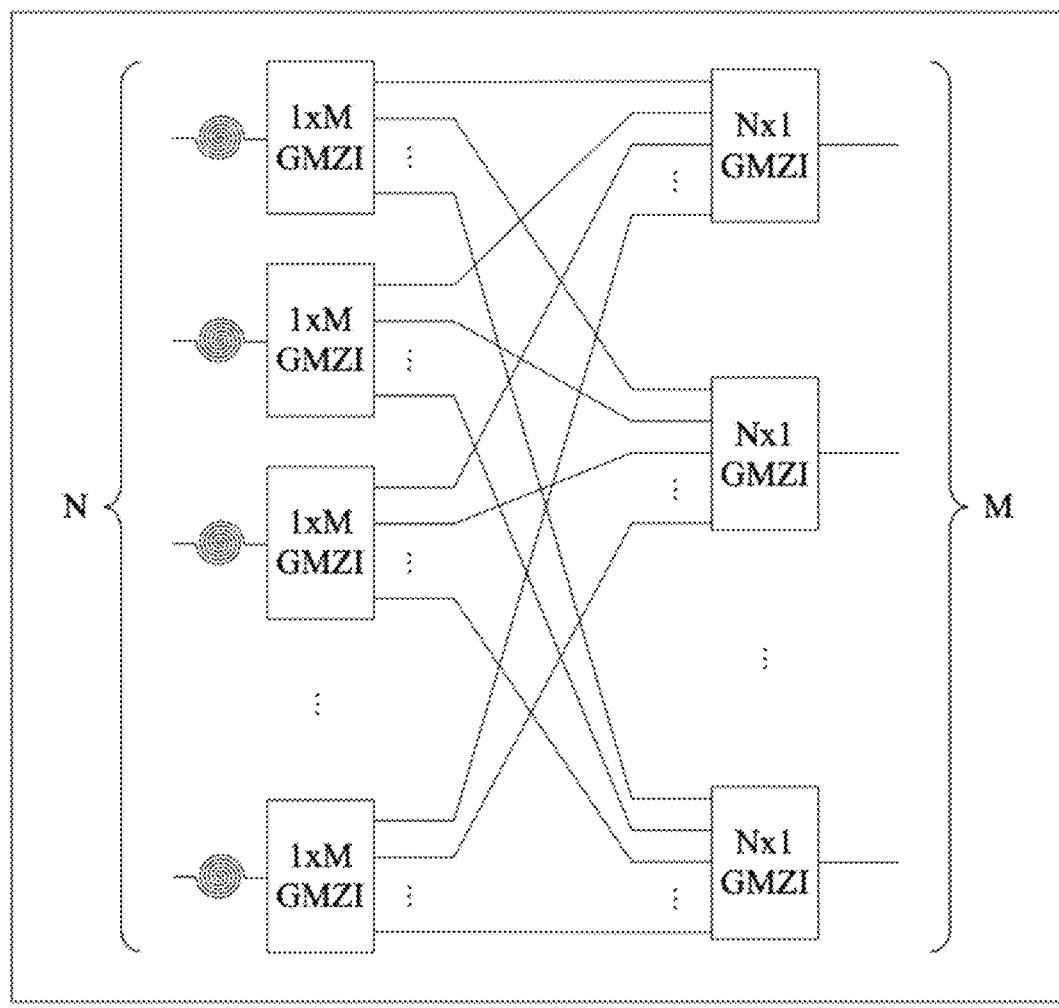
FIGS. 25A and 25B show examples of N-to-M switch networks that can be used in some embodiments.

As an example, Spanke's tree network, shown in FIG. 25A, allows arbitrary rerouting of the inputs with a constant active switch depth of 2, at the cost of a large number of active phase shifters and waveguide crossings. However, the number of active phase shifters and waveguide crossings scales as O(NM). On the other hand, the scheme shown in FIG. 25B avoids large crossing networks, but has an active phase shifter count O(NM) and depth that varies between 1 and M, resulting in variable error rates on the outputs.

Figure 25B:
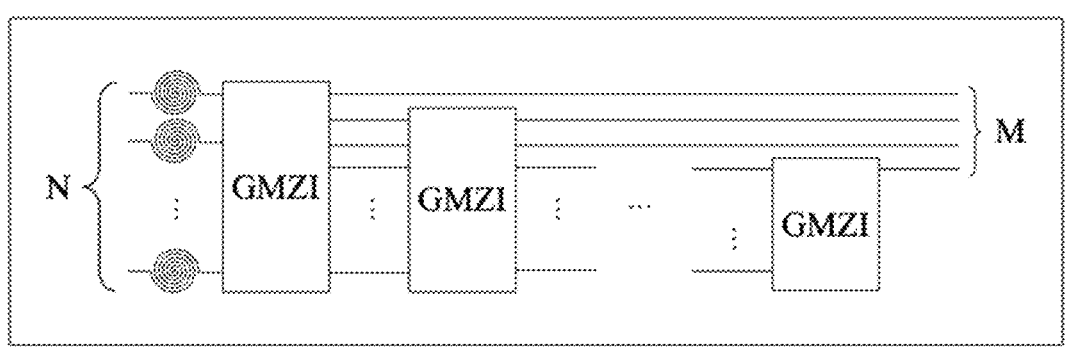

FIGS. 25A and 25B show examples of N-to-M switch networks. FIG. 25A shows a Spanke network. Two layers of interconnected GMZIs allow arbitrary routing of N inputs to M outputs. The fixed active phase shifter depth of 2 makes this scheme interesting, but the scaling of the number of active phase shifters and crossings scaling as (NM) poses challenges for large sizes. FIG. 25B shows a concatenated GMZI. This scheme consists of M concatenated GMZIs with progressively fewer outputs. No complex crossing networks are required between its building blocks, but the O(NM) active phase shifter count and variable depth up to M limit the maximum feasible network size.

For quantum applications, where low error rates are required, N-to-M muxes need to be simplified to reduce the number of active phase shifters, both in total and along the path to the output, as well as the complexity of the crossing networks. The routing algorithms associated with these networks also need to be simplified, to avoid the need for unfeasibly long delays for the inputs. The complexity of the logic is largely determined by its generality, so restricting the operation of the networks to specific tasks is helpful to reduce processing times. These provide guiding principles for the design of additional schemes.

A general switch network implements a set of unitary transfer matrices $U_k$, where each unitary routes light between a subset of input and output ports. If $U_k$ routes light from port t to port s, then its sth row and tth column must be zero apart from $|U_{s,t}|=1$, and similarly for other pairings of input and output ports. The aim of this section is to elucidate the sets of routing operations that are achievable using the simplest form of a many-mode switching network, which is to say one corresponding to transfer matrices $U_k=WD_kV^\dagger$, where the unitary matrices W, $V^\dagger$ describe passive interferometers, and the $D_k$ form a set of diagonal phase matrices. The phase matrices are implemented physically using a single layer of fast phase shifters acting on every mode, and for simplicity, we will write D in terms of a phase vector d, $D_{s,t}=d_s\delta_{s,t}$. The discussion below provides a comprehensive treatment of these switch networks and presents several new constructions.

An important class of switch networks is obtained by considering sets of permutation matrices $\{U_k=WD_kV^\dagger\}$. By adding the fixed passive network corresponding to e.g. $U_1^{-1}$ (so, the inverse of an arbitrary permutation from that set), we obtain a new set $\{U_kU_1^{-1}\}=\{WD'_kW^\dagger\}$ of pairwise commuting permutation matrices. So it makes sense to restrict the discussion to the case where the $\{U_k\}$ are commuting. Switch networks of this type were introduced above as "generalized Mach-Zehnder interferometers" (GMZIs). Here we need a more precise definition for GMZIs, and we will define them as switch networks having the following specific properties:

(i) $\{U_k=WD_kW^\dagger\}$ is a set of transfer matrices corresponding to commuting permutations of N modes. The entries of $D_k$ are given by roots of unity (up to an overall global phase factor $e^{i\Phi_k}$ which can be chosen at will).

(ii) The GMZI switch setting $D_k$ routes light from input port 1 to output port k.

From these properties it is straightforward to prove that the GMZI must have exactly N settings, and that for any choice of input and output port, there is exactly one setting which routes light between the ports.

From a mathematical standpoint, the set of operations implemented by a GMZI on N modes forms an abelian group of order N. This fact is very helpful here as it allows us to characterize the entire family of GMZIs defined by (i), (ii) using well-known results from group theory (namely the basis theorem for finite abelian groups). In particular, for any GMZI, $\{U_k\}$ must be isomorphic to a direct sum of cyclic groups, where the order of each of the cyclic groups is a power of a prime number.

To be more concrete, we define groups of commuting permutations $\mathcal{G}[n_1, n_2, \ldots, n_r])$ generated by matrices $C^{(n_1)} \otimes I^{(n_2)} \otimes I^{(n_3)} \ldots, I^{(n_1)} \otimes C^{(n_2)} \otimes I^{(n_3)} \ldots, I^{(n_1)} \otimes I^{(n_2)} \otimes C^{(n_3)} \ldots$, where $(C^{(n)})_{i,j} = \delta_{i,(j+1 \bmod n)}$ is a cyclic permutation matrix of size n, and $I^{(n_l)}$ is the $n_l \times n_l$ identity matrix, and $\otimes$ is the Kronecker product on matrices (The Kronecker product here acts at the level of linear-optical transfer matrices and should not be confused with tensor product operations on quantum state spaces), and the group operation is matrix multiplication. Then, any GMZI on N modes, satisfying properties (i), (ii) above, must implement a set of permutation operations which corresponds to one of the possibilities for $\mathcal{G}([n_1, n_2, \ldots, n_r])$ with $N = \prod_{l=1}^{r} n_l$ (up to fixed mode permutations at the input and output).

The different types of GMZIs of fixed size can now be determined using the fact that $\mathcal{G}([n_1, n_2])$ and $\mathcal{G}([n_1 n_2])$ are isomorphic if and only if $n_1$ and $n_2$ are coprime. For example, for N=8, we can identify three fundamentally different types of GMZI:

(i) $\mathcal{G}([2,2,2])$, permutations are generated by Pauli matrices $X \otimes I^{(2)} \otimes I^{(2)}$, $I^{(2)} \otimes X \otimes I^{(2)}$, $I^{(2)} \otimes I^{(2)} \otimes X$.

(ii) $\{\mathcal{G}([4,2])\}$, permutations are generated by matrices $$C^{(4)} \otimes I^{(2)}$$

where $$C^{(4)} = \begin{pmatrix} & & & 1 \\ 1 & & & \\ & 1 & & \\ & & 1 & \end{pmatrix},$$

and $$I^{(4)} \otimes X.$$

(iii) $\mathcal{G}([8])$, permutations are generated by matrix $$C^{(8)} = \begin{pmatrix} & & & & & & & 1 \\ 1 & & & & & & & \\ & 1 & & & & & & \\ & & 1 & & & & & \\ & & & 1 & & & & \\ & & & & 1 & & & \\ & & & & & 1 & & \\ & & & & & & 1 & \end{pmatrix}.$$

We refer to GMZIs implementing $\mathcal{G}([2, 2, \ldots, 2])$, i.e. permutations of the form of swaps on subsets of modes, as "Hadamard-type" GMZIs due the type of passive interferometer which is used (explained below). Similarly, we refer to GMZIs implementing $\mathcal{G}([N])$ as "discrete-Fourier-transform (DFT)-type".

The discussion above characterizes the routing power of linear-optical circuits using one-layer of fast phase shifters in the switch network. In particular, a GMZI on N modes is limited to N routing operations, which is obviously small compared to the N! possible mode rearrangement operations. However, the possibility of implementing different sets of permutation operations is exploited by some of designs for spatial and temporal muxes which are discussed herein. Strictly speaking the limitation to N operations originates in property (ii) above—i.e. the ability to route light from any input port to any output port. More general constructions using a single stage of active phase shifts can be trivially obtained by acting with separate GMZIs on subsets of modes. The resulting transfer matrices are given by the direct sum of the individual GMZIs' transfer matrices. For example, using three MZIs in parallel results in a switch network on 6 modes, allowing 8 different settings. Such a construction can implement abelian groups of permutations of maximum order, which are given in J. M. Burns and B. Goldsmith, Bull. London Math. Soc. 21, 70 (1989), with the number of operations scaling to good approximation as $\sim 3^{N/3}$.

We now turn to linear-optical circuits that can implement the GMZIs defined above. In particular, a circuit that can implement the routing operations $\mathcal{G}([n_1, n_2, \ldots, n_r])$ on $N = \prod_{l=1}^{r} n_l$ modes must enact transfer matrices of the form, $$P_k = (C^{(n_1)})^{k_1} \otimes (C^{(n_2)})^{k_2} \otimes \ldots \otimes (C^{(n_r)})^{k_r},$$

with settings vector k where $0 \leq k_l < n_l$ with $l = 1, \ldots, r$. This can be achieved using a circuit with transfer matrices $W D_k W^\dagger$ as follows:

$$W = W^{(n_1)} \otimes W^{(n_2)} \otimes \cdots \otimes W^{(n_r)}$$

with $$(W^{(n_l)})_{s,t} = \frac{e^{i 2\pi s t / n_l}}{\sqrt{n_l}},$$

where the $W^{(n_l)}$ are DFT matrices; the kth setting of the fast phase shifters is given by $$D_k = D_{k_1}^{(n_1)} \otimes D_{k_2}^{(n_2)} \otimes \ldots \otimes D_{k_r}^{(n_r)},$$

with $(d_k^{(n)})_s = e^{-i 2\pi k s / n}$ for $D_k^{(n)}$.

One route to constructing practical interferometers for W and $W^\dagger$ is to reduce them to networks of beam-splitter and phase-shifter components using generic unitary decompositions from M. Reck et al., Phys. Ref. Lett. 73, 58 (1994), or W. R. Clements et al., Optica 3, 1460 (2016). These decompositions have optical depth (number of optical elements encountered on the longest path through the interferometer) scaling as 2N−3 and N respectively. This means that the transmittance along the longest path will scale with an exponent which is proportional to the size parameter N—which presents a severe experimental limitation for scaling to large GMZI sizes.

Figure 26:
FIG. 26 shows an equation for a type of specific decomposition of GMZI networks that can be used in some embodiments.
Figure 27A:
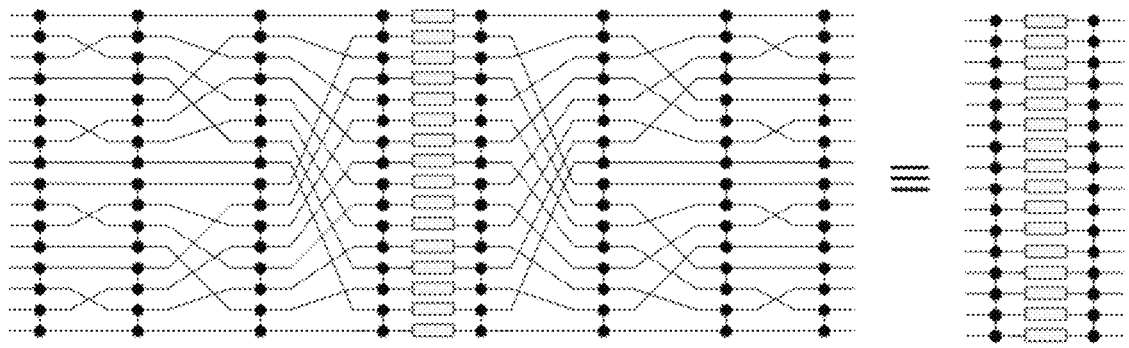
FIGS. 27A and 27B show Hadamard-type GMZI constructions that can be used in some embodiments.

GMZI networks—having a lot of special structure—allow for specific decompositions of the type given by equation 2600 shown in FIG. 26, where the matrices S,. correspond to crossing networks which reorder modes within the interferometer. Since the subexpressions of the form $I^{(N/n_l)} \otimes V^{(n_l)}$ correspond to repeated blocks of modes interfering according to unitary $V^{(n_l)}$, the equation for W in FIG. 26 can be seen to describe stages of local interference separated by crossing networks. Note also that since the bracketed expressions in the decomposition commute there is some freedom in the configuration of the crossing networks, and some of them can be treated as relabelings of modes rather than physical circuit elements. FIG. 27A illustrates the construction of a Hadamard-type GMZI using the decomposition, as well as simplification which is possible when the GMZI is used as a N-to-1 mux.

Figure 27B:
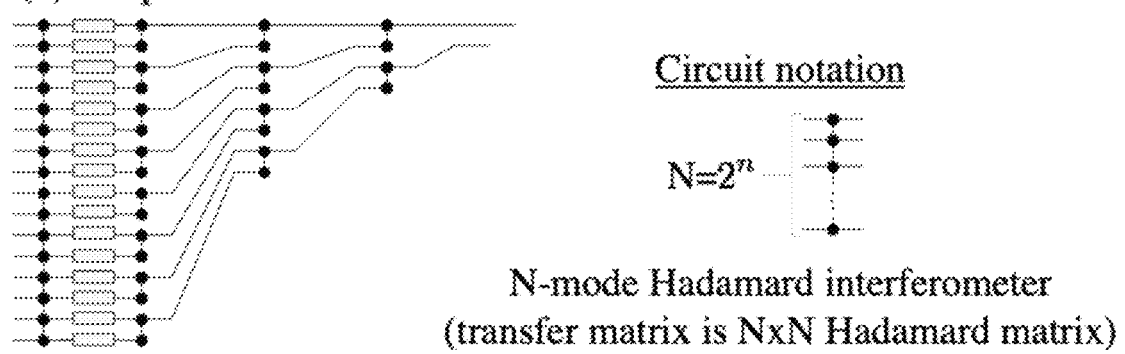

FIGS. 27A and 27B show Hadamard-type GMZI constructions: (i) in FIG. 27A, illustration of a linear-optical circuit for a GMZI on N=16 modes, for which the fast phase shifters are set to configurations of 0 and $\pi$ to select one of 16 operations from $\mathcal{G}$ ([2,2,2,2]); (ii) in FIG. 27B, possible simplification of the circuit when only one output port is required—as is the case when the GMZI is used as a N-to-1 mux. The passive interferometers are constructed following the decomposition of W with stages of interference using 50:50 beam-splitters or directional couplers on pairs of adjacent modes, separated by crossings networks. Note that the phases in the physical interferometer generally differ from the constructions given in the main text, and this implies minor modifications for the transfer matrices and phase-shifter settings.

For more general GMZI types, we note that the unitary matrices WO can be decomposed into elementary beam-splitter and phase-shifter operations using the generic decomposition methods mentioned above. Alternatively, since the WO are assumed to be discrete Fourier transforms, they can be recursively decomposed into smaller discrete Fourier transforms acting on sets of local modes $I^{n_j/(n'_j)} \otimes V^{(n''_j)}$, $I^{n_j/(n''_j)} \otimes V^{(n''_j)}$ (for any sizes satisfying $n_j = n'_j \times n''_j$) together with crossings networks and additional phase shifts.

One more subtle feature of the GMZI constructions that was remarked on above is that the matrices $D_k$ for the GMZIs are determined up to a setting-dependent global phase factor $e^{i\Phi_k}$. In principle these global phases can be freely set over a range $[0,2\pi)$ (provided the active phase shifters themselves are configured with sufficient phase range). For an application such as single-photon multiplexing, the global phase factors have no role in the operation of the switch network. However, they can be useful if the switch network is applied to only some part of the input states (e.g. single rails from dual-rail qubits) or if it is incorporated in larger interferometers. In these cases, additional functionality can be absorbed into the operation of the switch network without adding extra layers of switching.

This idea is very useful for LOQC, where it is often desirable to multiplex some circuit which generates entangled states, whilst also applying internal adaptive corrections to its output. An example of this occurs when multiplexing Bell states from a standard BSG circuit. This circuit produces a Bell state across four modes with probability 3/16, but the Bell states do not conform to dual-rail qubit encoding (i.e. with qubits allocated to fixed pairs of modes) in a third of cases. Although this problem can be addressed using an additional MZI at the mux output to perform an optional mode-swap operation, a more elegant solution is presented in FIGS. 28A and 28B.

Figure 28A:
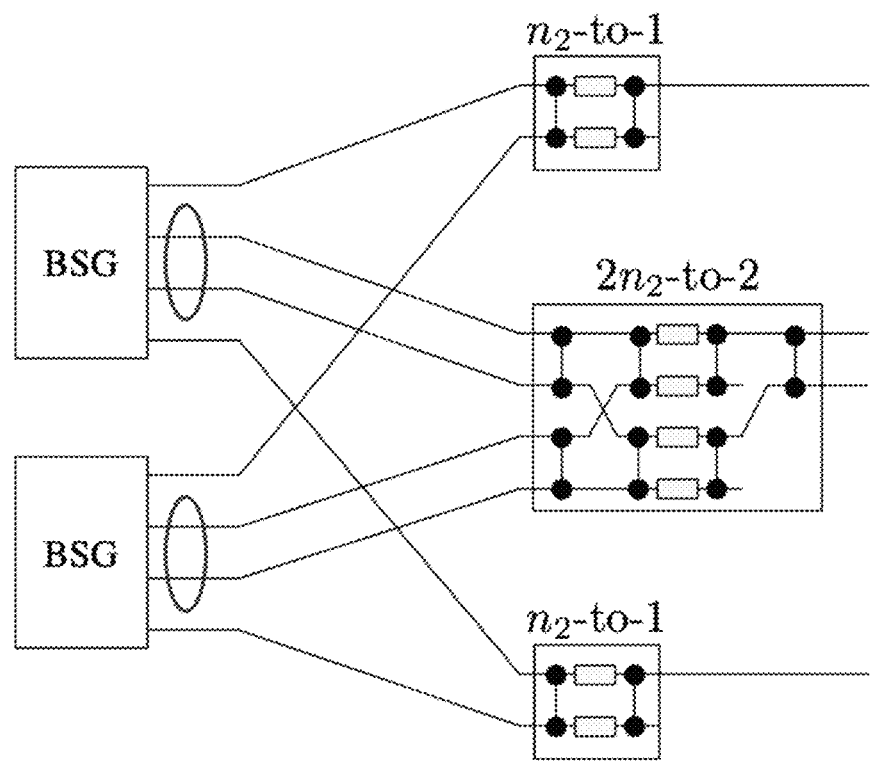
FIGS. 28A and 28B show examples of larger GMZI that can be used in some embodiments.
Figure 28B:
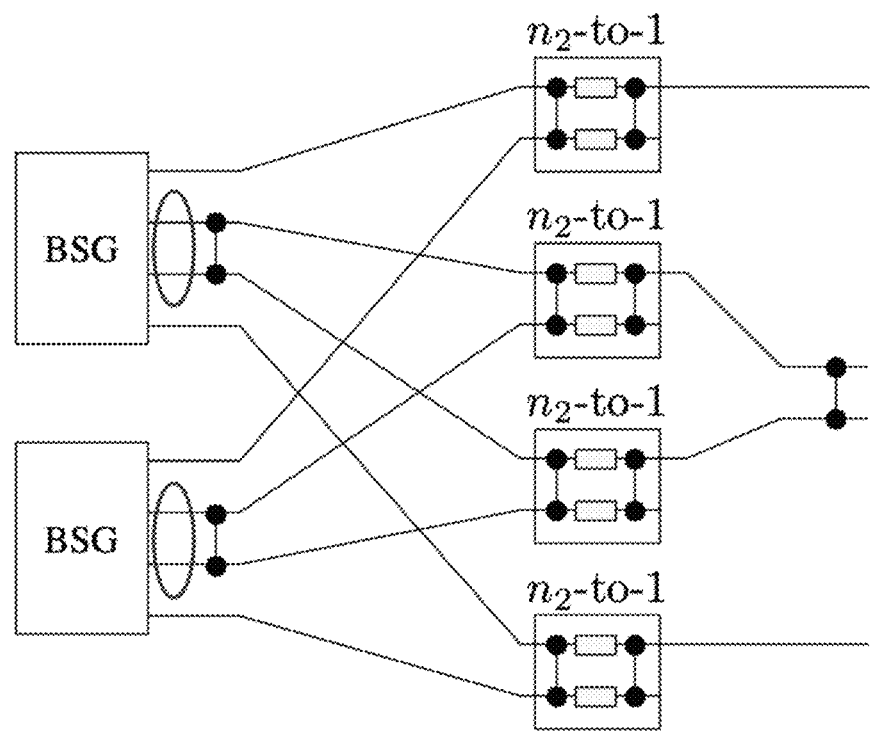

FIGS. 28A and 28B show examples of larger GMZI to implement adaptive swaps of rails while multiplexing Bell states generated with $n_2$ standard BSGs. FIG. 28A shows sending the two rails that might need to be swapped (circled in red) through a single GMZI of size $N=n_1 n_2$ ($n_1 = n_2 = 2$ in this diagram) allows multiplexing and permutation operations to be combined while avoiding the need for an additional switching stage. FIG. 28B shows that the modular structure of the GMZI can be exploited to apply portions of the circuit at different locations and to optimize the physical implementation. In this example, the network which incorporates the swap operation can be decomposed into two 2-to-1 GMZIs with extra directional couplers applied at the output of the BSGs and between the two output rails.

In this approach, a mux on $n_2$ copies of the BSG implements multiplexing and swap operations, using a size $N=n_1 n_2$ GMZI on $n_1 = 2$ inner rails from each BSG, and regular $n_2$-to-1 multiplexing for the outer rails. The ability to permute the rails increases the success probability for generating a dual-rail encoded Bell state from 1/8 to 3/16, and thereby decreases the amount of multiplexing needed to reach any particular target output probability by a factor of ~1.55.

More generally, the transfer matrices associated with a GMZI that implements the routing operations $\mathcal{G}$ ([$n_1, n_2$]) are $$P_{(k_1,k_2)} = (C^{(n_1)})^{k_1} \otimes (C^{(n_2)})^{k_2}$$
$$= (C^{(n_1)} \otimes I^{(n_2)})^{k_1} (I^{(n_1)} \otimes C^{(n_2)})^{k_2}.$$

This can be interpreted as $n_1$ separate copies of $n_2$-to-1 GMZIs (second term) with an additional set of permutations of the $n_1$ outputs also available (first term). So, permutations of $n_1$ rails can be implemented while multiplexing each one $n_2$ times by sending all $N=n_1 n_2$ inputs through a single larger GMZI rather than smaller separate ones. The key advantage of this method is that the depth and total number of active phase shifters do not change (1 and N respectively).

Using a larger GMZI comes at the cost of increasing the optical depth of the circuit, particularly in terms of waveguide crossings. As seen from the expression of W above, the passive interferometers in a GMZI can be decomposed into smaller networks connected by layers of crossings. This modular structure can be exploited to distribute parts of the circuit across different locations and avoid large on-chip crossing networks. In the BSG example, the implementation shown in FIG. 28B highlights how the first layer of crossings can be realized in a different way, e.g. using long distance phase-stable optical routing, to mitigate the impact of the largest crossing network in the interferometer.

The discussion so far presented a large family of GMZIs and explained their key properties, taking an approach focused on achievable sets of permutations which is different to earlier works. As well as N-to-1 muxing (potentially with extra functionality as explained above, these GMZIs have assorted applications as building blocks for spatial and temporal muxes. Alternative constructions of GMZIs are also possible, and it is valuable to explore them with a view to minimizing practical requirements on fast phase shifters. However, it is not feasible to exhaust all possible GMZI designs, as some properties for Hadamard matrices are not known. Instead we will highlight some specific new constructions with useful properties.

One observation is that phase swing requirements (where the swing is defined per phase shifter as the difference between the maximum and minimum phase shifts across all GMZI settings) can sometimes be reduced by introducing fixed phase-shift offsets. For some of the constructions above, the phase shifter settings correspond to complete sets of roots of unity, and the phase swing is $\pi$ for Hadamard interferometers and $>\pi$ for the other GMZI types. Table 1 shows examples of reduced swing for GMZI sizes N=2,3,4 including examples of GMZIs with reduced phase swing using fixed phase-shift offsets. It is assumed that all the fast phase shifter components are identical and access the same range of phase shifts (which is minimized). Note that the use of offsets necessitates modification of the GMZI transfer matrices by additional phase factors—corresponding to setting-dependent "global" phases at the output.

TABLE 1

| GMZI type | Phase offsets | Comment |
|---|---|---|
| Hadamard N = 2 | $(-3\pi/2, 0)$ | Swing reduced from $\pi$ to $\pi/2$, coinciding with MZI variant in FIG. 21A. |
| DFT N = 3 | $(-4\pi/3, 0, 0)$ | Swing reduced from $4\pi/3$ to $2\pi/3$. |
| Hadamard N = 4 | $(-\pi, 0, 0, 0)$ | Swing unchanged at $\pi$, but for each setting only one phase shifter is set to $\pi$ and the others to 0. |

To find some more subtle constructions, we can consider general constraints on GMZIs implementing transfer matrices $U_k=WD_kV^\dagger$ on N modes, which are required to act minimally as N-to-1 muxes. It is straightforward to prove a lemma stating that (a), V in this case must be proportional to a complex Hadamard matrix (i.e. V must satisfy $|V_{s,t}|=1/\sqrt{N}$ as well as being unitary), and (b) the phase vectors $d_k$ must be orthogonal. A simple consequence of this result is that it is never possible to construct any GMZI for which the phase-shifter swing is less than $\pi/2$ (since it is never possible to achieve 0 for the real part of $\langle d_k,d_{k'}\rangle$). Similarly, when the phase-shifter values are restricted to $\{0,\pi/2\}$ it is not possible to find more than 2 orthogonal vectors $d_k$ for any even value of N (and never more than 1 for odd values of N), which is to say that it is not possible to do better than a 2-to-1 mux.

As another application of this lemma, one can look for sets of orthonormal phase vectors $\{d_k\}$ and construct a GMZI which uses these as phase settings for a N-to-1 mux, by choosing V to have row vectors $v_k=d_k$, and any unitary W with first row vector $w_1=(1, 1, \ldots, 1)/\sqrt{N}$. An interesting and non-trivial example of such a set of phase vectors is given in Table 2. More specifically the able below shows examples of six orthogonal phase vectors with a subset $d_1, \ldots, d_4$ having a reduced phase swing of $2\pi/3$ (compared to $4\pi/3$ for the entire set). A N=6 GMZI constructed using these settings can implement a 4-to-1 mux which has phase swing of only $2\pi/3$ (by restricting to the first four phase-shifter settings). Furthermore, it is easily seen that this example is not related to the constructions above since the only possibility would be the GMZI implementing $\mathcal{G}$ ([6])$\approx\mathcal{G}$ ([3,2]), for which individual phase settings range on six values (compared to three in Table 2).

TABLE 2

Settings for a N = 6 GMZI acting as a 6-to-1 mux $d_1 = (1, 1, 1, e^{-2i\pi/3}, e^{-2i\pi/3}, e^{-2i\pi/3})/\sqrt{6}$
$d_2 = (1, e^{-2i\pi/3}, e^{-2i\pi/3}, 1, e^{-2i\pi/3}, 1)/\sqrt{6}$
$d_3 = (e^{-2i\pi/3}, 1, e^{-2i\pi/3}, e^{-2i\pi/3}, 1, 1)/\sqrt{6}$
$d_4 = (e^{-2i\pi/3}, e^{-2i\pi/3}, 1, 1, 1, e^{-2i\pi/3})/\sqrt{6}$
$d_5 = (1, e^{-2i\pi/3}, e^{-4i\pi/3}, e^{-2i\pi/3}, 1, e^{-4i\pi/3})/\sqrt{6}$
$d_6 = (e^{-2i\pi/3}, 1, e^{-4i\pi/3}, 1, e^{-2i\pi/3}, e^{-4i\pi/3})/\sqrt{6}$ Finally, we turn to a new way of using GMZIs when phase settings are modified from those connecting single input and output ports. Taking Hadamard-type GMZIs with transfer matrices $U_k=WD_kW^\dagger$ on N modes, consider first when the phase vector $d_{k'}$ for $D_{k'}$ is modified so that $-\pi$ phases are set to a (common) value $-\phi$, while the 0 phases are unchanged. In this case $U_{k'}$ is modified to $$\tilde{U}_{k'}(\phi) = e^{-i\phi/2}\left[\cos\left(\frac{\phi}{2}\right)I^{(N)} + i\sin\left(\frac{\phi}{2}\right)U_{k'}\right].$$

This unitary maps a single photon incident at one input port to a superposition across the mode at the input and the output under the permutation $U_{k'}$, with weighting controlled by the value of $\phi$. Further modification of the phase settings can achieve mappings from one input to arbitrary pairs of output ports—suppose it is desired to map from input port $p_i$ to output ports $q_1$ and $q_2$, then this can be implemented by finding the (unique) settings $k_1,k_2$ with $U=WD_{k_{1(2)}}W^\dagger:p\mapsto q_{1(2)}$, and choosing phase vector $$\vec{d} = e^{-i\phi/2}\left[\cos\left(\frac{\phi}{2}\right)d_k + i\sin\left(\frac{\phi}{2}\right)d_{k'}\right].$$

The transfer matrix for the GMZI is then $$\tilde{U}(\phi) = e^{-\frac{i\phi}{2}}\left[\cos\left(\frac{\phi}{2}\right)U_k + i\sin\left(\frac{\phi}{2}\right)U_{k'}\right],$$

where the individual phase settings are taken from the set $\{0, -\phi, -\pi, -\pi-\phi\}$. Note that a second input port $p_2$ is also mapped to the pair $q_1$ and $q_2$, where $U_kU_{k'}:p_1\mapsto p_2$. We call a GMZI used according to the equation above for $\tilde{U}/(\phi)$ a switchable pairwise coupler and it can be useful in spatial and temporal muxes (with the proviso that paired ports receive the vacuum state to avoid contamination of the intended input).

6. ADDITIONAL EMBODIMENTS

The foregoing examples of raster mux circuits and their applications are illustrative and can be modified as desired. Although some examples may make reference to use-cases related to quantum computing, where photons propagating in waveguides may be used to encode qubits, it should be apparent from this disclosure that raster mux circuits are applicable in any photonic circuit where temporal and/or spatial rearrangement of photons is desired. Further, raster mux circuits can be used for aligning a group of photons on different paths into any target spatiotemporal relationship, provided that an appropriate combination of output paths (including delay lines where applicable) is provided. The size of a time bin, the number of spatial and/or temporal modes, and the number of photons can be varied as desired.

As noted above, in some embodiments, "errant" photons can occur. For instance, in a given time bin, a raster mux circuit may produce a second photon on an output path other than the intended output path. Various techniques can be used to address errant photons. For instance, blocking switches as described above can be used to prevent errant photons from propagating into downstream circuits; the blocking switches can be set to permit. As another example, clocked electrical gating can be used to ignore signals from particular downstream detectors except during time bins when signals are expected from those detectors.

As described above, a raster multiplexer can include a set (also referred to "raster group") of output paths that are selected in a rasterized manner such that each output path in the raster group is selected as an active output path once during a raster period. The raster period can include a set of consecutive time bins. In other embodiments, selection of an active output path can be based on a timing signal such that different output paths in the raster group are selected at different times (not necessarily on consecutive cycles). The selection of an output path can be cyclic, such that the active output path is selected according to a fixed order, and independent of the selection of an active input path. In some embodiments, a raster multiplexer can also include one or more other output paths in addition to the raster group. The control logic can have multiple operating modes. For example, in a "rastering" mode, the control logic can select among the raster group in a manner as described above. In a "non-rastering" mode, the control logic can implement other algorithms to select an output path and may select from any output path including output paths that are in the raster group and/or output paths that are not in the raster group.

Further, embodiments described above include references to specific materials and structures (e.g., optical fibers), but other materials and structures capable of producing, propagating, and operating on photons can be substituted. Raster multiplexing is described above in the context of optical/photonic circuits; however similar techniques may be applied to other types of propagating signals.

Control logic to control the switches and other optical components described herein can be implemented as a digital logic circuit with an arrangement of logic gates (AND, OR, NOR, XOR, NAND, NOT, etc.), such as a field programmable gate array (FPGA) or system-on-a-chip (SOC) having a programmable processor and memory, or an on-chip hard-wired circuit, such as an application specific integrated circuit (ASIC). Control logic can be implemented on-chip with the waveguides, beam splitters, detectors and/or and other photonic circuit components or off-chip as desired. In some embodiments, photon sources, raster mux circuits, and/or other optical circuits can be coupled to an off-chip computer system having a processor and a memory, and the off-chip computer system can be programmed to execute some or all of the control logic.

It should be understood that all numerical values used herein are for purposes of illustration and may be varied. In some instances ranges are specified to provide a sense of scale, but numerical values outside a disclosed range are not precluded. Terms such as "synchronized" or "simultaneous" (or "same" or "identical") should be understood in the engineering rather than the mathematical sense: finite design tolerances can be defined, and events separated by less than the design tolerance may be treated as synchronized or simultaneous. A "time bin" refers to a temporal mode that distinguishes different photonic states in the same waveguide (or spatial mode). The duration of a time bin can be defined based on characteristics of the optical circuits (e.g., there may be some variation in the delay between pumping a photon source and obtaining an output photon from the source), and successive time bins can be separated by arbitrary time periods (e.g., to allow circuit components to recover or change state before receiving the next photon).

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure can be modified or omitted and that other elements not shown or described can be added. The terms "upstream" and "downstream" as used herein refer to the direction of photon propagation through an optical circuit (from "upstream" inputs toward "downstream" outputs) and may correspond to any direction in physical space.

This disclosure provides a description of the claimed invention with reference to to specific embodiments. Those skilled in the art with access to this disclosure will appreciate that the embodiments are not exhaustive of the scope of the claimed invention, which extends to all variations, modifications, and equivalents.

What is claimed is:

1. A circuit comprising:
   a number (N) of input paths, wherein N is greater than 1;
   a plurality of output paths including a raster group of output paths, wherein the raster group of output paths has a number (R) of output paths, wherein R is at least 2;
   an optical switching network coupled between the input paths and the output paths, the optical switching network comprising a plurality of active optical switches arranged to selectably couple a photon from any one of the input paths to any one of the output paths; and
   control logic coupled to the optical switching network and configured to:
      receive, for a time bin of a plurality of time bins, an input signal indicative of whether a photon is present on each input path;
      select, based on the input signal, one of the input paths as an active input path for the time bin;
      select one of the output paths as an active output path for the time bin, wherein output paths in the raster group are selected according to a fixed order such that each output path in the raster group of output paths is selected as the active output path once during a raster period consisting of R consecutive time bins; and
      generate control signals to set a state of the active optical switches for the time bin such that a photon from the active input path is coupled to the active output path.

2. The circuit of claim 1 further comprising:
   a plurality of delay lines, each delay line introducing a different amount of delay,
   wherein each delay line is coupled to a different one of the R output paths in the raster group of output paths.

3. The circuit of claim 2 wherein the control logic is configured to select the output paths in an order such that photons entering the optical switching network during a set of R consecutive time bins arrive at respective outputs of the delay lines in the same time bin.

4. The circuit of claim 1 wherein the optical switching network is a generalized Mach-Zehnder interferometer (GMZI) and the active optical switches include active phase shifters.

5. The circuit of claim 1 wherein each input path and each output path comprises a waveguide.

6. The circuit of claim 1 wherein each input path and each output path comprises a pair of waveguides.

7. The circuit of claim 1 wherein each input path is coupled to an output of a different one of a set of N heralded single photon sources and wherein the input signal includes heralding signals from the heralded single photon sources.

8. The circuit of claim 1 wherein the plurality of output paths further includes at least one additional output path separate from the raster group of output paths.

9. A circuit comprising:
   a number (N) of source circuits, each source circuit having an output path to propagate a photon, wherein N is greater than 1;

a downstream circuit having a number (R) of input paths to receive photons, wherein R is at least 2; and
a raster multiplexer circuit having:
- a number N of multiplexer input paths, each multiplexer input path coupled to an output path of one of the source circuits;
- a plurality of multiplexer output paths including a raster group of multiplexer output paths, wherein the raster group of multiplexer output paths includes R multiplexer output paths, each multiplexer output path in the raster group of multiplexer output paths being coupled to one of the input paths of the downstream circuit;
- an optical switching network coupled between the multiplexer input paths and the multiplexer output paths, the optical switching network comprising a plurality of active optical switches arranged to selectably couple a photon from any one of the multiplexer input paths to any one of the multiplexer output paths; and
- control logic coupled to the optical switching network and configured to:
  - receive, for each of a plurality of time bins, an input signal indicative of whether the output path of each source circuit is propagating a photon;
  - select, based on the input signal, one of the multiplexer input paths as an active multiplexer input path for the time bin;
    - select one of the multiplexer output paths as an active multiplexer output path for the time bin, wherein multiplexer output paths in the raster group are selected according to a fixed order such that each multiplexer output path in the raster group of multiplexer output paths is selected as the active multiplexer output path once during a raster period consisting of R consecutive time bins; and
    - generate control signals to set a state of the optical active switches such that a photon from the active multiplexer input path is coupled to the active multiplexer output path.

10. The circuit of claim 9 wherein the downstream circuit is a Bell state generator.

11. The circuit of claim 9 wherein the source circuits are heralded single photon source circuits.

12. The circuit of claim 9 wherein the source circuits are entanglement circuits that generate entangled systems of photons that encode qubits.

13. The circuit of claim 12 wherein the qubits are encoded using a dual-rail encoding and wherein each multiplexer input path and each multiplexer output path comprises a pair of waveguides.

14. The circuit of claim 12 wherein the downstream circuit includes a second optical switching network coupled to a plurality of fusion circuits.

15. A circuit comprising:
a number (N) of source circuits, each source circuit having an output path to propagate a photon, wherein N is at least 2;
a number (R) of downstream circuits, each downstream circuit having a number (M) of input paths to receive photons, wherein R is at least 2 and M is at least 2; and
a set of M raster multiplexer circuits, each raster multiplexer circuit having:
- a set of N multiplexer input paths, each multiplexer input path coupled to an output path of one of the N source circuits;
- a plurality of multiplexer output paths including a raster group of multiplexer output paths, wherein the raster group of multiplexer output paths includes R multiplexer output paths, each multiplexer output path in the raster group of multiplexer output paths being coupled to one of the input paths of a different one of the R downstream circuits; and
- an optical switching network coupled between the multiplexer input paths and the multiplexer output paths, the optical switching network comprising a plurality of active optical switches arranged to selectably couple a photon from any one of the multiplexer input paths to any one of the multiplexer output paths; and control logic coupled to the raster multiplexer circuits and configured to:
- receive, for each of a plurality of time bins, an input signal indicative of whether the output path of each source circuit is propagating a photon;
- select, for each of the raster multiplexer circuits, one of the multiplexer input paths as an active multiplexer input path for the time bin, the selection being based at least in part on the input signal;
- select, for each of the raster multiplexer circuits, one of the multiplexer output paths as an active multiplexer output path for the time bin, wherein, for each raster multiplexer circuit, multiplexer output paths in the raster group are selected according to a fixed order such that each multiplexer output path in the raster group of multiplexer output paths is selected as the active multiplexer output path once during a raster period consisting of R consecutive time bins and wherein all M of the multiplexer output paths that couple to a same one of the R downstream circuits are selected as the active multiplexer output paths for a same time bin; and
- generate control signals to set a state of the active switches in the optical switching network of each of the R raster multiplexer circuits such that, in each of the R raster multiplexer circuits, a photon from the active multiplexer input path is coupled to the active multiplexer output path.

16. The circuit of claim 15 further comprising:
a plurality of delay lines, each delay line introducing a different amount of delay,
wherein each delay line is coupled to a different one of the multiplexer output paths in the raster group of multiplexer output paths.

17. The circuit of claim 16 wherein the control logic is further configured to select the output paths in an order such that photons entering the optical switching network during a set of R consecutive time bins arrive at respective outputs of the delay lines in the same time bin.

18. The circuit of claim 17 wherein the source circuits are heralded single photon source circuits.

19. The circuit of claim 18 wherein each downstream circuit is a Bell state generator.

20. A method comprising:
receiving, for each time bin in a series of time bins, a plurality of input signals indicating whether photons are present on each of a plurality of input paths of an optical circuit;
selecting, for each time bin in the series of time bins, an active input path for the optical circuit based at least in part on the input signals;
selecting, for each time bin in the series of time bins, an active output path for the optical circuit from a plurality of output paths that includes a raster group of a number (R) of output paths, wherein R is at least 2, wherein output paths in the raster group are selected according to a fixed order such that each output path in the raster group of output paths is selected as the active output path once during a raster period consisting of R consecutive time bins; and controlling, for each time bin in the series of time bins, a plurality of active switches in the optical circuit to couple a photon from the active input path to the active output path.

21. The method of claim 20 wherein each output path in the raster group of output paths is coupled to a delay circuit that introduces a different number of clock cycles of delay and wherein the output paths are selected in an order such that photons entering the optical circuit during a set of R consecutive cycles arrive at respective outputs of the delay lines in a same clock cycle.

* * * * *